United States Patent [19]

Miyasaka et al.

[11] Patent Number: 5,493,647
[45] Date of Patent: Feb. 20, 1996

[54] DIGITAL SIGNAL RECORDING APPARATUS AND A DIGITAL SIGNAL REPRODUCING APPARATUS

[75] Inventors: Syuji Miyasaka, Neyagawa; Kazue Kita, Higashiosaka; Michio Matsumoto, Sennan; Tsuneo Tanaka; Masayuki Misaki, both of Kobe; Takeshi Norimatsu, Kadoma; Toshihiko Nagano, Takatsuki, all of Japan

[73] Assignee: Matsushita Electric Industrial Co., Ltd., Osaka, Japan

[21] Appl. No.: 223,846

[22] Filed: Apr. 6, 1994

[30] Foreign Application Priority Data

| Jun. 1, 1993 | [JP] | Japan | 5-130350 |
| Jun. 21, 1993 | [JP] | Japan | 5-149236 |
| Oct. 29, 1993 | [JP] | Japan | 5-271818 |
| Mar. 15, 1994 | [JP] | Japan | 6-044248 |
| Mar. 15, 1994 | [JP] | Japan | 6-044251 |

[51] Int. Cl.⁶ .................................................. G06F 11/00
[52] U.S. Cl. ............................................... 395/183.18
[58] Field of Search .................. 395/875, 2; 381/30, 381/37, 29

[56] References Cited

U.S. PATENT DOCUMENTS 5,105,463  4/1992  Veldhuis et al. ................... 381/30
5,438,643  8/1995  Akagiri et al. ..................... 395/2.1

FOREIGN PATENT DOCUMENTS 2-305053  12/1990  Japan.

OTHER PUBLICATIONS

*Microprocessors and Programmed Logic* by Kenneth L. Short ©1987 by Prentice–Hall, Inc. pp. 430–432.

*Primary Examiner*—Vincent P. Canney
*Attorney, Agent, or Firm*—Ratner & Prestia

[57] ABSTRACT

A digital signal recording apparatus includes: a level encoder for encoding a digital signal into the first to N-th level data, N being an integer greater than 1; a solid state memory having a data storage area and an auxiliary information storage area, the data storage area being writable for the first to N-th level data; and a write controller for, when the writable area in the data storage area is exhausted, freeing at least a part of an area in the data storage area in which level data other than the first level data is stored, for storing level data including at least the first level data into the freed area in the data storage area, and for storing auxiliary information indicating attributes of the stored level data into the auxiliary information storage area.

24 Claims, 45 Drawing Sheets

Fig.6

| | |
|---|---|
| Address 0000<br><br>Address 0FFF | Area in which the first level data is stored |
| Address 1000<br><br>Address 1FFF | Area in which the second level data is stored |
| Address 2000<br><br>Address 2FFF | Area in which the third level data is stored |
| Address 3000<br><br>Address 3FFF | Area in which the fourth level data is stored |

Fig.7

Address 0000 ~ Address 0FFF : The first level data

Address 1000 ~ Address 1FFF : The second level data

Address 2000 ~ Address 2FFF : The third level data

Address 3000 ~ Address 3FFF : The fourth level data

Fig.8

| Address 0000<br><br>Address 0FFF | Area in which the first level data is stored |
|---|---|
| Address 1000<br><br>Address 1FFF | Area in which the second level data is stored |
| Address 2000<br><br>Address 2FFF | Area in which the first level data is stored |
| Address 3000<br><br>Address 3FFF | Area in which the second level data is stored |

Fig.9

Address 0000 ~ Address 0FFF : The first level data

Address 1000 ~ Address 1FFF : The second level data

Address 2000 ~ Address 2FFF : The third level data

Address 3000 ~ Address 3FFF : The fourth level data

- - - - - - - - - - - - - - - - - - - - - - - - - - - - - - - - -

Address 2000 ~ Address 2FFF : The first level data

Address 3000 ~ Address 3FFF : The second level data

Fig.10

| Address 0000<br>Address 0FFF | Area in which the first level data is stored |
|---|---|
| Address 1000<br>Address 1FFF | Area in which the second level data is stored |
| Address 2000<br>Address 2FFF | Area in which the first level data is stored |
| Address 3000<br>Address 3FFF | Area in which the first level data is stored |

Fig.11

Address 0000 ~ Address 0FFF : The first level data

Address 1000 ~ Address 1FFF : The second level data

Address 2000 ~ Address 2FFF : The third level data

Address 3000 ~ Address 3FFF : The fourth level data

Address 2000 ~ Address 2FFF : The first level data

Address 3000 ~ Address 3FFF : The second level data

Address 3000 ~ Address 3FFF : The first level data

Fig.15

Frame 1    6433

Frame 2    6532

Frame 3    5533

Fig.17

| Address | Col 1 | Col 2 |
|---|---|---|
| 00000 | D1 (00000) | D1 (00001) |
| | D1 (00002) | D1 (00003) |
| | D1 (00004) | D1 (00005) |
| | ≈ | ≈ |
| | D1 (07FFC) | D1 (07FFD) |
| | D1 (07FFE) | D1 (07FFF) |
| 04000 | D1 (08000) | |
| | | |
| | ≈ | ≈ |
| | | |
| 10000 | D2 (00000) | |
| | D2 (00001) | |
| | D2 (00002) | |
| | ≈ | |
| | D2 (07FFE) | |
| | D2 (07FFF) | |
| 18000 | D2 (08000) | |
| | | |
| | ≈ | |
| | | |
| 2FFFF | | |

Fig.18

| | | |
|---|---|---|
| Allocation : | code 1 | → 00000 − 0FFFF |
| | code 2 | → 10000 − 2FFFF |
| Bit Width : | code 1 | → 4 |
| | code 2 | → 8 |
| Existence : | code 1 | → 00000 − 04000 |
| | code 2 | → 10000 − 18000 |

Fig.19

| address | | |
|---|---|---|
| 00000 | D1 (00000) | D1 (00001) |
| | D1 (00002) | D1 (00003) |
| | D1 (00004) | D1 (00005) |
| ≈ | ≈ | ≈ |
| | D1 (07FFC) | D1 (07FFD) |
| | D1 (1FFFE) | D1 (1FFFF) |
| 10000 | D1 (20000) | D1 (20001) |
| | D1 (20002) | D1 (20003) |
| ≈ | ≈ | ≈ |
| | D1 (27FFE) | D1 (27FFF) |
| 14000 | D1 (28000) | |
| 14001 | D2 (04001) | |
| | D2 (04002) | |
| | D2 (04003) | |
| ≈ | | ≈ |
| | D2 (1FFFE) | |
| 2FFFF | D2 (1FFFF) | |

Fig.20

```
Allocation :  code 1  →  00000 - 0FFFF
           :  code 2  →  10000 - 2FFFF
Bit Width  :  code 1  →  4
           :  code 2  →  8
Existence  :  code 1  →  00000 - 04000
           :  code 2  →  14001 - 2FFFF
```

Fig.22

| | | | | |
|---|---|---|---|---|
| 00000 | D1 (00000) | | D1 (00001) | |
| | D1 (00002) | | D1 (00003) | |
| | D1 (00004) | | D1 (00005) | |
| | ≈ | | ≈ | ≈ |
| | D1 (0FFFC) | | D1 (0FFFD) | |
| | D1 (0FFFE) | | D1 (0FFFF) | |
| 08000 | D1 (10000) | | | |
| | | | | |
| | ≈ | | ≈ | ≈ |
| | | | | |
| 20000 | D3 (00000) | D3 (00001) | D3 (00002) | D3 (00003) |
| | D3 (00004) | D3 (00005) | D3 (00006) | D3 (00007) |
| | D3 (00008) | D3 (00009) | D3 (0000A) | D3 (0000B) |
| | ≈ | ≈ | ≈ | ≈ |
| | D3 (0FFFC) | D3 (0FFFD) | D3 (0FFFE) | D3 (0FFFF) |
| 24000 | D3 (10000) | | | |
| | | | | |
| | ≈ | ≈ | ≈ | ≈ |
| | | | | |
| 2FFFF | | | | |

Fig.23

```
Allocation : code 1  → 00000 - 1FFFF
           : code 3  → 20000 - 2FFFF
Bit Width  : code 1  → 4
           : code 3  → 2
Existence  : code 1  → 00000 - 08000
           : code 3  → 20000 - 24000
```

Fig.24

| | | | |
|---|---|---|---|
| 00000 | D1 (00000) | | D1 (00001) | |
| | D1 (00002) | | D1 (00003) | |
| | D1 (00004) | | D1 (00005) | |
| | ≈ | | ≈ | ≈ |
| | D1 (3FFFC) | | D1 (3FFFD) | |
| | D1 (3FFFE) | | D1 (3FFFF) | |
| 20000 | D1 (40000) | | D1 (40001) | |
| | D1 (40002) | | D1 (40003) | |
| | ≈ | | ≈ | ≈ |
| | D1 (47FFE) | | D1 (47FFF) | |
| 24000 | D1 (48000) | | | |
| | D3 (10004) | D3 (10005) | D3 (10006) | D3 (10007) |
| | D3 (10008) | D3 (10009) | D3 (1000A) | D3 (1000B) |
| | ≈ | ≈ | ≈ | ≈ ≈ |
| | D3 (3FFF8) | D3 (3FFF9) | D3 (3FFFA) | D3 (3FFFB) |
| 2FFFF | D3 (3FFFC) | D3 (3FFFD) | D3 (3FFFE) | D3 (3FFFF) |

Fig.25

| Allocation: | code 1 | → 00000 – 1FFFF |
| | code 3 | → 20000 – 2FFFF |
| Bit Width : | code 1 | → 4 |
| | code 3 | → 2 |
| Existence : | code 1 | → 00000 – 24000 |
| | code 3 | → 24001 – 2FFFF |

Fig.29

| | | |
|---|---|---|
| Allocation: | code 1 | → 00000 – 0FFFF |
| | code 3 | → 10000 – 2FFFF |
| Bit Width : | code 1 | → 8 |
| | code 3 | → 16 |
| Existence : | code 1 | → 00000 – 04000 |
| | code 3 | → 10000 – 18000 |

Fig.31

| Allocation | : code 1 | → 00000 – 0FFFF |
|---|---|---|
| | : code 3 | → 10000 – 2FFFF |
| Bit Width | : code 1 | → 8 |
| | : code 3 | → 16 |
| Existence | : code 1 | → 00000 – 14000 |
| | : code 3 | → 14001 – 2FFFF |

Fig. 48

|  | Time → |  |  |  |  |  |  |  |  |  |
|---|---|---|---|---|---|---|---|---|---|---|
| First buffer memory | 10 | 11 | 12 | 13 | 14 | 15 | 16 | 17 | 18 | 19 |
| Second buffer memory | 20 | 21 | 22 | 23 | 24 | 25 | 26 | 27 | 28 | 29 |
| Third buffer memory | 30 | 31 | 32 | 33 | 34 | 35 | 36 | 37 | 38 | 39 |
| Fourth buffer memory | 40 | 41 | 42 | 43 | 44 | 45 | 46 | 47 | 48 | 49 |

Fig. 49

|  | Time → |  |  |  |  |  |  |  |  |  |
|---|---|---|---|---|---|---|---|---|---|---|
| First buffer memory | 10 | 11 | 12 | 13 | 14 | 15 | 16 | 17 | 18 | 19 |
| Second buffer memory | 20 | 21 | 22 | 23 | 24 | 25 | 26 | 27 | 28 | 29 |
| Third buffer memory | 30 | 31 | 32 | 33 | 34 | 35 | 36 | 37 | 38 | 39 |
| Fourth buffer memory | 40 | 41 | 42 | 43 | 44 | 45 | 46 | 47 | 48 | 49 |

Fig. 50

|  | Time → |  |  |  |  |  |  |  |  |  |
|---|---|---|---|---|---|---|---|---|---|---|
| First buffer memory | 10 | 11 | 12 | 13 | 14 | 15 | 16 | 17 | 18 | 19 |
| Second buffer memory | 20 | 21 | 22 | 23 | 24 | 25 | 26 | 27 | 28 | 29 |
| Third buffer memory | 30 | 31 | 32 | 33 | 34 | 35 | 36 | 37 | 38 | 39 |
| Fourth buffer memory | 40 | 41 | 42 | 43 | 44 | 45 | 46 | 47 | 48 | 49 |

Fig. 51

|  | Time → |  |  |  |  |  |  |  |  |  |
|---|---|---|---|---|---|---|---|---|---|---|
| First buffer memory | 10 | 11 | 12 | 13 | 14 | 15 | 16 | 17 | 18 | 19 |
| Second buffer memory | 20 | 21 | 22 | 23 | 24 | 25 | 26 | 27 | 28 | 29 |
| Third buffer memory | 30 | 31 | 32 | 33 | 34 | 35 | 36 | 37 | 38 | 39 |
| Fourth buffer memory | 40 | 41 | 42 | 43 | 44 | 45 | 46 | 47 | 48 | 49 |

DIGITAL SIGNAL RECORDING APPARATUS AND A DIGITAL SIGNAL REPRODUCING APPARATUS

BACKGROUND OF THE INVENTION

1. Field of the Invention

The present invention relates to a digital signal recording apparatus for recording digital coded signals on a solid-state memory and a digital signal reproducing apparatus.

2. Description of the Related Art

Digital signal recording and reproducing apparatus using solid-state memories as recording media, as compared with those apparatus using the more conventional recording media such as magnetic tapes, magnetic disks, and optical disks, are resistant to vibrations and other types of shock and exhibit excellent characteristics such as high speed and low power consumption. Such digital signal recording and reproducing apparatus hold great promise as the next-generation recording and reproducing apparatus. However, the per-byte-cost of solid-state memories is extremely high as compared with other recording media, and this high cost has been a major factor blocking the practical realization of digital signal recording and reproducing apparatus capable of achieving long recording/reproduction times.

Signal compression techniques provide an effective means of increasing the utilization of solid-state memories and help to realize the practical utilization of digital recording and reproducing apparatus. However, the difficulty is that simply increasing the compression ratio will in turn result in recording quality degradation. In view of this difficulty, there have been proposed various methods aimed at increasing the amount of information that can be recorded while minimizing the degradation of recording quality. Among them, Japanese Laid-Open Patent Publication No. 2-305053, which is the prior art closest to the present invention, discloses the following method.

According to this prior art method, when there is a sufficient memory capacity, digital signals are encoded at a high bit rate and recorded on a solid-state memory. When the remaining capacity of the solid-state memory gets low, the data previously recorded at the high bit rate are read out of the solid-state memory and re-encoded at a lower bit rate, using a different compression algorithm than that for the previous recording, the re-encoded data then being stored into the solid-state memory. This series of operations is repeated to create free space in the solid-state memory. By varying the encoding bit rate in this manner, an increased amount of information can be recorded while minimizing the degradation in recording quality.

However, in order to create free space in the solid-state memory, the data previously recorded at the high bit rate have to be read out of the solid-state memory and re-encoded at a lower bit rate using a lower-bit-rate compression algorithm different from that for the previous recording. This increases the hardware load and decreases the efficiency. The prior art method has had a further problem that depending on the amount of data, unused space may be left in the solid-state memory, lowering the utilization of the solid-state memory.

SUMMARY OF THE INVENTION

A digital signal recording apparatus according to the present invention includes: a level encoding means for encoding a digital signal into first to N-th level data, N being an integer greater than 1; a memory means having a data storage area and an auxiliary information storage area, the data storage area being writable for the first to N-th level data; and a write control means for, when the writable area in the data storage area is exhausted, freeing at least a part of an area in the data storage area in which level data other than the first level data is stored, for storing level data including at least the first level data into the freed area in the data storage area, and for storing auxiliary information indicating attributes of the stored level data into the auxiliary information storage area.

In one embodiment of the invention, the level encoding means includes: a band dividing means for dividing the digital signal into M bands so as to output first to M-th band signals, M being an integer equal to or greater than 1; M quantizing means for quantizing the first to M-th band signals with respectively predetermined numbers of bits so as to output first to M-th quantized data having a total of Q bits, Q being an integer greater than 1; and a level dividing means for dividing the first to M-th quantized data into N levels so as to output the first to N-th level data in accordance with a predetermined rule.

In another embodiment of the invention, the level encoding means further includes: an adaptive bit allocating means for changing the numbers of bits allocated to the respective bands for quantization depending on at least one of power distribution and frequency spectral distribution of the first to M-th band signals examined at predetermined time intervals, and for changing the predetermined rule for level division depending on the numbers of bits allocated to the respective bands for quantization.

In another embodiment of the invention, the level encoding means includes: a first encoding means for encoding the digital signal into first encoded data; a first decoding means for decoding the first encoded data into the digital signal; a delay means for delaying the digital signal by a period of time required for encoding the digital signal by the first encoding means and for decoding the encoded data by the first decoding means; and a subtracting means for outputting data indicating the difference between the output of the first decoding means and the output of the delay means as second encoded data, and wherein the first encoded data is output as the first level data and the second encoded data is output as the second level data.

In another embodiment of the invention, the level encoding means further includes: a second encoding means for encoding the second encoded data into third encoded data; and wherein the first encoded data is output as the first level data and the third encoded data is output as the second level data.

In another embodiment of the invention, the first encoding means is one of an analysis-synthesis type encoding means and predictive coding type encoding means including the first decoding means, the delay means and the subtracting means.

In another embodiment of the invention, the write control means writes each of the first to N-th level data into the data storage area in a predetermined order, and when a higher level data has been written into an area in the data storage area in which a lower level data is to be written, the write control means stops writing the lower level data.

In another embodiment of the invention, an address at which the write control means stops writing the lower level data is predetermined based on bit rates of the respective first to N-th level data and a capacity of the data storage area, and wherein the write control means stops writing the lower level data when write address for writing the lower level data reaches the predetermined address.

In another embodiment of the invention, the data storage area is an area having address A to address B, and wherein the write control means writes the first level data into the area in a direction from address A to address B and writes the second level data into the area in a direction from address B to address A.

In another embodiment of the invention, the data storage area is a first area having address A to address B, the first area including a second area having address A' to address B, address A' being provided between address A and address B, and wherein the write control means writes the first level data into the first area in a direction from address A to address B and writes the second level data into the second area.

In another embodiment of the invention, the data storage area includes a first area having address A to address B and a second area having address C to address D, and wherein the write control means writes the first level data into the first area in a direction from address A to address B and then writes the first level data into the second area in a direction from address D to address C, writes the second level data into the second area in a direction from address C to address D, and writes the third level data alternately into the first area in a direction from address B to address A and into the second area in a direction from address D to address C.

In another embodiment of the invention, the data storage area includes a first area having address A to address B and a second area having address C to address D, the first area including a third area having address A' to address B, address A' being provided between address A and address B, the second area including a fourth area having address C' to address D, address C' being provided between address C to address D, and wherein the write control means writes the first level data into the first area in a direction from address A to address B and then writes the first level data into the second area in a direction from address D to address C, writes the second level data into the second area in a direction from address C to address D, and writes the third level data alternately into the third area and into the fourth area.

In another embodiment of the invention, the data storage area includes a first area having address A to address B and a second area having address C to address D, the first area including a third area having address A' to address B', address A' being provided between address A and address B, the address B' being provided between address A' and address B, the second area including a fourth area having address C' to address D', address C' being provided between address C to address D, address D' being provided between address C' and address D, and wherein the write control means writes the first level data into the first area in a direction from address A to address B and then writes the first level data into the second area in a direction from address D to address C, writes the second level data into the second area in a direction from address C to address D, writes the third level data alternately into the first area in a direction from address B to address A and into the second area in a direction from address D to address C, and writes the fourth level data alternately into the third area and the fourth area.

In another embodiment of the invention, the data storage area includes a first area having address A to address B and a second area having address C to address D, the first area including a third area having address A' to address B' and a fourth area having address A" to address B, address A' being provided between address A and address B, the address B' being provided between address A' and address B, address A" being provided between address A' and address B', the second area including a fifth area having address C' to address D' and a sixth area having address C" to address D, address C' being provided between address C to address D, address D' being provided between address C' and address D, address C" being provided between address C' to address D', and wherein the write control means writes the first level data into the first area in a direction from address A to address B and then writes the first level data into the second area in a direction from address D to address C, writes the second level data into the second area in a direction from address C to address D, writes the third level data alternately into the fifth area and into the sixth area, and writes the fourth level data alternately into the third area and the fourth area.

In another embodiment of the invention, the digital signal recoding apparatus further includes: evaluating means for evaluating whether the original digital signal is reconstructed with a predetermined accuracy from selected first to N'-th level data so as to output an evaluation signal indicating the evaluation result, N' being an integer smaller than N, wherein the write control means selectively writes at least one of the first to N-th level data into the data storage area in accordance with the evaluation signal.

In another embodiment of the invention, the evaluating means includes: a decoding means for decoding the selected first to N'-th level data into a digital signal; and a difference signal evaluating means for calculating the difference between the digital signal obtained by the decoding means and the original digital signal, and wherein, when the calculated difference is smaller than a predetermined value, the write control means writes only the selected first to N'-th level data into the data storage area.

In another embodiment of the invention, the level encoding means encodes the digital signal into first to N-th frequency band signals as the first to N-th level data, and wherein, when the magnitude of frequency band signals other than the selected first to N'- th level data is smaller than a predetermined value, the write control means writes only the selected first to N'-th level data into the data storage area.

Alternatively, a digital signal recording apparatus according to the present invention includes: a level encoding means for encoding a digital signal into first to N-th level data; a buffer memory means for storing the first to N-th level data; a memory means having a data storage area which is writable for the first to N-th level data and an auxiliary information storage area; a data amount calculating means for calculating the total amount of the first to N-th level data stored in the buffer memory means; and a write control means for comparing the total amount of the first to N-th level data with a capacity of the data storage area, for selecting data from the first to N-th level data stored in the buffer memory means according to the comparison result, and for storing the selected data into the data storage area and auxiliary information associated with the selected data into the auxiliary information storage area.

In another embodiment of the invention, when the total amount of data is greater than the capacity of the data storage area, the write control means stores the selected data from the first to N-th level data into the data storage area.

In another embodiment of the invention, the buffer memory means has a plurality of blocks, each of the plurality of blocks having a different number, and wherein, when the total amount of data is greater than the capacity of the data storage area, the write control means selects data having a total amount which is equal to the capacity of the data storage area in an increasing order of the numbers assigned to the blocks of the buffer memory means, and stores the selected data into the data storage area.

In another embodiment of the invention, the first level data is the most significant data, and the significance of the second to N-th level data decreases as the number of the level increases.

In another aspect of the present invention, a digital signal reproducing apparatus includes: a memory means having a data storage area for storing level data and an auxiliary information storage area for storing auxiliary information indicating the attributes of the level data stored in the data storage area; a read control means for reading the level data stored in the data storage area and the auxiliary information stored in the auxiliary information storage area, and for specifying which level is missing in the data storage area, based on the auxiliary information; and a level decoding means for decoding the level data into a digital signal, wherein the level decoding means assigns a predetermined value to data of the specified missing level in accordance with a predetermined rule.

In another embodiment of the invention, the level data and the auxiliary information stored in the memory means are ones recorded by the digital signal recording apparatus according to the present invention.

In another embodiment of the invention, the predetermined rule includes a rule that, when two or more low-order bits of band coded data are discarded but the MSB of the band coded data is preserved, the level decoding means assigns a logic-1 to the highest-order bit of the discarded bits and assigns a logic-0 to the other bit of the discarded bits.

Thus, the invention described herein makes possible the advantage of providing a digital signal recording apparatus capable of effectively increasing the recording time, while maintaining maximum recording quality, by making effective use of memory, and a digital signal reproducing apparatus for use with the same.

This and other advantages of the present invention will become apparent to those skilled in the art upon reading and understanding the following detailed description with reference to the accompanying figures.

BRIEF DESCRIPTION OF THE DRAWINGS

FIG. 6 is a diagram showing the contents of a data storage area; when the data storage area becomes full for the first time during data recording.

FIG. 7 is a diagram showing the contents of the auxiliary information storage area when the data storage area becomes full for the first time during data recording.

FIG. 8 is a diagram showing the contents of the data storage area when the data storage area becomes full for the second time during data recording.

FIG. 9 is a diagram showing the contents of the auxiliary information storage area when the data storage area becomes full for the second time during data recording.

FIG. 10 is a diagram showing the contents of the data storage area when data recording is completed.

FIG. 11 is a diagram showing the contents of the auxiliary information storage area when data recording is completed.

FIG. 15 is a diagram showing an example of how information representing bit allocation patterns at prescribed time intervals is stored in an auxiliary information storage area.

FIG. 17 is a diagram showing the contents of the data storage area of a solid-state memory when recording is completed before the data storage area becomes full.

FIG. 18 is a diagram showing the contents of the auxiliary information storage area when recording is completed before the data storage area of the solid-state memory becomes full.

FIG. 19 is a diagram showing the contents of the data storage area of the solid-state memory when recording is completed after continuing for some time after the data storage area has become full.

FIG. 20 is a diagram showing the contents of the auxiliary information storage area when recording is completed after continuing for some time after the data storage area of the solid-state memory has become full.

FIG. 22 is a diagram showing the contents of the data storage area of a solid-state memory when recording is completed before the data storage area becomes full.

FIG. 23 is a diagram showing the contents of the auxiliary information storage area when recording is completed before the data storage area of the solid-state memory becomes full.

FIG. 24 is a diagram showing the contents of the data storage area of the solid-state memory when recording is completed after continuing for some time after the data storage area has become full.

FIG. 25 is a diagram showing the contents of the auxiliary information storage area when recording is completed after continuing for some time after the data storage area of the solid-state memory has become full.

FIG. 29 is a diagram showing the contents of the auxiliary information storage area when recording is completed before the data storage area of the solid-state memory becomes full.

FIG. 31 is a diagram showing the contents of the auxiliary information area when recording is completed after continuing for some time after the data storage area of the solid-state memory has become full.

FIGS. 48 to 50 are diagrams showing examples of methods of data selection performed by the write controller in the 18th example, when the total amount of data is larger than the capacity of the data storage area in the solid-state memory.

FIG. 51 is a diagram showing an example of a method of data selection performed by the write controller, in the 19th embodiment, when the total amount of data is larger than the capacity of the data storage area in the solid-state memory.

FIG. 52 is a block diagram showing the configuration of a digital signal reproducing apparatus of a 20th example according to the invention.

FIG. 53 is a diagram showing how level data is reconstructed into respective band coded data by a quantized code reconstructor.

FIG. 54 is a diagram showing how level data is reconstructed into the respective band coded data by the quantized code reconstructor when a readout controller did not read out fourth level data.

FIG. 55 is a diagram showing how level data is reconstructed into the respective band coded data by the quantized code reconstructor when the readout controller did not read out third and fourth level data.

FIG. 56 is a diagram showing how level data is reconstructed into the respective band coded data by the quantized code reconstructor when the readout controller did not read out second, third and fourth level data.

FIG. 57 is a block diagram showing the configuration of a band synthesizer.

FIG. 58 is a diagram showing the contents of the data storage are which the level data are stored.

FIG. 59 is a diagram showing the contents of the auxiliary information storage area associated with the level data.

DESCRIPTION OF THE PREFERRED EMBODIMENTS

The preferred embodiments of the present invention will be described below with reference to the accompanying drawings.

EXAMPLE 1

Figure 1:
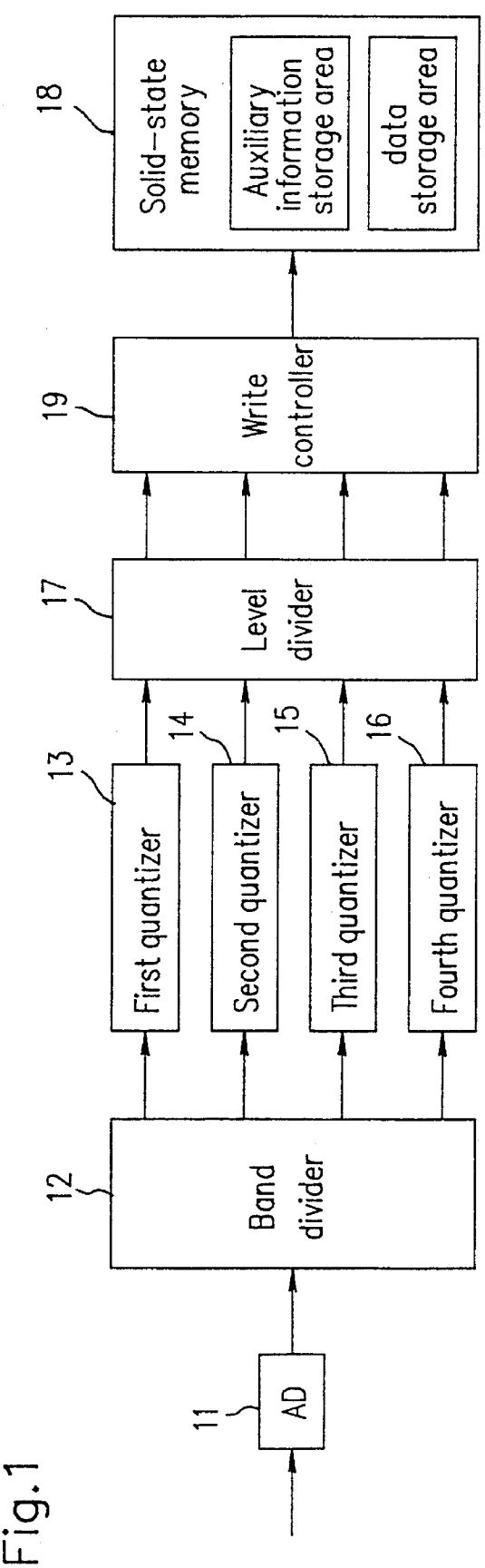
FIG. 1 is a block diagram showing the configuration of a digital signal recording apparatus of a first example according to the invention.

FIG. 1 shows a configuration for a digital signal recording apparatus of a first example according to the invention.

The digital signal recording apparatus shown in FIG. 1 includes an A/D converter 11 for converting an input analog audio signal into a 16-bit digital signal. A band divider 12 divides the 16-bit digital signal from the A/D converter 11 into four frequency band signals, i.e. the first to fourth frequency band signals. A first quantizer 13 quantizes the first frequency band signal with six bits so as to output first encoded data. A second quantizer 14 quantizes the second frequency band signal with four bits so as to output second encoded data. A third quantizer 15 quantizes the third frequency band signal with three bits so as to output third encoded data. A fourth quantizer 16 quantizes the fourth frequency band signal with three bits so as to output fourth encoded data. A level divider 17 receives the first to fourth encoded data, a total of 16 bits. Each bit of the 16 bits received from quantizers 13–16 is assigned to one of four levels. Each of the first to fourth level data consists of four bits. A solid-state memory 18 has a data storage area for storing the data encoded by the level divider 17 and an auxiliary information storage area for storing auxiliary information indicating the attributes of the thus stored data, which may include the level assigned to each bit. A write controller 19 determines when writable space in the solid-state memory 18 is exhausted. If writable space is exhausted, at least a part of the data areas in the memory 18 allocated to level data other than the first level data are freed. Data in the solid-state memory 18 assigned to the first level are kept intact. Accordingly, additional level data, including at least first level data, can be written into the freed data area.

In the present specification, the expression of "freeing a data area" means that the data area is put into a state where any new data is allowed to be written into the data area even when old data have been already written into the area.

Figure 2:
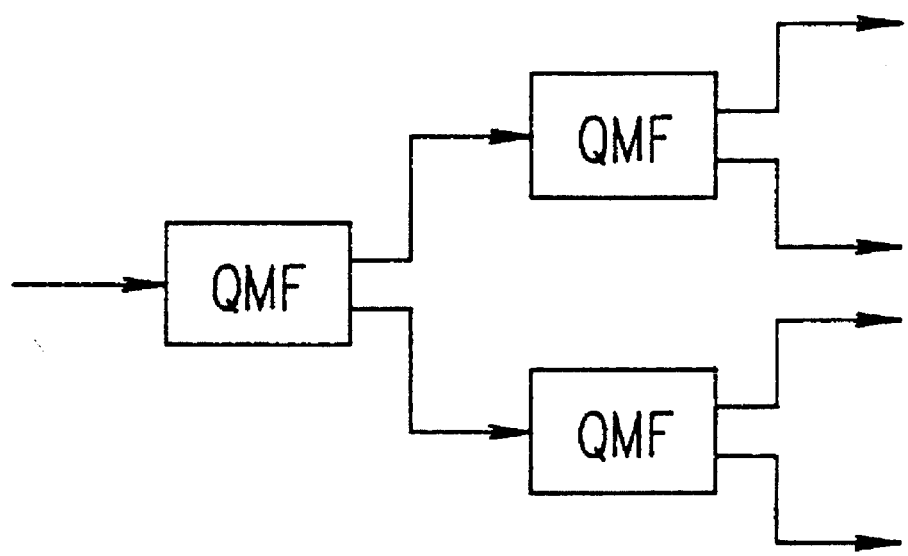
FIG. 2 is a block diagram showing an example of a band divider.

FIG. 2 shows a configuration for the band divider 12 shown in FIG. 1. As shown in FIG. 2, the band divider 12 is a quadrature-mirror-filter (QMF) bank including two stages of QMFs. This configuration is commonly used as a band divider (see, "Digital Signal Processing Handbook, pp. 135–137, 1993," compiled by The Institute of Electronics, Information and Communication Engineers, which is herein incorporated by reference; hereinafter this reference is referred to as "DSP Handbook"). In this example, a QMF filter bank is used as an example of the band divider 12. However, it will be appreciated that a polyphase filter bank or a hybrid polyphase/MDCT filter bank, such as practiced in MPEG audio encoding algorithms also may be used as the band divider 12 (see, ISO/IEC 11172-3:1993 (E), pp. 96–97, 1993, which is herein incorporated by reference; hereinafter this reference is referred to as "ISO/IEC").

Furthermore, in this example, the numbers of bits of the first to fourth quantizers 13 to 16 are previously set to 6, 4, 3 and 3, respectively. However, the numbers of bits may be set in other ways, for example, 6, 5, 3, and 2, respectively. In this example, the first to fourth quantizers 13 to 16 are linear quantizers for performing linear quantization with the respectively predetermined numbers of bits as described above. However, the quantizers 13 to 16 may be quantizers for performing nonlinear conversion using logarithmic or hyperbolic functions (see, "DSP Handbook", pp. 16–17). Furthermore, the quantizers 13 to 16 may be quantizers for performing quantization while normalizing the amplitude in accordance with the amplitude value of an input signal, as practiced in MPEG audio encoding algorithms (see, "ISO/IEC", pp. 71–72).

Figure 3:
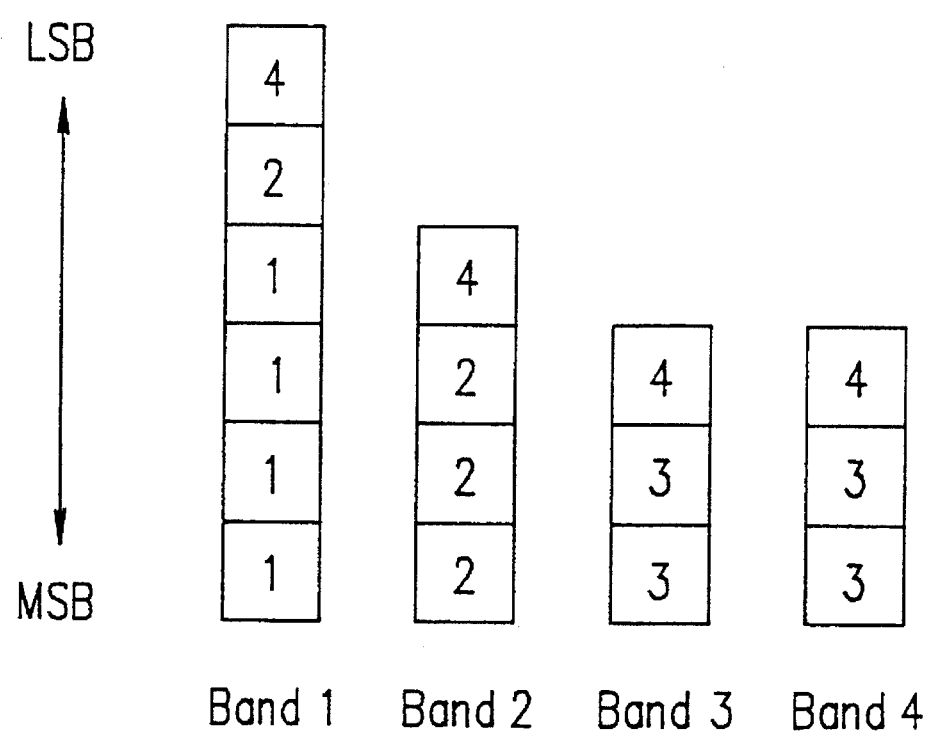
FIG. 3 is a diagram showing an example of how encoded data are mapped to respective levels by a level divider.

FIG. 3 shows an exemplary level division of the 16 bits of the first to fourth encoded data into the first to fourth levels by the level divider 17 in a case where the numbers of bits allocated to the first to fourth frequency bands are 6, 4, 3 and 3, respectively. The number in each box in FIG. 3 indicates the level-assigned to each bit. As is shown in FIG. 3, the level divider 17 generates first to fourth level data having the following structure. Each level is assigned four bits. The first level data consists of the four high-order bits of the first encoded data. The second level data consists of the second LSB of the first encoded data and the three high-order bits of the second encoded data. The third level data consists of the two high-order bits of the third encoded data and the two high-order bits of the fourth encoded data. The fourth level data consists of the LSB of each of the first to fourth encoded data.

The level division mentioned above is based on an idea that information of a lower frequency band and information of a higher order bit in each frequency band are more significant. It is sufficient for the present invention to divide the encoded data into a predetermined number of levels in accordance with the significance of data, and therefore, the method of level division is not limited to the one illustrated above. For example, the method of level division may vary depending on whether information to be reproduced relies on the band or on the energy of each band.

Figure 4:
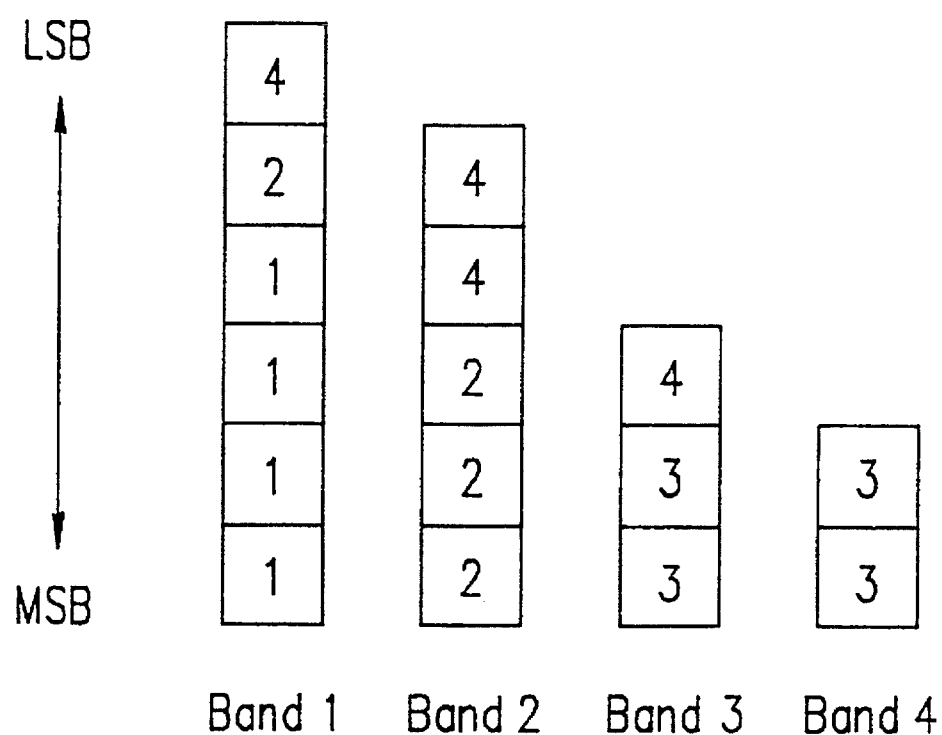
FIG. 4 is a diagram showing another example of how encoded data are mapped to respective levels by the level divider.

FIG. 4 shows another exemplary level division of the 16 bits of the first to fourth encoded data into the first to fourth levels by the level divider 17 in a case where the numbers of bits allocated to the first to fourth bands are 6, 5, 3 and 2, respectively. The number in each box in FIG. 4 indicates the number of the level for each bit. As is shown in FIG. 4, the level divider 17 generates first to fourth level data having the following structure: the first level data consists of the four high-order bits of the first encoded data; the second level data consists of the second LSB of the first encoded data and the three high-order bits of the second encoded data, a total of four bits; the third level data consists of the two high-order bits of the third encoded data and the two high-order bits of the fourth encoded data, a total of four bits; and the fourth level data consists of the LSB of the first encoded data, the two low-order bits of the second encoded data, and the LSB of the third encoded data, a total of four bits.

Figure 5:
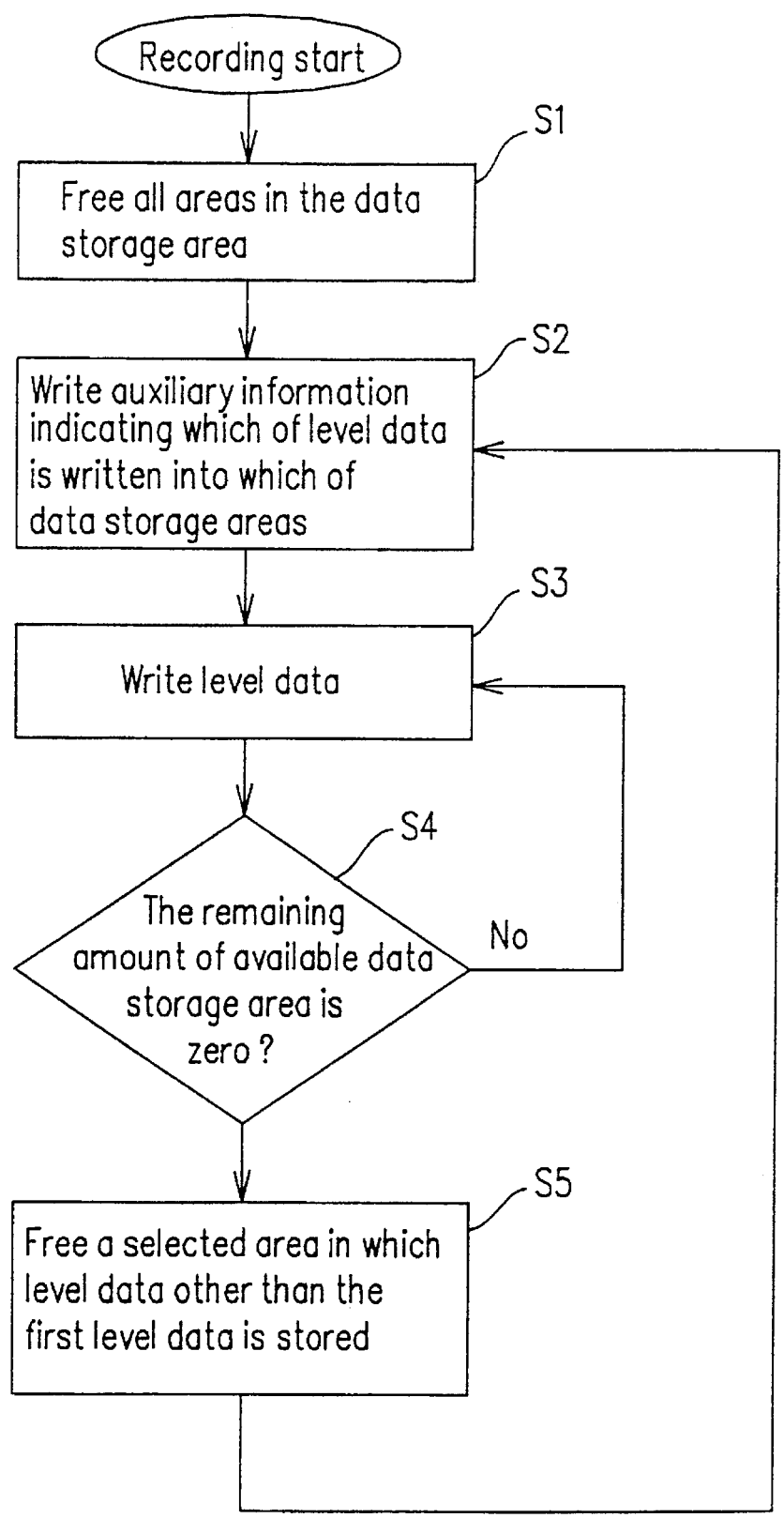
FIG. 5 is a flowchart illustrating the operation of a write controller.

FIG. 5 is a flowchart illustrating the operation of the write controller 15.

FIG. 6 shows the contents of the data storage area when the data storage area becomes full for the first time during data recording.

FIG. 7 shows the contents of the auxiliary information storage area when the data storage area becomes full for the first time during data recording.

FIG. 8 shows the contents of the data storage area when the data storage area becomes full for the second time during data recording.

FIG. 9 shows the contents of the auxiliary information storage area when the data storage area becomes full for the second time during data recording.

FIG. 10 shows the contents of the data storage area when the data recording is completed.

FIG. 11 shows the contents of the auxiliary information storage area when the data recording is completed.

The operation of the digital signal recording apparatus having the above configuration will be described below with reference to FIGS. 1 to 11.

Referring to FIG. 1, the input analog audio signal is converted by the A/D converter 11 into a 16-bit digital signal. The 16-bit digital signal is then band-divided by the band divider 12 into four band signals, i.e. the first to fourth band signals. The band division is achieved by using the QMF filter bank as shown in FIG. 2.

The first quantizer 13 quantizes the first band signal with six bits and outputs first encoded data. The second quantizer 14 quantizes the second band signal with four bits and outputs second encoded data. The third quantizer 15 quantizes the third band signal with three bits and outputs third encoded data. The fourth quantizer 16 quantizes the fourth band signal with three bits and outputs fourth encoded data.

The level divider 17 receives a total of 16 bits of encoded data, the first to fourth encoded data, and outputs first to fourth level data, each of first to fourth level data consisting of four bits, as shown in FIG. 3.

Referring to FIG. 5, the write controller 19 frees all areas in the data storage area at the start of recording (step S1). The write controller 19 writes into the auxiliary information storage area the auxiliary information indicating which of the level data is written into which area of the data storage area (step S2). The write controller 19 receives the level data from the level divider 17 and writes the level data into the respective areas in the data storage area (step S3). In this example, all of the level data from the first to fourth level data are selectively written into the respective areas in the data storage area.

FIG. 6 shows the contents of the data storage area when the data storage area becomes full with the first to fourth level data stored in the above manner. In this example, the first level data is stored in an area from address 0000 to address 0FFF, the second level data is stored in an area from address 1000 to address 1FFF, the third level data is stored in an area from address 2000 to address 2FFF, and the fourth level data is stored in an area from address 3000 to address 3FFF.

FIG. 7 shows the contents of the auxiliary information storage area when the data storage area becomes full with the first to fourth level data stored in the above manner. The contents show that the first level data is stored in the area from address 0000 to address 0FFF, the second level data in the area from address 1000 to address 1FFF, the third level data in the area from address 2000 to address 2FFF, and the fourth level data in the area from address 3000 to address 3FFF.

The write controller 19 detects the remaining amount of the available data storage area and judges whether the remaining amount of the available data storage area reaches zero or not (step S4 in FIG. 5). When the data storage area becomes full with the first to fourth level data, the write controller 19 looks up for the auxiliary information storage area, frees a selected area of the data storage area, and writes a specific level data generated by the level divider 17 into the freed area (step S5 in FIG. 5). In this example, the areas from address 2000 to address 3FFF, where the third and fourth level data are stored, are freed, and first and second level data generated by the level divider 17 are selected and written into the freed areas. The write controller 19 again writes into the auxiliary information storage area the information indicating which of the level data is written into which area of the data storage area (step S2 in FIG. 5).

FIG. 8 shows the contents of the data storage area when the data storage area becomes full with the new first and second level data stored in the above manner. In this example, the first level data is stored in the area from address 0000 to address 0FFF, the second level data in the area from address 1000 to address 1FFF, the new first level data in the area from address 2000 to address 2FFF, and the new second level data in the area from address 3000 to address 3FFF.

FIG. 9 shows the contents of the auxiliary information storage area when the data storage area becomes full with the new first and second level hierarchic data stored in the above manner. The contents show that the new first level data is stored in the area from address 2000 to address 2FFF, and the new second level data in the area from address 3000 to address 3FFF.

When the data storage area becomes full with the new first and second level data, the write controller 19 looks up for the auxiliary information storage area, frees a selected area of the data storage area, and writes a specific level data generated by the level divider 17 into the freed area (step S5 in FIG. 5). In this example, the area from address 3000 to address 3FFF, where the new second level data is stored, is freed, and a first level data generated by the level divider 17 is selected and written into the freed area. The write controller 19 again writes into the auxiliary information storage area the information indicating which of the level data is written into which area of the data storage area (step S2 in FIG. 5).

FIG. 10 shows the contents of the data storage area when the new first level data has been stored in the above manner, completing the data recording. As shown in FIG. 10, the first level data is stored in the area from address 0000 to address 0FFF, the second level data in the area from address 1000 to address 1FFF, the first level data in the area from address 2000 to address 2FFF, and the new first level hierarchic data in the area from address 3000 to address 3FFF.

FIG. 11 shows the contents of the auxiliary information storage area when the new first level data has been stored in the above manner, completing the data recording. The contents show that the new first level data is stored in the area from address 3000 to address 3FFF.

What is critical in the above process is that no new level data are written into the areas of the data storage area in which the most significant level data (i.e. the first level data) has been already written, and also that a first level data is written in an area of the data storage area at any time.

As described above, the digital signal recording apparatus of this example includes: an A/D converter for converting an input analog audio signal into a 16-bit digital signal; a band divider for dividing the digital signal into M bands (M≧1); M quantizers each for receiving one of M band signals generated by the band divider and for quantizing the received band signal with a predetermined number of quantization bits; a level divider for receiving the quantized data of Q bits and for dividing the quantized data of Q bits into N levels (N>1) in accordance with a predetermined method; a solid-state memory having a data storage area for storing the level data obtained by the level divider, and an auxiliary information storage area for storing auxiliary information indicating the attributes of the level data; and a write controller for, when writable space in the solid-state memory is exhausted, freeing at least a part of the data areas in which level data other than the first level data is stored, while keeping at least the first level data intact, and for storing level data including at least first level data into the thus freed data area, the number of the stored level data being equal to N or smaller than N.

Thus, each time the data storage area becomes full, at least a part of the data areas in which level data excluding the first level data is freed, while holding at least the first level data in the data storage area, and level data including at least new first level data is stored in the freed area. The number of the newly stored level data is equal to N or smaller than N.

As a result, the recording time can be increased effectively. Further, in decoding the encoded data, quality degradation can be prevented since the most significant encoded data (i.e. the first level data) is always held in the data storage area.

EXAMPLE 2

Figure 12:
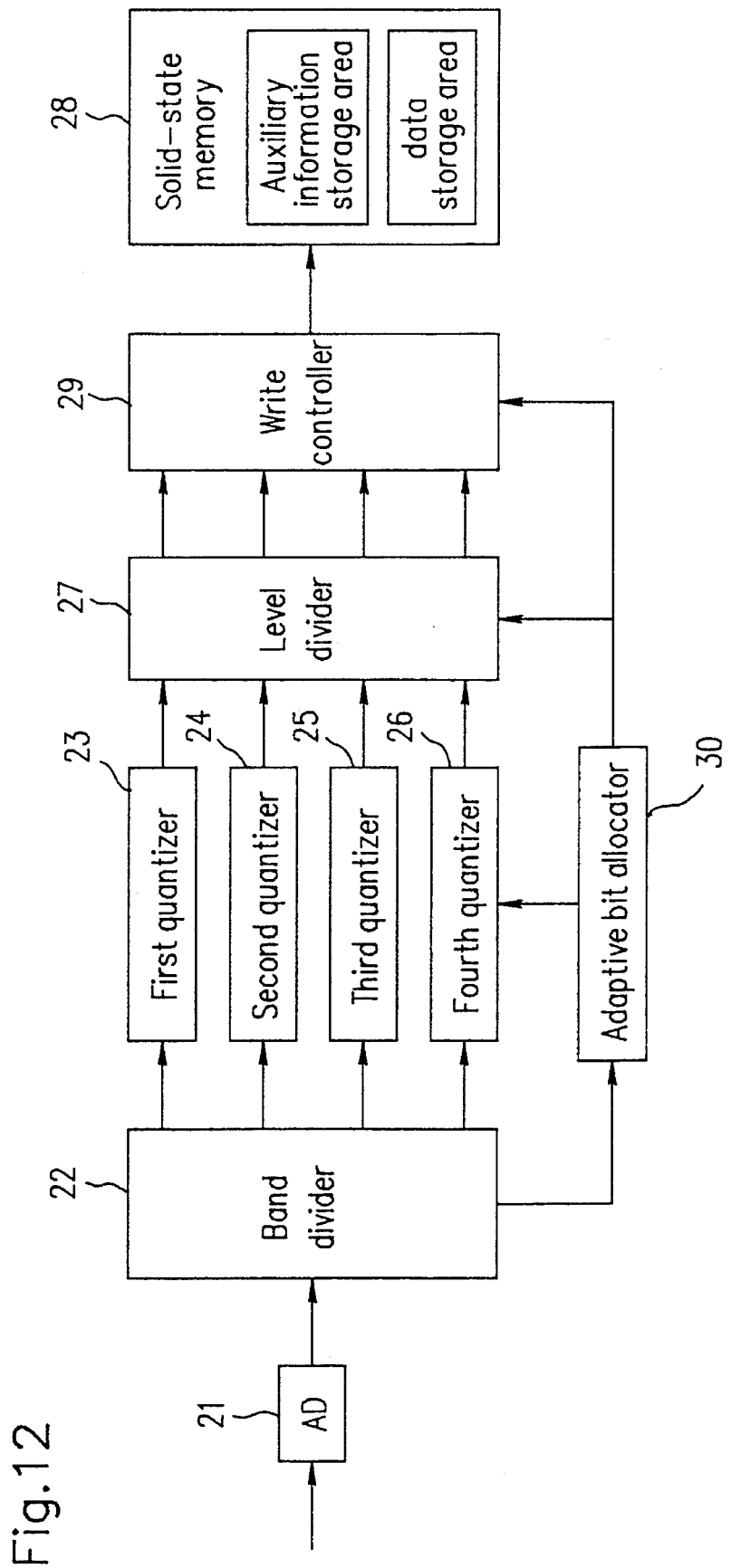
FIG. 12 is a block diagram showing the configuration of a digital signal recording apparatus of a second example according to the invention.

FIG. 12 shows a configuration for a digital signal recording apparatus of a second example according to the invention.

The digital signal recording apparatus shown in FIG. 12 includes an A/D converter 21, a band divider 22, first to fourth quantizers 23 to 26, a level divider 27, a write controller 29 and a solid-state memory 28 having a data storage area and an auxiliary information storage area. These components are the same as those in the first example.

The digital signal recording apparatus of the second example is different from that of the first example in the following four points: First, is that an adaptive bit allocator 30 is provided. The adaptive bit allocator 30 takes the four band signals from the band divider 22 at a prescribed time interval, calculates the power ratio between the four band signals during each time interval, and determines the number of bits with which each band signal is quantized in accordance with the calculated power ratio.

Second, is that the first to fourth quantizers 23 to 26 quantize the first to fourth band signals with the numbers of bits allocated to each band signal by the adaptive bit allocator 30, and output the first to fourth encoded data thus quantized.

Third, is that the level divider 27 adaptively divides the data quantized by the first to fourth quantizers into four levels. Specifically, the level division varies depending on the number of bits allocated to each band signal by the adaptive bit allocator Fourth, is that the write controller 29 writes the number of bits allocated to each band signal by the adaptive bit allocator 30 into the auxiliary information storage area in the solid-state memory 28. When writable space in the solid-state memory 28 is exhausted, the write controller 29 frees at least a part of the data areas in which level data other than the first level are stored, with holding the first level data in the solid-state memory 28, and stores level data including at least a new first level data into the freed data areas.

Figure 13:
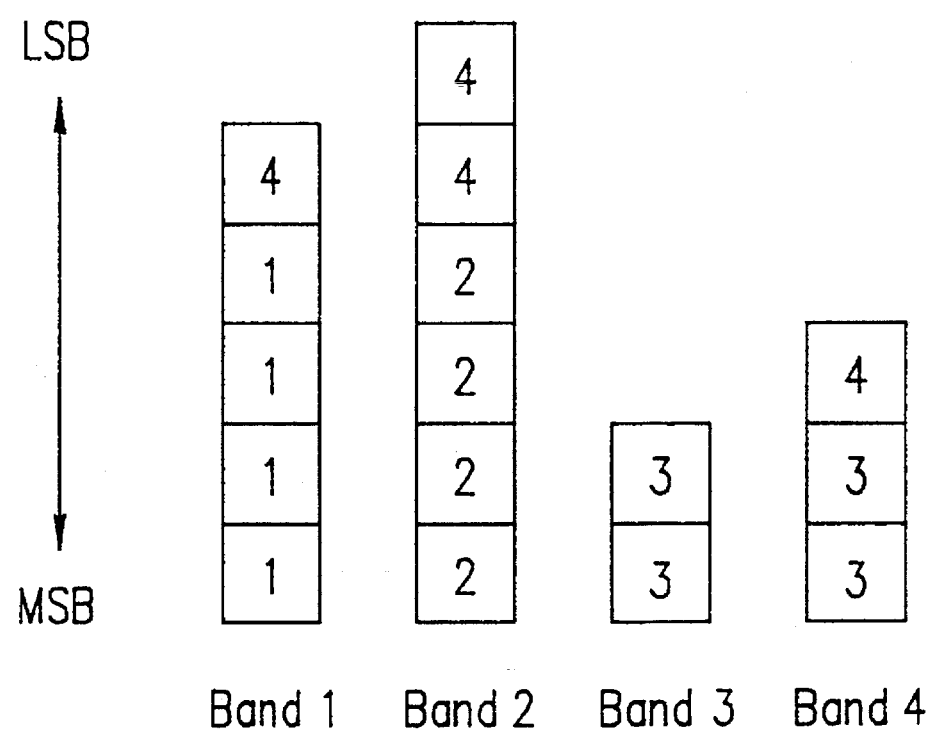
FIG. 13 is a diagram showing an example of how encoded data allocated to respective bands by an adaptive bit allocator are mapped to respective levels by a level divider.

FIG. 13 shows an exemplary level division of the 16 bits of the first to fourth encoded data into the first to fourth levels by the level divider 27 in a case where the numbers of bits allocated to the first to fourth bands by the adaptive bit allocator 30 are 5, 6, 2 and 3, respectively. The number in each box in FIG. 13 indicates the number of the level for each bit. As is shown in FIG. 13, the level divider 27 generates first to fourth level data having the following structure: the first level data consists of the four high-order bits of the first encoded data; the second level data consists of the four high-order bits of the second encoded data; the third level data consists of the two high-order bits of the third encoded data and the two high-order bits of the fourth encoded data, a total of four bits; and the fourth level data consists of the LSB of the first encoded data, the two low-order bits of the second encoded data, and the LSB of the fourth encoded data, a total of four bits.

The level division mentioned above is based on an idea that information of a lower frequency band and information of a higher order bit in each frequency band are more significant. It is sufficient for the present invention to divide the encoded data into a predetermined number of levels in accordance with the significance of data, and therefore, the method of level division is not limited to the one illustrated above.

Figure 14:
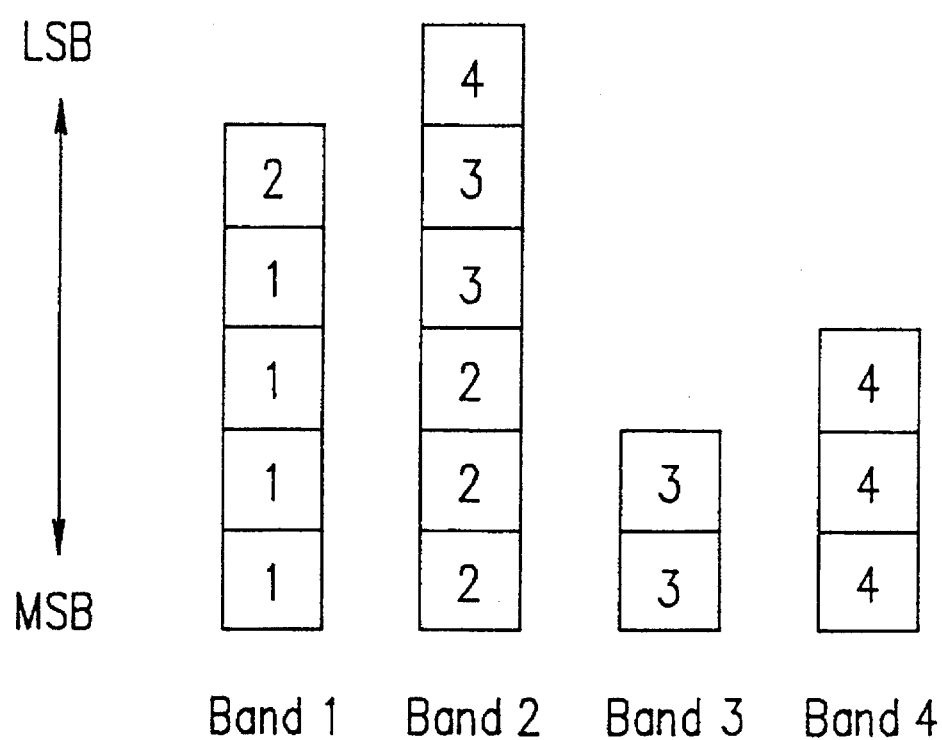
FIG. 14 is a diagram showing another example of how encoded data allocated to respective bands by the adaptive bit allocator are mapped to respective levels by the level divider.

FIG. 14 shows another exemplary level division of the 16 bits of the first to fourth encoded data into the first to fourth levels by the level divider 27 in a case where the numbers of bits allocated to the first to fourth bands by the adaptive bit allocator 30 are 5, 6, 2 and 3, respectively. The number in each box in FIG. 14 indicates the number of the level for each bit. As is shown in FIG. 14, the level divider 27 generates first to fourth level data having the following structure: the first level data consists of the four high-order bits of the first encoded data; the second level data consists of the three high-order bits of the second encoded data and the LSB of the first encoded data, a total of four bits; the third level data consists of the two high-order bits of the third encoded data and the second and third LSBs of the second encoded data, a total of four bits; and the fourth level data consists of the LSB of the second encoded data and the three bits of the fourth encoded data, a total of four bits.

FIG. 3 shows another exemplary level division of the 16 bits of the first to fourth encoded data into the first to fourth levels by the level divider 27 in a case where the numbers of bits allocated to the first to fourth bands by the adaptive bit allocator 30 are 6, 4, 3 and 3, respectively. The method of level division is already described, and therefore, the description thereof is omitted.

FIG. 4 shows another exemplary level division of the 16 bits of the first to fourth encoded data into the first to fourth levels by the level divider 27 in a case where the numbers of bits allocated to the first to fourth bands by the adaptive bit allocator 30 are 6, 5, 3 and 2, respectively. The method of level division is already described, and therefore, the description thereof is omitted.

Figure 15:
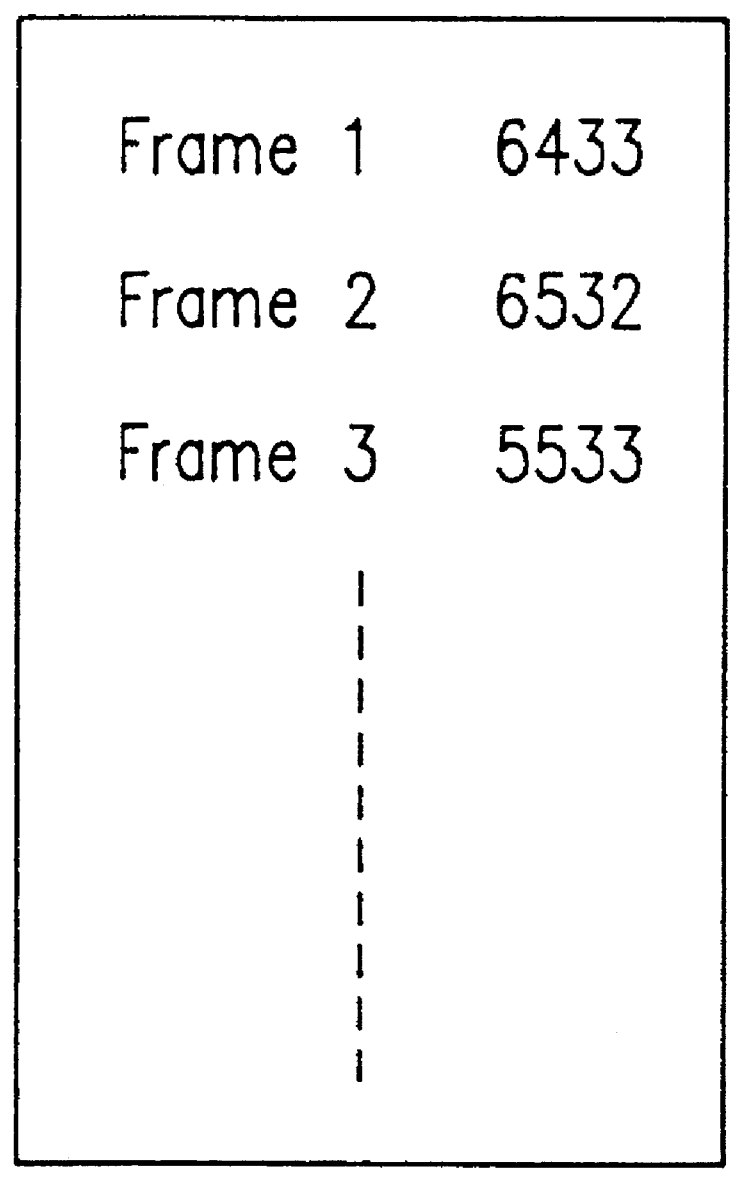

FIG. 15 shows the contents of the auxiliary information storage area in which information indicating a bit allocation pattern is stored at a predetermined time interval.

The operation of the digital signal recording apparatus having the above configuration will be described below with reference to FIGS. 12 to 15 as well as FIGS. 3 and 4.

Referring to FIG. 12, the input analog audio signal is converted by the A/D converter 21 into a 16-bit digital signal. The 16-bit digital signal is then band-divided by the band divider 22 into four band signals, the first to fourth band signals. These processes are the same as those in the first example.

Next, the adaptive bit allocator 30 takes the four band signals from the band divider 22 at a predetermined time interval, calculates the power ratio between the four band signals during each time interval, and determines the number of bits with which each band signal is quantized in accordance with the calculated power ratio. In this example, bits are adaptively allocated simply according to the power ratio between the bands. However, a psychoacoustic model that takes advantage of the masking characteristics of human hearing may be used, as practiced in MPEG audio encoding, etc. (see, "ISO/IEC" pp. 110–116).

Next, the first to fourth quantizers 23 to 26 quantize the first to fourth band signals with the numbers of bits respectively allocated to the first to fourth bands by the adaptive bit allocator 30, and output the first to fourth encoded data thus quantized.

The level divider 27 divides the first to fourth encoded data into four levels by using the method of level division which adaptively varies depending on the number of bits allocated to each band by the adaptive bit allocator 30.

FIG. 13 shows by way of example how the 16 bits from the first to fourth encoded data are mapped to the respective levels by the level divider 27 in a case where the numbers of bits allocated to the first to fourth bands by the adaptive bit allocator 30 are 5, 6, 2 and 3, respectively.

FIG. 3 shows by way of example how the 16 bits from the first to fourth encoded data are mapped to the respective levels by the level divider 27 in a case where the numbers of bits allocated to the first to fourth bands by the adaptive bit allocator 30 are 6, 4, 3 and 3, respectively.

FIG. 4 shows by way of example how the 16 bits from the first to fourth encoded data are mapped to the respective levels by the level divider 27 in a case where the numbers of bits allocated to the first to fourth bands by the adaptive bit allocator 30 are 6, 5, 3 and 2, respectively.

In this manner, the level divider 27 changes the mapping of the bits into the respective levels in accordance with the number of bits allocated to each band by the adaptive bit allocator 30. The mapping of the bits into the respective levels may be predetermined for each allocated bit pattern, as described above, or may be determined as necessary in accordance with a predetermined priority rule.

The write controller 29 writes the output level data into the solid-state memory 28 together with their associated auxiliary information. This process is the same as that in the first example, except that the information indicating the bit allocation pattern is also written into the auxiliary information storage area at each predetermined time interval. The bit allocation pattern is calculated at each predetermined time interval.

FIG. 15 shows by way of example how the information indicating the bit allocation pattern for each time interval is stored in the auxiliary information storage area. In FIG. 15, "Frame 1 6433" means that 6 bits are allocated to the first band, 4 bits to the second band, 3 bits to the third band, and 3 bits to the fourth band in a first time interval. Similarly, "Frame 2 6532" means that 6 bits are allocated to the first band, 5 bits to the second band, 3 bits to the third band, and 2 bits to the fourth band in a second time interval. "Frame 3 5539" means that 5 bits are allocated to the first band, 5 bits to the second band, 3 bits to the third band, and 3 bits to the fourth band in a third time interval.

As described above, the digital signal recording apparatus of this example includes an adaptive bit allocator for allocating the number of bits with which each band signal is quantized in accordance with the power distribution or frequency spectral distribution of each band signal at predetermined time intervals, and M quantizers for quantizing M band signals with the respective numbers of bits determined by the adaptive bit allocator. With this configuration, the recording time can be increased effectively. Further, in decoding the encoded data, quality degradation can be prevented since the most significant data (i.e. the first level data) is held in the solid-state memory at any time. Furthermore, since the method of level division is adaptively varied depending on the frequency distribution of the input signal, quality degradation of the encoded data can be minimized even if lower-order level data is dropped.

EXAMPLE 3

Figure 16:
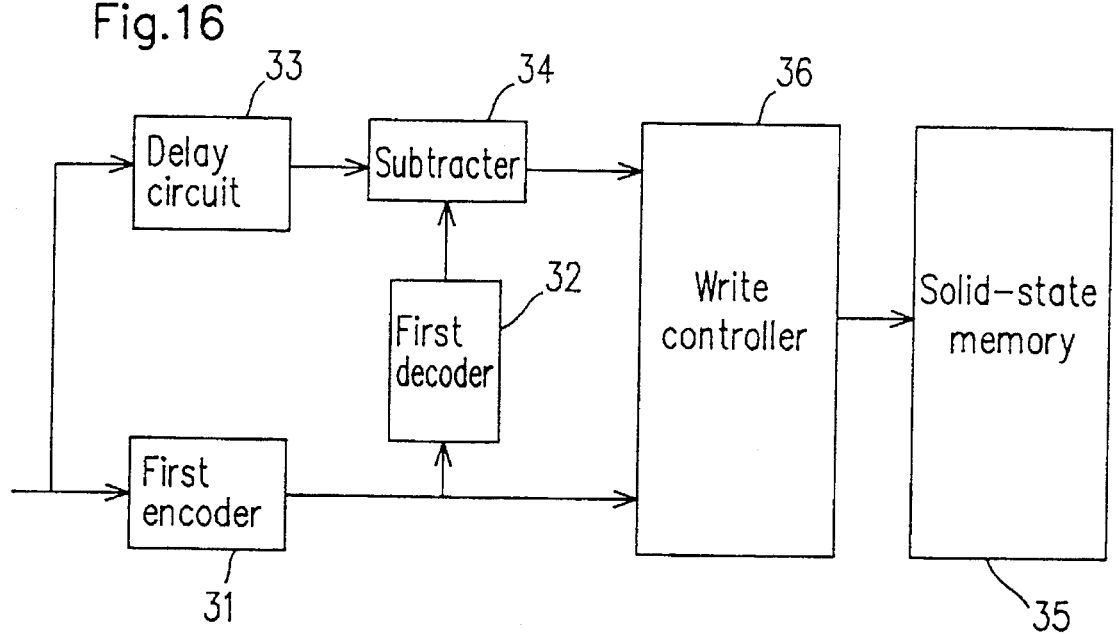
FIG. 16 is a block diagram showing the configuration of a digital signal recording apparatus of a third example according to the invention.

FIG. 16 shows a configuration for a digital signal recording apparatus of a third example according to the invention. The digital signal recording apparatus shown in FIG. 16 includes a first encoder 31 for compression-encoding an input digital signal of 16 bits into first encoded data; a first decoder 32 for decoding the first encoded data into the original digital signal; a delay circuit 33 for delaying the input digital signal by a period of time required for the encoding of the input digital signal into the first encoded data by the first encoder 31 and the decoding of the first encoded data into the original digital signal by the first decoder 32; a subtracter 34 for obtaining the difference between the output of the first decoder 32 and the output of the delay circuit 33 and for outputting the resulting difference as second encoded data; a solid-state memory 35 having a data storage area for storing the first and second encoded data, and an auxiliary information storage area for storing auxiliary information indicating the attributes of the data storage area as well as the attributes of the data stored therein; and a write controller 36 for, when writable space exists in the data storage area, storing the first and second encoded data into the data storage area, and for, when the writable space in the data storage area is exhausted, discarding whole or part of the second encoded data stored in the data storage area and stores the first encoded data in the area where the discarded data was stored, while at the same time, storing the associated auxiliary information into the auxiliary information storage area.

The first encoder 31 may be any type of commonly used encoder, such as PCM, ADPCM, CELP, or like decoder. The first decoder 32 is one that matches the first encoder 31. Further, it is assumed here that the data storage area has a memory capacity of eight bits per address.

FIG. 17 shows the contents of the data storage area in the solid-state memory 35 when the recording process is completed before the data storage area becomes full.

FIG. 18 shows the contents of the auxiliary information storage area in the solid-state memory 35 when the recording process is completed before the data storage area becomes full.

FIG. 19 shows the contents of the data storage area in the solid-state memory 35 when the recording process is completed after continuing for some time after the data storage area has become full.

FIG. 20 shows the contents of the auxiliary information storage area in the solid-state memory 35 when the recording process is completed after continuing for some time after the data storage area has become full.

The operation of the digital signal recording apparatus having the above configuration will be described below with reference to FIGS. 16 to 20.

Referring to FIG. 16, the input digital signal, 16 bits per sample, is compression-encoded by the first encoder 31 into data of four bits per sample. The first encoder 31 outputs the data of four bits per sample as first encoded data. The first decoder 32 decodes the first encoded data into the original digital signal. The delay circuit 33 delays the input digital signal by a period of time T required for the compression encoding and decoding. The subtracter 34 outputs the difference signal between the output of the first decoder 32 and the output of the delay circuit 33 as second encoded data. It is assumed here that the difference signal output from the subtracter 34 has an amplitude which is represented by eight bits. As long as an empty space exists in the data storage area in the solid-state memory 35, the write controller 36 stores the first and second encoded data into the data storage area in the solid-state memory 35.

Herein, it is assumed that each two of the first encoded data are stored at one address, whereas each one of the second encoded data is stored at one address. This is because the first encoded data consists of four bits per sample, whereas the second encoded data consists of eight bits per sample. It is further assumed that the data storage area has a capacity of 30000 addresses, and the first encoded data are sequentially stored at addresses from 00000 through 0FFFF, while the second encoded data are sequentially stored at addresses from 10000 through 2FFFF. This address allocation is based on the fact that the second encoded data requires a storage area two times as large as that for the first encoded data, because the first encoded data consists of four bits per sample and the second encoded data consists of eight bits per sample.

FIG. 17 shows the contents of the data storage area in the solid-state memory 35 when the recording process is completed before the data storage area becomes full. In FIG. 17, "D1(t)" denotes the first encoded data at time t, and "D2(t)" denotes the second encoded data at time t.

FIG. 18 shows the contents of the auxiliary information storage area corresponding to the data storage area shown in FIG. 17. As shown in FIG. 18, there are three types of information, allocation information denoted by "Allocation", bitwidth information denoted by "BitWidth" and existence information denoted by "Existence", which are stored in the auxiliary information storage area. In this example, the allocation information indicates that the first encoded data is allocated to an area from address 00000 to address 0FFFF, while the second encoded data is allocated to an area from address 10000 to address 2FFFF. The bitwidth information indicates that the first encoded data consists of four bits per sample, while the second encoded data consists of eight bits per sample. The existence information indicates that the first encoded data are currently stored at address 0000 to address 04000 while the second encoded data are currently stored at address 10000 to address 18000.

In a case where the recording process is not completed before the data storage area in the solid-state memory 35 has become full, the write controller 36 proceeds to store only the first encoded data into the data storage area in the solid-state memory 35. In this case, the first encoded data are sequentially overwritten into an area from address 10000 to address 2FFFF. As a result, the second encoded data previously stored at address 10000 to address 2FFFF are sequentially discarded, as the first encoded data are sequentially stored in the area in which the discarded second encoded data was previously stored. The recording time can thus be extended even after the solid-state memory 35 has become full.

FIG. 19 shows the contents of the data storage area in the solid-state memory 35 when the recording process is completed after continuing for some time after the data storage area has become full. In FIG. 19, "D1(t)" denotes the first encoded data at time t, and "D2(t)" denotes the second encoded data at time t. FIG. 19 shows a situation that the second encoded data previously stored at address 10000 to address 14000 were discarded since the first encoded data are stored up to address 14000.

FIG. 20 shows the contents of the auxiliary information storage area in this situation. As shown in FIG. 20, the allocation information indicates that the first encoded data is allocated to an area from address 00000 to address 0FFFF, while the second encoded data is allocated to an area from address 10000 to address 2FFFF. The bitwidth information indicates that the first encoded data consists of four bits per sample, while the second encoded data consists of eight bits per sample. The existence information indicates that the first encoded data are currently stored at address 00000 to address 14000, while the second encoded data are currently stored at address 14001 to address 2FFFF. Thus, the second data previously stored at address 10000 through address 14000 has been dropped.

As described above, the digital signal recording apparatus of this example includes: a first encoder for encoding an input digital signal into first encoded data; a first decoder for decoding the first encoded data into the original digital signal; a delay circuit for delaying the input digital signal by a period time required for the encoding of the input digital signal by the first encoder and the decoding the encoded data into the original digital signal by the first decoder; a subtracter for obtaining the difference signal between the output of the first decoder and the output of the delay circuit and for outputting the resulting difference signal as second encoded data; a solid-state memory having a data storage area for storing the first and second encoded data, and an auxiliary information storage area for storing auxiliary information indicating the attributes of the data storage area as well as the attributes of the data stored therein; and a write controller for, when data writable space exists in the data storage area, storing the first and second encoded data into the data storage area, and for, when the writable space in the data storage area is exhausted, discarding whole or part of the second encoded data stored in the data storage area and for storing the first encoded data in the area where the discarded data was stored, while at the same time, storing the associated auxiliary information into the auxiliary information storage area.

With this configuration, when an empty space exists in the solid-state memory, not only the usual compression-encoded data (the first encoded data) but also the data (the second encoded data) which would usually be lost in the compression encoding process are sequentially stored into the solid-state memory, thereby achieving higher recording quality than can be achieved by a conventional compression encoding process. Furthermore, when the empty space is exhausted, the usual compression-encoded data are retained intact, but part of the previously stored data which would usually have been lost in the compression encoding process are discarded so as to create an empty space in the solid-state memory. This makes it possible to allow the recording process to continue, and thus ensuring a recording quality at least comparable to that of the conventional compression encoding process.

EXAMPLE 4

Figure 21:
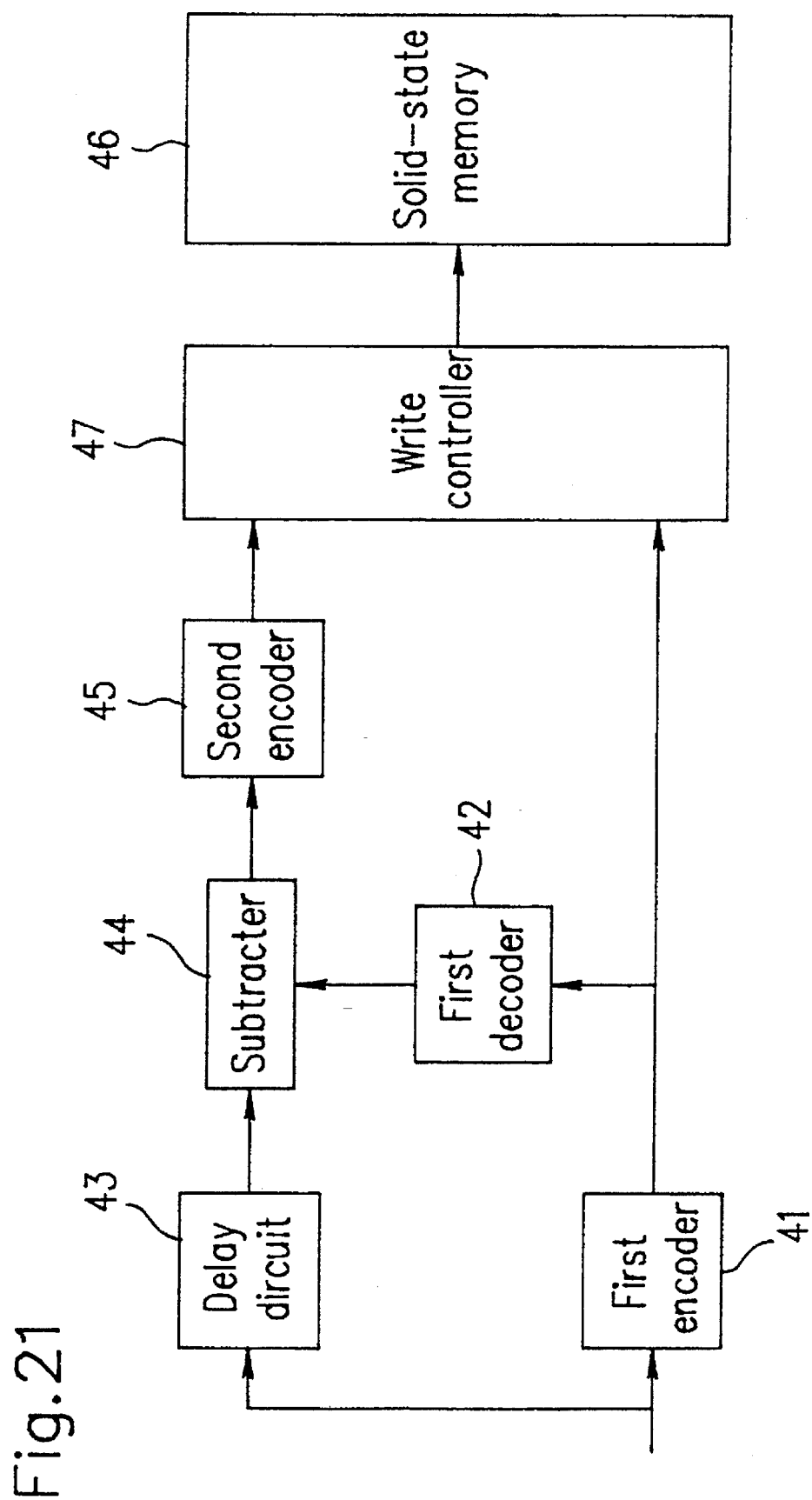
FIG. 21 is a block diagram showing the configuration of a digital signal recording apparatus of a fourth example according to the invention.

FIG. 21 shows a configuration for a digital signal recording apparatus of a fourth example according to the present invention. The digital signal recording apparatus shown in FIG. 21 includes a first encoder 41 for compression-encoding an input digital signal of 16 bits into first encoded data; a first decoder 42 for decoding the first encoded data into the original digital data; a delay circuit 43 for delaying the input digital signal by a period of time required for the encoding of the input digital signal by the first encoder and the decoding of the first encoded data into the original digital signal by the first decoder; a subtracter 44 for obtaining the difference signal between the output of the first decoder and the output of the delay circuit and for outputting the resulting difference signal as second encoded data; a second encoder 45 for encoding the output of the subtracter into third encoded data; a solid-state memory 46 having a data storage area for storing the first and third encoded data and an auxiliary information storage area for storing auxiliary information indicating the attributes of the data storage area as well as the attributes of the data stored therein; and a write controller 47 for, when writable space exists in the data storage area, storing the first and third encoded data into the data storage area, and for, when the writable space in the data storage area is exhausted, discarding whole or part of the third encoded data stored in the data storage area and for storing the first encoded data in the area where the discarded data was stored, while at the same time, storing the associated auxiliary information into the auxiliary information storage area.

The first encoder 41 may be any type of commonly used encoder, such as a PCM encoder, ADPCM encoder, CELP encoder or the like. The first decoder 42 is one that matches the first encoder 41. Further, it iS assumed here that the data storage area has a memory capacity of eight bits per address.

FIG. 22 shows the contents of the data storage area in the solid-state memory 46 when the recording process is completed before the data storage area becomes full.

FIG. 23 shows the contents of the auxiliary information storage area in the solid-state memory 46 when the recording process is completed before the data storage area becomes full.

FIG. 24 shows the contents of the data storage area in the solid-state memory 46 when the recording process is completed after continuing for some time after the data storage area has become full.

FIG. 25 shows the contents of the auxiliary information storage area in the solid-state memory 46 when the recording process is completed after continuing for some time after the data storage area has become full.

The operation of the digital signal recording apparatus having the above configuration will be described below with reference to FIGS. 21 to 25.

Referring to FIG. 21, the input digital signal of 16 bits per sample is compression-encoded by the first encoder 41 into data of four bits per sample. The first encoder 41 outputs the data of four bits per sample as first encoded data. The first decoder 42 decodes the first encoded data into the original digital signal. The delay circuit 43 delays the input digital signal by time T required for the compression encoding and decoding of the signal. The subtracter 44 obtains the difference signal between the output of the first decoder 42 and the output of the delay circuit 43, and outputs the resulting difference signal as the second encoded data. The second encoder 45 compresses the difference signal into data of two bits per sample. The second encoder 45 outputs the data of two bits per sample as third encoded data.

When an empty space exists in the data storage area in the solid-state memory 46, the write controller 47 stores the first and third encoded data into the data storage area in the solid-state memory 46.

Herein, it is assumed that each two of the first encoded data are stored at one address, whereas each four of the third encoded data are stored at one address. This is because the first encoded data consists of four bits per sample, whereas the third encoded data consists of two bits per sample. It is further assumed that the data storage area has a capacity of 30000 addresses, and the first encoded data are sequentially stored at addresses from 00000 through 1FFFF, while the third encoded data are sequentially stored at addresses from 20000 through 2FFFF. This address allocation is based on the fact that the first encoded data requires a storage area two times as large as that for the third encoded data, because the first encoded data consists of four bits per sample and the third encoded data consists of two bits per sample.

FIG. 22 shows the contents of the data storage area in the solid-state memory 46 when the recording process is completed before the data storage area becomes full. In FIG. 22, "D1 (t)" denotes the first encoded data at time t, and "D3(t)" denotes the third encoded data at time t.

FIG. 23 shows the contents of the auxiliary information storage area corresponding to the data storage area shown in FIG. 22. As shown in FIG. 23, there are three types of information, allocation information denoted by "Allocation", bitwidth information denoted by "BitWidth" and existence information denoted by "Existence", which are stored in the auxiliary information storage area. In this example, the allocation information indicates that the first encoded data is allocated to an area from address 00000 to address 1FFFF, while the third encoded data is allocated to an area from address 20000 to address 2FFFF. The bitwidth information indicates that the first encoded data consists of four bits per sample, while the third encoded data consists of two bits per sample. The existence information indicates that the first encoded data are currently stored at address 00000 to address 08000, while the third encoded data are currently stored at address 20000 to address 24000.

In a case where the recording process is not completed before the data storage area in the solid-state memory 46 has become full, the write controller 47 proceeds to store only the first encoded data into the data storage area in the solid-state memory 46. In this case, the first encoded data are sequentially overwritten into an area from address 20000 to address 2FFFF. As a result, the third encoded data previously stored at address 20000 to address 2FFFF are sequentially discarded, as the first encoded data are sequentially stored in the area in which the discarded second encoded data was previously stored. The recording time can thus be extended even after the solid-state memory 46 has become full.

FIG. 24 shows the contents of the data storage area in the solid-state memory 46 when the recording process is completed after continuing for some time after the data storage area has become full. In FIG. 24, "D1(t)" denotes the first encoded data at time t, and "D3(t)" denotes the third encoded data at time t. FIG. 24 shows a situation that the third encoded data previously stored at address 20000 to address 24000 were discarded since the first encoded data are stored up to address 24000.

FIG. 25 shows the contents of the auxiliary information storage area in this situation. As shown in FIG. 25, the allocation information indicates that the first encoded data is allocated to an area from address 00000 to address 1FFFF, while the third encoded data is allocated to an area from address 20000 to address 2FFFF. The bitwidth information indicates that the first encoded data consists of four bits per sample, while the third encoded data consists of two bits per sample. The existence information indicates that the first encoded data are currently stored at address 00000 to address 24000, while the third encoded data are Currently stored at address 24001 to address 2FFFF. Thus, the third encoded data previously stored at address 20000 through address 24000 has been dropped.

As described above, the digital signal recording apparatus includes: a first encoder for encoding an input digital signal into first encoded data; a first decoder for decoding the first encoded data into the original digital signal: a delay circuit for delaying the input digital signal by a period of time required for the encoding of the input digital signal by the first encoder and the decoding of the first encoded data into the original digital signal by the first decoder; a subtracter for obtaining the difference signal between the output of the first decoder and the output of the delay circuit and for outputting the resulting difference signal as second encoded data; a second encoder for encoding the output signal of the subtracter into third encoded data; a solid-state memory having a data storage area for storing the first and third encoded data and an auxiliary information storage area for storing auxiliary information indicating the attributes of the data storage area as well as the attributes of the data stored therein; and a write controller for, when writable space exists in the data storage area, storing the first and third encoded data into the data storage area, and for, when the writable space in the data storage area is exhausted, discarding whole or part of the third encoded data stored in the data storage area and for storing the first encoded data in the area where the discarded data was stored, while at the same time, storing the associated auxiliary information into the auxiliary information storage area.

With this configuration, when an empty space exists in the solid-state memory, not only the usual compression-encoded data (the first encoded data) but also the data (the second encoded data) which would usually be lost in the compression encoding process are compression-encoded and sequentially stored into memory, thereby achieving higher recording quality than can be achieved by a conventional compression encoding process. Furthermore, when the empty space is exhausted, the usual compression-encoded data are retained intact, but part of the previously stored data (the third encoded data) encoded from the data which would usually have been lost in the compression encoding process are dropped so as to create an empty space in the solid-state memory. This makes it possible to allow the recording process to continue, and thus ensuring recording quality at least comparable to that of the conventional compression encoding process. Moreover, since the data that would be lost in the usual compression encoding process are also encoded for compression, a longer recording time can be achieved than that achieved by the first example.

EXAMPLE 5

Figure 26:
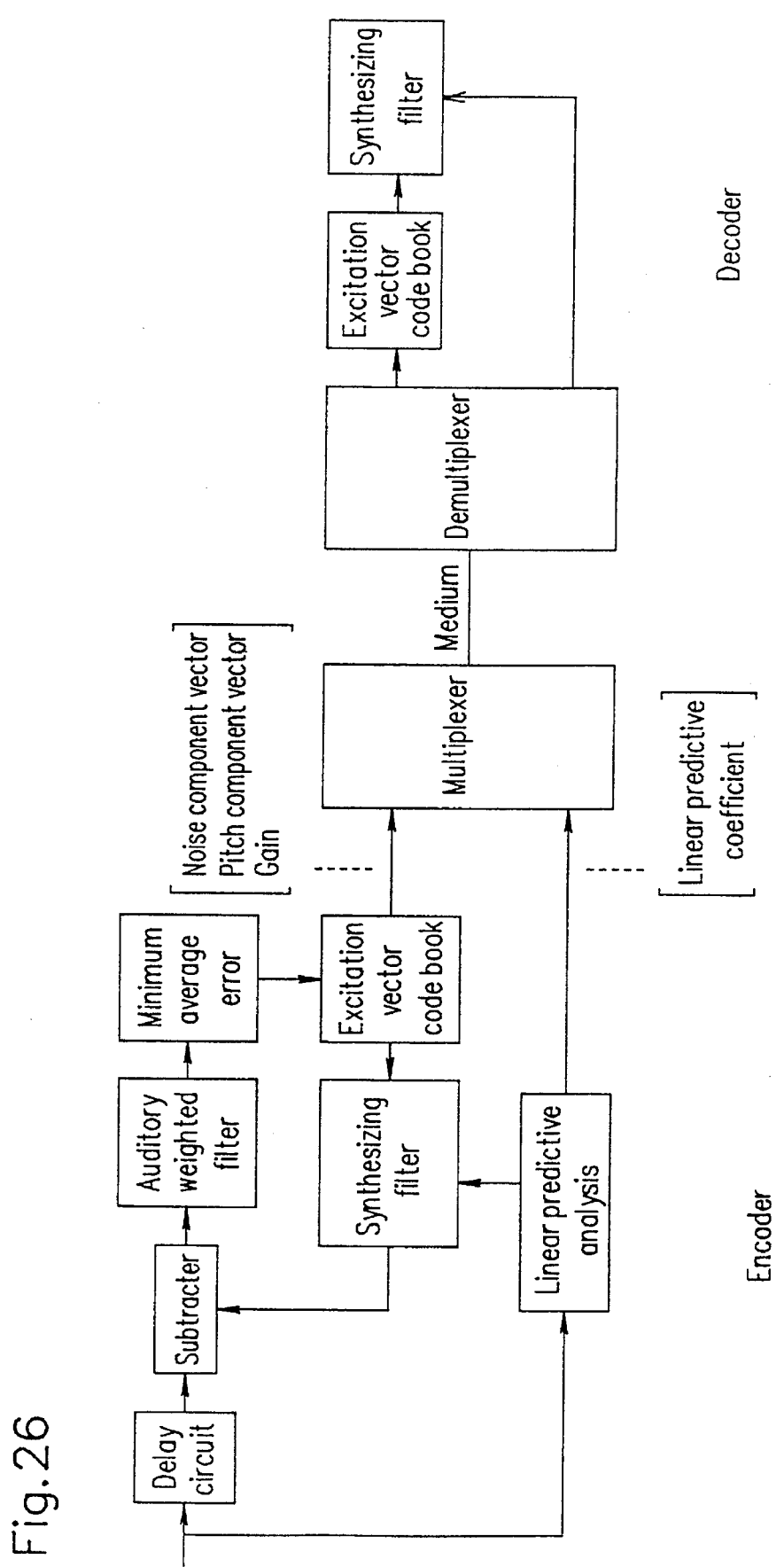
FIG. 26 is a diagram showing the fundamental configuration of an encoder and decoder commonly used in a CELP system.

FIG. 26 shows a fundamental configuration for an encoder and a decoder in a code-excited linear prediction (CELP) system. The encoder for this system includes a decoder, a delay circuit for matching the phase of the output signal of the decoder to that of the input signal, and a subtracter for outputting a signal representing the difference between the output signal of the delay circuit and the output signal of the decoder. The processing in an excitation vector code book and a synthesizing filter in the encoder of FIG. 26 is the same as the processing in the decoder, which means that the built-in subtracter obtains the difference between the output signal of the synthesizing filter and the input signal after phase adjustment.

Generally, an encoder for an analysis-synthesis system (such as MPC, LD-CELP, VSELP, etc.) or a predictive coding system (such as ADPCM, etc.), as well as the CELP system, incorporates a decoder, a delay circuit for matching the phase of the output signal of the decoder to that of the input signal, and a subtracter for outputting a signal representing the difference between the output signal of the delay circuit and the output signal of the decoder (see, "DSP Handbook", pp. 338–346).

Figure 27:
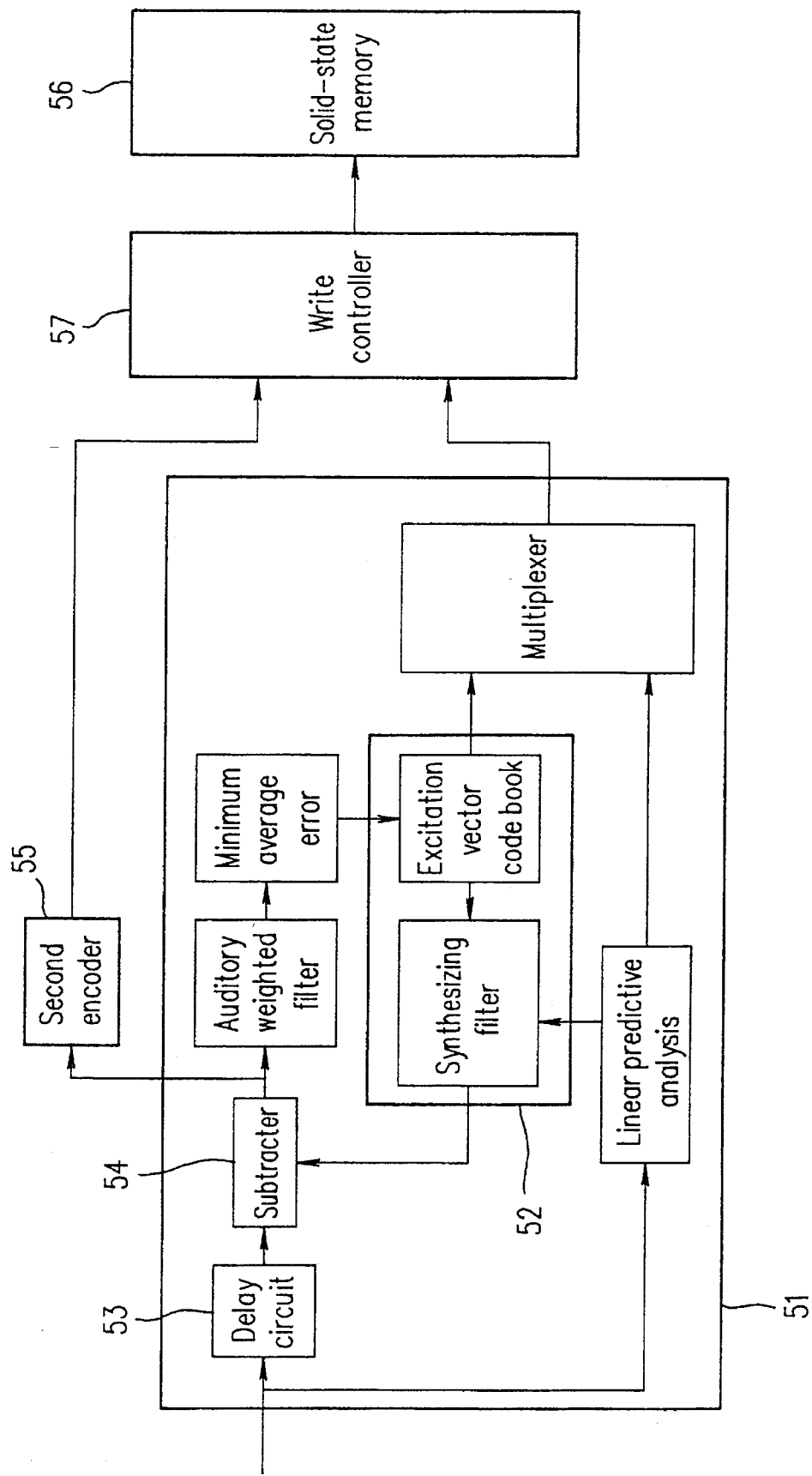
FIG. 27 is a block diagram showing the configuration of a digital signal recording apparatus of a fifth example according to the invention.

FIG. 27 shows a configuration for a digital signal recording apparatus of a fifth example according to the present invention. The digital signal recording apparatus shown in FIG. 2Y includes a first encoder 51 for compression-encoding a digital signal of 16 bits into first encoded data. The first encoder 51 has a configuration for the CELP encoder illustrated in FIG. 26. The first encoder 51 includes a first decoder 52 having an excitation vector code book and a synthesizing filter which are used in the compression encoding process of CELP; a delay circuit 53 for matching the phase of the output signal of the first decoder 52 to that of the input signal; a subtracter 54 for outputting the difference between the output signal of the delay circuit 53 and the output signal of the first decoder 52 as second encoded data. The digital signal recording apparatus further includes a second encoder 55 for encoding the output signal of the subtracter into third encoded data; a solid-state memory 56 having a data storage area for storing the first and third encoded data and an auxiliary information storage area for storing auxiliary information indicating the attributes of the data storage area as well as the attributes of the data stored therein; a write controller 57 for, when data writable space exists in the data storage area, writing the first and third encoded data into the data storage area, and for, when the data writable space in the data storage area is exhausted, discarding whole or part of the third encoded data stored in the data storage area and writes the first encoded data into the area in which the discarded third encoded data was previously stored, while at the same time, writing the auxiliary information into the auxiliary information storage area.

Figure 28:
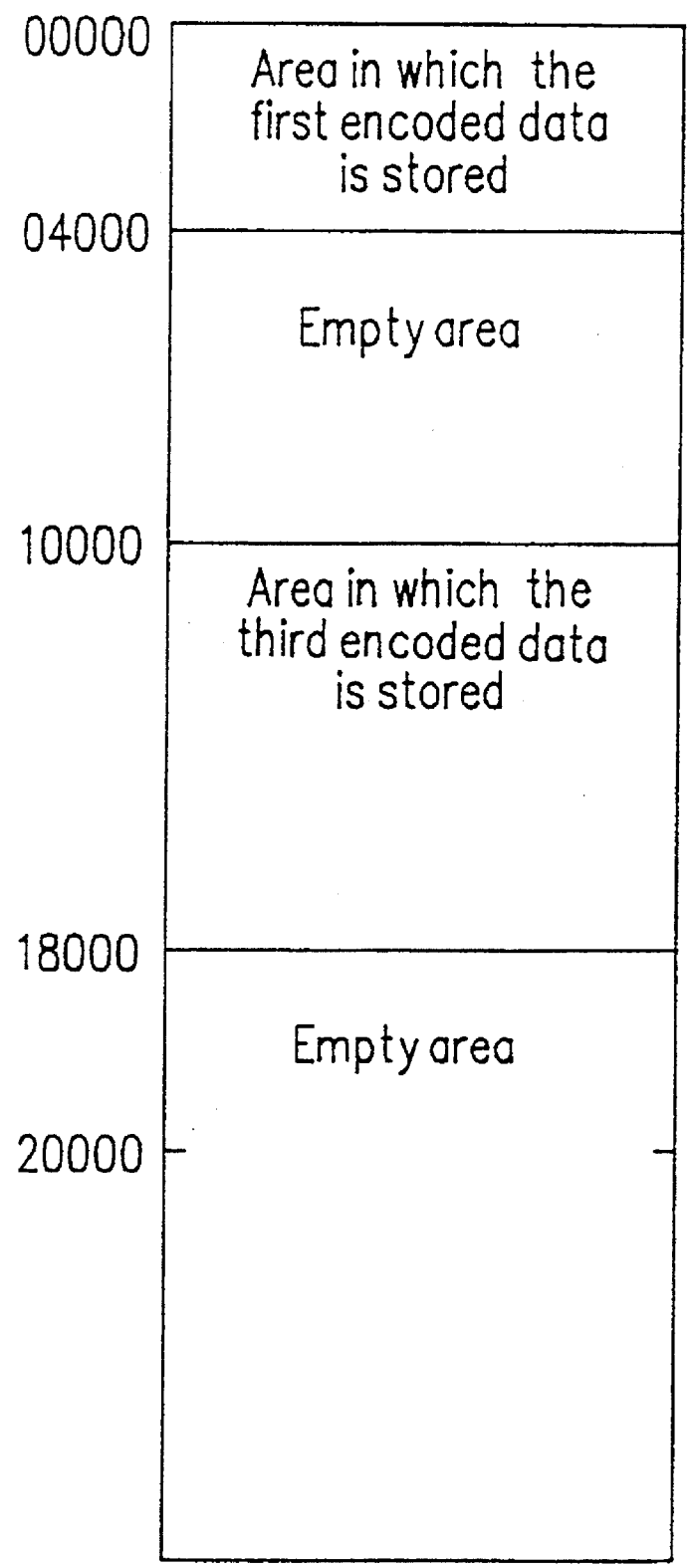
FIG. 28 is a diagram showing the contents of the data storage area of a solid-state memory when the recording is completed before the data storage area becomes full.

FIG. 28 shows the contents of the data storage area in the solid-state memory 56 when the recording process is completed before the data storage area becomes full.

FIG. 29 shows the contents of the auxiliary information storage area in the solid-state memory 56 when the recording process is completed before the data storage area becomes full.

Figure 30:
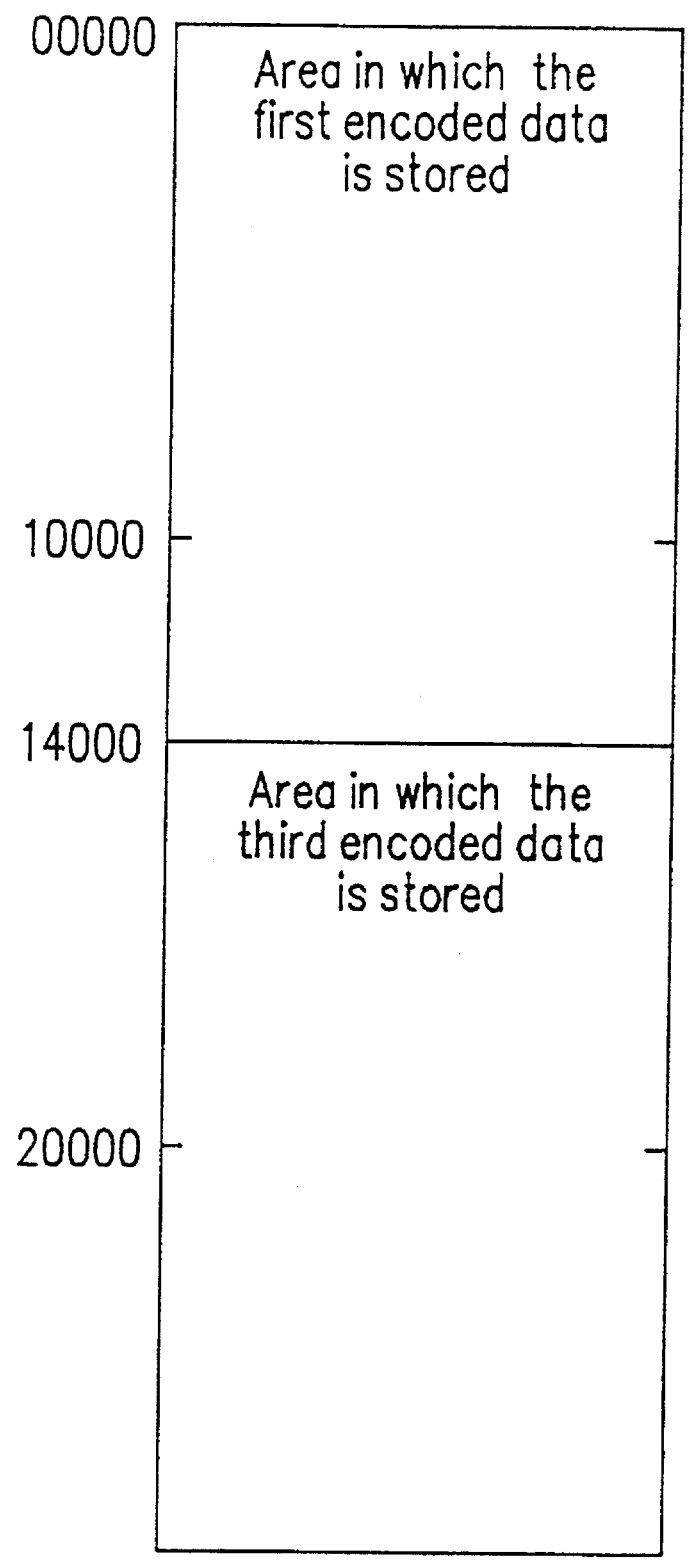
FIG. 30 is a diagram showing the contents of the data storage area of the solid-state memory when recording is completed after continuing for some time after the data storage area, has become full.

FIG. 30 shows the contents of the data storage area in the solid-state memory 56 when the recording process is completed after continuing for some time after the data storage area has become full.

FIG. 31 shows the contents of the auxiliary information storage area in the solid-state memory 56 when the recording process is completed after continuing for some time after the data storage area has become full.

The operation of the digital signal recording apparatus having the above configuration will be described below with reference to FIGS. 27 to 31.

Referring to FIG. 27, the input digital signal of 16 bits per sample is compression-encoded by the first encoder 51 into first encoded data at a bit rate of 8 kb/s. The output of the delay circuit 53 and the output of the first decoder 52 are supplied to the subtracter 54. The subtracter 54 outputs the difference signal between the output of the delay circuit 53 and the output of the first decoder 52 as second encoded data. The second encoded data is encoded by the second encoder 55 into third encoded data at a bit rate of 16 kb/s. When an empty space exists in the data storage area in the solid-state memory 56, the write controller 57 writes the first and third encoded data into the data storage area in the solid-state memory 56.

Herein, it is assumed that the data storage area has a capacity of 30000 addresses, and the first encoded data are sequentially stored at addresses from 00000 through 0FFFF, while the third encoded data are sequentially stored at addresses from 10000 through 2FFFF. This address allocation is based on the fact that the third encoded data requires a storage area two times as large as that for the first encoded data, because the first encoded data is data encoded at a bit rate of 8 kb/s and the third encoded data is data encoded at a bit rate of 16 kb/s.

FIG. 28 shows the contents of the data storage area in the solid-state memory 56 when the recording process is completed before the data storage area becomes full.

FIG. 29 shows the contents of the auxiliary information storage area corresponding to the data storage area shown in FIG. 28. As shown in FIG. 28, there are three types of information, allocation information denoted by "Allocation", bitrate information denoted by "BitRate" and existence information denoted by "Existence", which are stored in the auxiliary information storage area. In this example, the allocation information indicates that the first encoded data is allocated to an area from address 00000 to address 0FFFF, while the third encoded data is allocated to an area from address 10000 to address 2FFFF. The bitrate information indicates that the first encoded data is data encoded with compression at a bit rate of 8 kb/s, while the third encoded data is data encoded with compression at a bit rate of 16 kb/s. The existence information indicates that the first encoded data are currently stored at address 00000 to address 04000, while the third encoded data are currently stored at address 10000 to address 18000.

In a case where the recording process is not completed before the data storage area in the solid-state memory 56 has become full, the write controller 57 proceeds to store only the first encoded data into the data storage area in the solid-state memory 56. In this case, the first encoded data are sequentially overwritten into an area from address 10000 to address 2FFFF. As a result, the third encoded data previously stored at address 10000 to address 2FFFF are sequentially discarded, as the first encoded data are sequentially stored in the area in which the discarded third encoded data was previously stored. The recording time can thus be extended even after the solid-state memory 56 has become full.

FIG. 30 shows the contents of the data storage area in the solid-state memory 56 when the recording process is completed after continuing for some time after the data storage area has become full. FIG. 30 shows a situation that the third encoded data previously stored at address 10000 to address 14000 were discarded since the first encoded data are stored up to address 14000.

FIG. 31 shows the contents of the auxiliary information storage area in this situation. As shown in FIG. 31, the allocation information indicates that the first encoded data is allocated to an area from address 00000 to address 0FFFF, while the third encoded data is allocated to an area from address 10000 to address 2FFFF. The bitrate information indicates that the first encoded data is data encoded with compression at a bit rate of 8 kb/s, while the third encoded data is data encoded with compression at a bit rate of 16 kb/s. The existence information indicates that the first encoded data are currently stored at address 00000 to address 14000, while the third encoded data are currently stored at address 14001 to address 2FFFF. Thus, the third encoded data previously stored at address 10000 through address 14000 has been dropped.

As described above, according to the digital signal recording apparatus of this example, an analysis-synthesis-type or predictive-coding-type encoder is used as the first encoder, so that when an empty space exists in the solid-state memory, higher recording quality than can be achieved with conventional compression encoding can be accomplished, and even when the empty space is exhausted, recording can be continued, ensuring recording quality at least comparable to that of conventional compression encoding.

EXAMPLE 6

Hereinafter, a digital signal recording apparatus of a sixth example according to the present invention will be described.

Figure 32A:
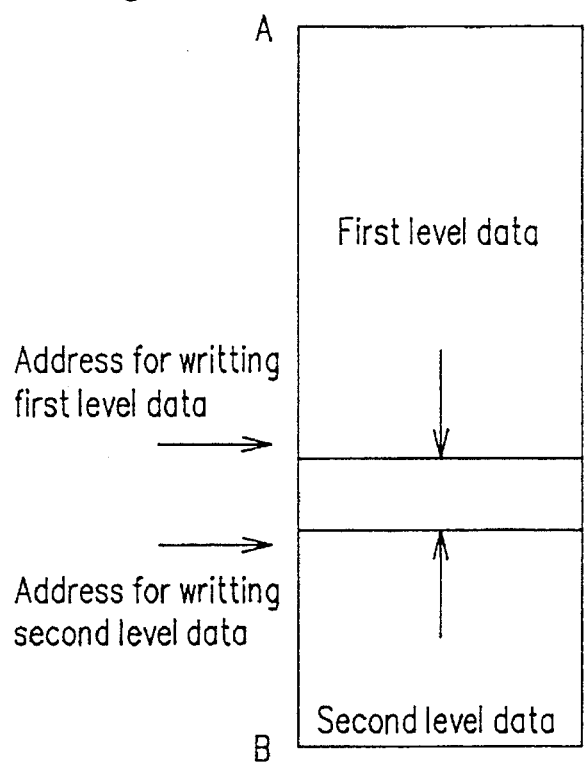
FIGS. 32A and 32B shows a data storage area in a sixth example of the invention.

FIG. 32A shows a data storage area of a solid-state memory in which level data are stored. In this example, the level divider divides encoded data into two levels. The data storage area has address A to address B. The write controller writes a first level data and a second level data into the data storage area in the following manner.

Figure 32B:
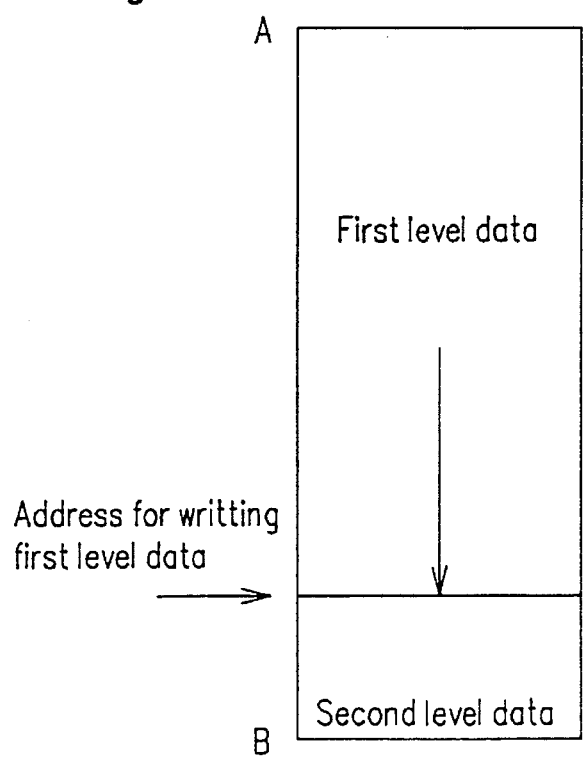

Starting at time t1, the first level data are stored in a direction from address A to address B, while the second level data are stored in a direction from address B to address A. When the data storage area becomes full with the first and second level data at time t2, as shown in FIG. 32B, the writing of the subsequent second level data is stopped. This is because the first level data has been already written in the area in which the subsequent second level data is to be written and the first level data has a higher level than the second level data. On the other hand, the subsequent first level data is overwritten in the area in which the second level data has been already written. This is because the second level data has been already written in the area in which the subsequent first level data is to be written, but the second level data has a lower level than the first level data.

The data storage area has a limited capacity. In recording the first and second level data on the data storage area, when the data storage area becomes full with the first and second level data, the writing of the lower level is stopped, while the writing of the higher level data is continued by overwriting the previously stored lower level data, thereby automatically extending the recording time. Further, when the required recording time is short, high quality recording can be obtained. In this manner, the data storage area having a limited capacity can be utilized effectively.

In this example, the encoded data are divided into two levels. However, the number of levels is not limited to two. As long as write control is made in accordance with the fundamental rule described above, any number of levels is applicable. Furthermore, the capacity of the area in which each level data is stored need not be determined in advance. Also, each level data need not be constructed by a fixed-length code.

EXAMPLE 7

Hereinafter, a digital signal recording apparatus of a seventh example according to the present invention will be described.

Figure 33A:
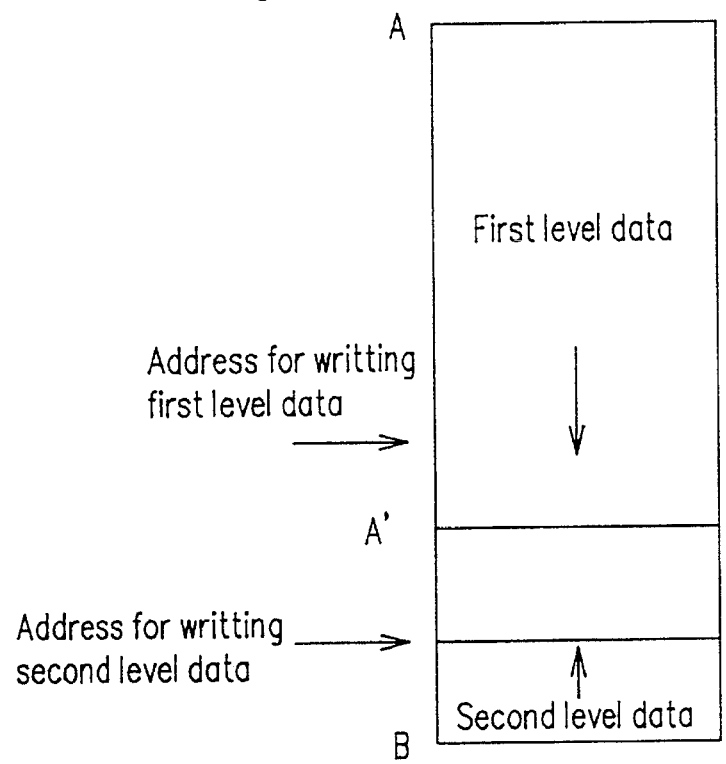
FIGS. 33A and 33B each shows a data storage area in a seventh example of the invention.

FIG. 33A shows a data storage area of a solid-state memory in which level data are stored. In this example, the level divider divides encoded data into two levels. It is assumed that the data storage area has a capacity D from address A to address B, and that a first level data is stored in the data storage area at a bit rate of "a" bit/s (bps) and a second level data is stored in the data storage area at a bit rate of "b" bit/s (bps). An address A' at which the writing of a lower level data is stopped is previously set.

The capacity D of the data storage area available for recording is given by the following Equation 1:

$$D = a \times t + b \times t \qquad \text{(Equation 1)}$$

where t denotes a recording time required for storing all levels of data.

The address A' is previously calculated and set so that the capacity of the data storage area from address A to address A' is equal to a × t and the capacity of the data storage area from address A' to address B is equal to b × t. The write controller writes the first level data and the second level data into the data storage area in the following manner.

The first level data are stored in a direction from address A to address B, while the second level data are stored in a direction from address B to address A. After time t, both the address for writing the first level data and address for writing the second level data reach address A'.

When the address for writing the second level data reaches the address A', the writing of the second level data is stopped. This is because address A' is the address at which the writing of the second level data is stopped.

Figure 33B:
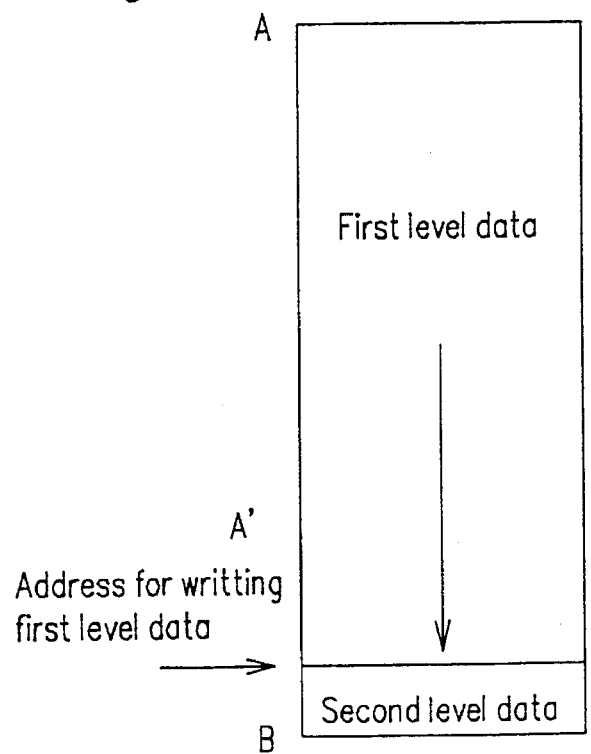

After the address for writing the first level data has reached address A', the writing of the first level data continues toward address B, as shown in FIG. 33B. This is because the second level data has been already written in the area in which the subsequent first level data is to be written, but the second level data has a lower level than the first level data.

By previously calculating the address at which the writing of a lower level data is stopped in this manner, the rule for storing each level data can be set as desired. Thus, when the write address of the level data has reached the previously calculated address, the writing of the lower level data is stopped, and only the higher level data is written into the data storage area by overwriting the lower level data which was previously stored therein. A long recording time is thus made possible; furthermore, when the required recording time is short, the recording can be made with high quality. In this manner, the data storage area having a limited capacity can be utilized effectively.

With respect to the direction in which the second level data is stored in the data storage area, there is no specific limitation. Furthermore, each level data need not be constructed by a fixed-length code.

EXAMPLE 8

Hereinafter, a digital signal recording apparatus of a ninth example according to the present invention will be described.

Figure 34A:
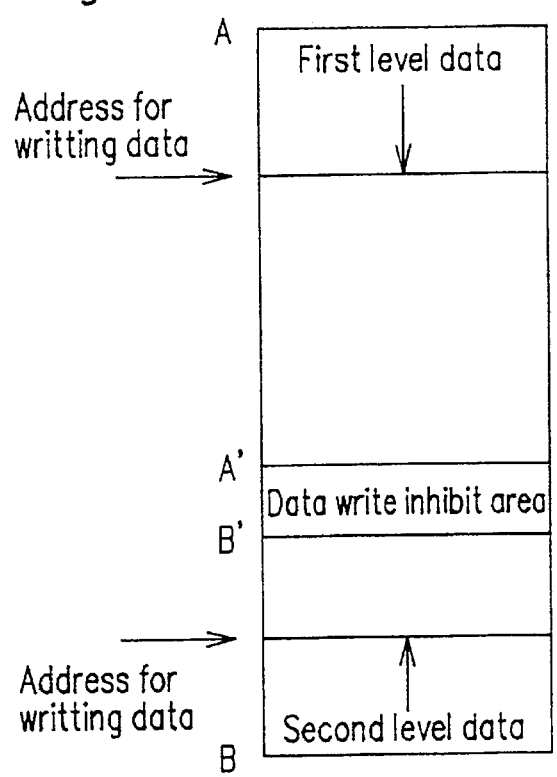
FIGS. 34A and 34B each shows a data storage area in an eighth example of the invention.

FIG. 34A shows a data storage area of a solid-state memory in which level data are stored. In this example, the level divider divides encoded data into two levels. It is assumed that the data storage area has a capacity D from address A to address B, and that the data storage area includes a data write inhibit area having a capacity D1. It is further assumed that a first level data is stored in the data storage area at a bit rate of "a" bit/s (bps) and a second level data is stored in the data storage area at a bit rate of "b" bit/s (bps). A starting address A' and an end address B' for the data write inhibit area are previously set.

The capacity D–D1 of the data storage area available for recording is given by the following Equation 2:

$$D-D1 = a \times t + b \times t \quad \text{(Equation 2)}$$

where t denotes a recording time required for storing all levels of data.

The address A' and address B' are previously calculated and set so that the capacity of the data storage area from address A to address A' is equal to a x t and the capacity of the data storage area from address B' to address B is equal to b x t. The write controller writes the first level data and the second level data into the data storage area in the following manner.

The first level data are stored in a direction from address A to address B, while the second level data are stored in a direction from address B to address A. After time t, the address for writing the first level data reaches address A' and the address for writing the second level data reaches address B'.

Figure 34B:
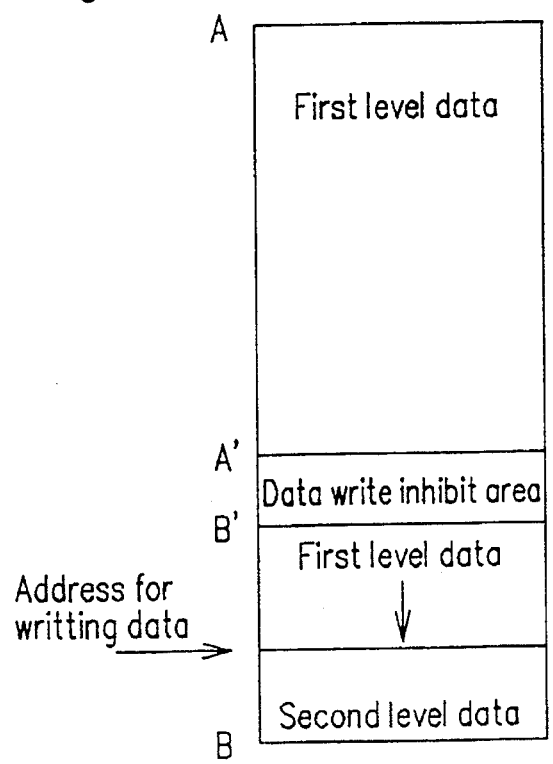

When the address for writing the first level data has reached address A', the address for writing the first level data is jumped to address B' skipping the data write inhibit area and the writing of the first level data continues toward address B, as shown in FIG. 34B. This is because the second level data has been already written in the area in which the subsequent first level data is to be written, but the second level data has a lower level than the first level data.

When the address for writing the second level data reaches the address B', the writing of the second level data is stopped. This is because the first level data has been already written in the area in which the subsequent second level data is to be written, and the first level data has a higher level than the second level data.

The data storage area has a limited capacity. In recording the first and second level data on the data storage area, when the data storage area becomes full with the first and second level data, the writing of the lower level is stopped, while the writing of the higher level data is continued by overwriting the previously stored lower level data, thereby automatically extending the recording time. Further, when the required recording time is short, high quality recording can be obtained. When the recording time is extended, high quality recording can be obtained with respect to at least a starting portion of data. In this manner, the data storage area having a limited capacity can be utilized effectively.

The data write inhibit area may be omitted. Furthermore, each level data need not be constructed by a fixed-length code.

EXAMPLE 9

Hereinafter, a digital signal recording apparatus of a ninth example according to the present invention will be described.

Figure 35A:
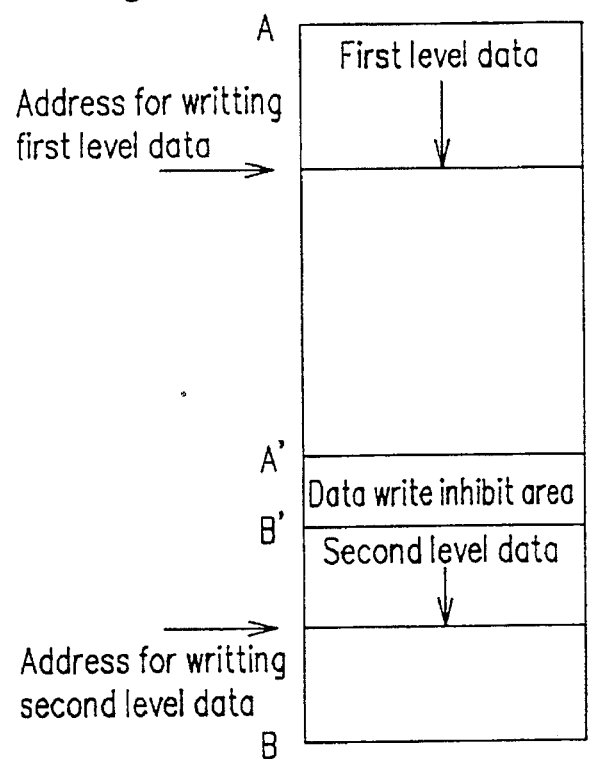
FIGS. 35A and 35B each shows a data storage area in a ninth example of the invention.

FIG. 35A shows a data storage area of a solid-state memory in which level data are stored. In this example, the level divider divides encoded data into two levels. The assumption of this example is the same as that of the eighth example. The write controller writes a first level data and a second level data into the data storage area in the following manner.

The first level data are stored in a direction from address A to address B, while the second level data are stored in a direction from address B' to address B. A rule is previously defined that the writing of the second level data is stopped when the address for writing the second level data reaches address B. After time t, the address for writing the first level data reaches address A' and the address for writing the second level data reaches address B.

When the address for writing the second level data has reached the address B, the writing of the second level data is stopped. This is because the address B is the address at which the writing of the second level data is stopped.

Figure 35B:
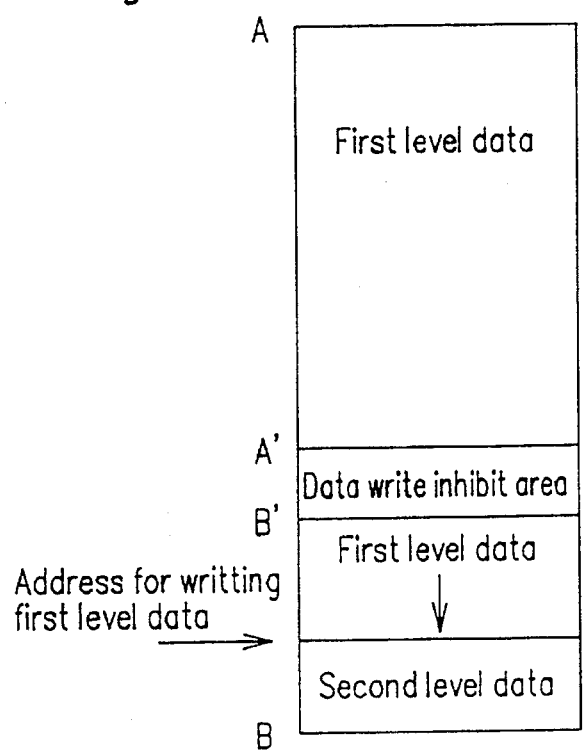

When the address for writing the first level data has reached address A', the address for writing the first level data is jumped to address B' skipping the data write inhibit area and the writing of the first level data continues toward address B, as shown in FIG. 35B. This is because the second level data has been already written in the area in which the subsequent first level data is to be written, but the second level data has a lower level than the first level data.

When the address for writing a lower level data reaches a predetermined address, the writing of the lower level is stopped, while the writing of the higher level data is continued by overwriting the previously stored lower level data, thereby automatically extending the recording time. Further, when the required recording time is long, high quality recording can be obtained with respect to at least an end portion of data. When the required recording time is short, high quality recording can be obtained with respect to all of data. In this manner, the data storage area having a limited capacity can be utilized effectively.

With respect to the direction in which the second level data is stored in the data storage area, there is no specific limitation. The data write inhibit area may be omitted. The data storage area may include a plurality of data write inhibit areas.

EXAMPLE 10

Hereinafter, a digital signal recording apparatus of a tenth example according to the present invention will be described.

Figure 36A:
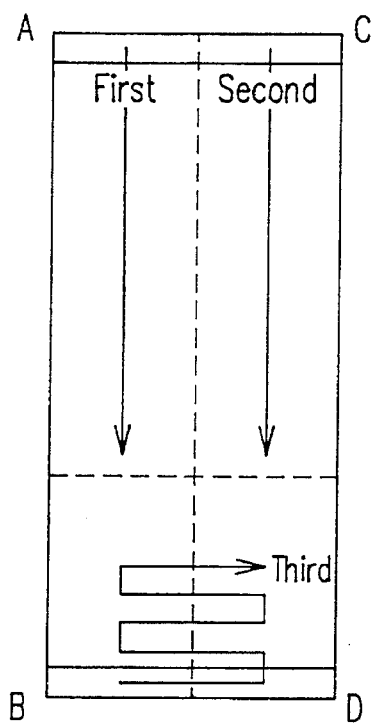
FIGS. 36A to 36D each shows a data storage area in a 10th example of the invention.

FIG. 36A shows a data storage area of a solid-state memory in which level data are stored. In this example, the level divider divides encoded data into three levels. The data storage area includes a first area having address A to address B and a second area having address C to address D. The write controller writes a first to a third level data into the data storage area in the following manner.

The first level data is stored in a direction from address A to address B. After the address for writing the first level data reaches address B, the first level data is stored in a direction from address D to address C. The second level data is stored in a direction from address C to address D. The third level data is stored alternately in the first area in a direction from address S to address A and in the second area in a direction from address D to address C.

A rule is previously defined that the writing of the second level data (or the third level data) is stopped when a higher level data has been already written in the area in which the second level data (or the third level data) is to be written.

Figure 36B:
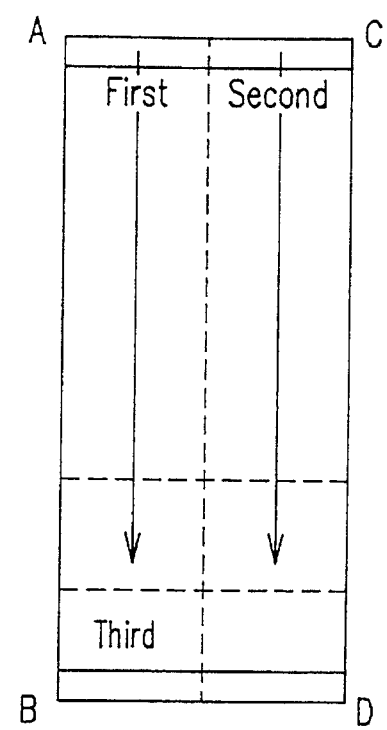

When the data storage area becomes full with the first to third level data, the writing of the third level data is stopped and the first and second level data are overwritten in the area in which the third level data has been already written, as is shown in FIG. 36B.

Figure 36C:
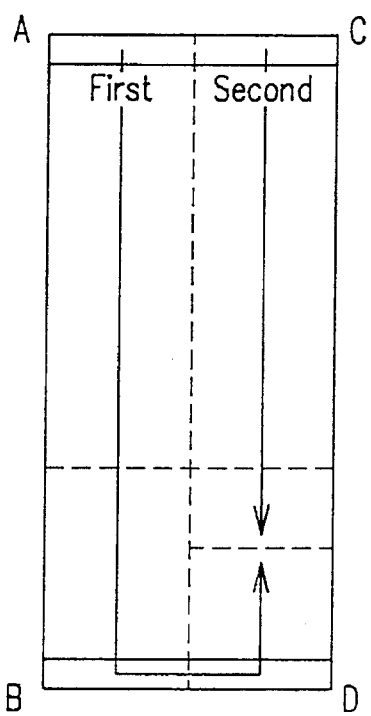

When the data storage area becomes full with the first and second level data, the writing of the second level data is stopped and the first level data is overwritten in the area in which the second level data has been already written along the direction from address D to address C, as is shown in FIG. 36C.

Figure 36D:
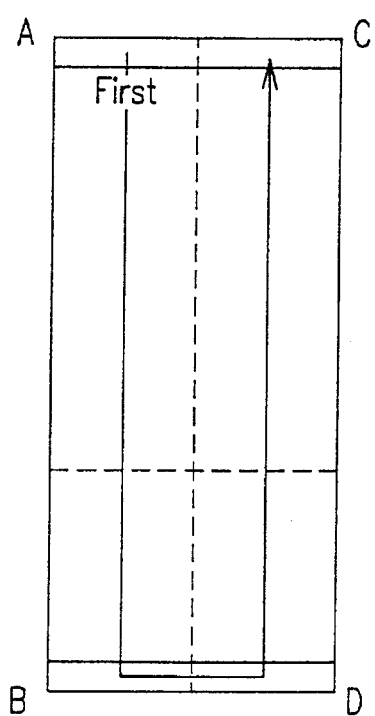

When the data storage area becomes full with the first level data, the writing of the first level data is stopped and the writing is completed, as is shown in FIG. 36D.

Thus, when the required recording time is long, the recording time can be extended by utilizing only a higher level data with discarding of a lower level data. Also, when the required recording time is short, high quality recording can be obtained. In this manner, the data storage area having a limited capacity can be utilized effectively.

With respect to the direction in which the third level data is stored in the data storage area, there is no specific limitation. Furthermore, in a case where the number of bits allocated to each level is fixed, it is sufficient for storing each level data to predetermine the area in which each level data is written. In this case, there is no need to provide such a rule as provided in this example to stop the writing of the lower level data.

EXAMPLE 11

Hereinafter, a digital signal recording apparatus of an eleventh example according to the present invention will be described.

Figure 37A:
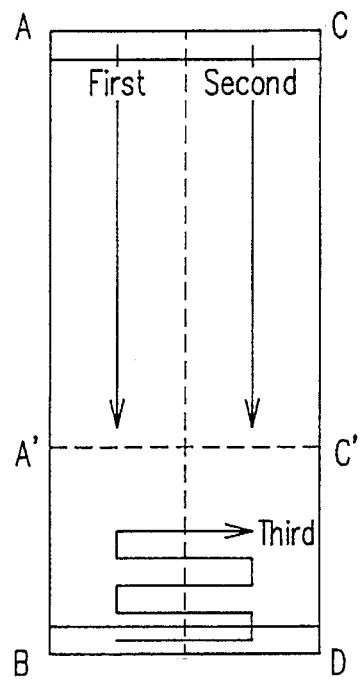
FIGS. 37A to 37E each shows a data storage area in an 11th example of the invention.

FIG. 37A shows a data storage area of a solid-state memory in which level data are stored. In this example, the level divider divides encoded data into three levels. The data storage area includes a first area having address A to address B and a second area having address C to address D. The write controller writes a first to a third level data into the data storage area in the following manner.

The first level data is stored in a direction from address A to address B. After the address for writing the first level data reaches address B, the first level data is stored in a direction from address D to address C. The second level data is stored in a direction from address C to address D. The third level data is stored alternately in a third area having address A' to address B in a direction from address B to address A' and in a fourth area having address C' to address D in a direction from address D to address C'. Address A' is previously set between address A and address B. Address C' is previously set between address C and address D.

Figure 37B:
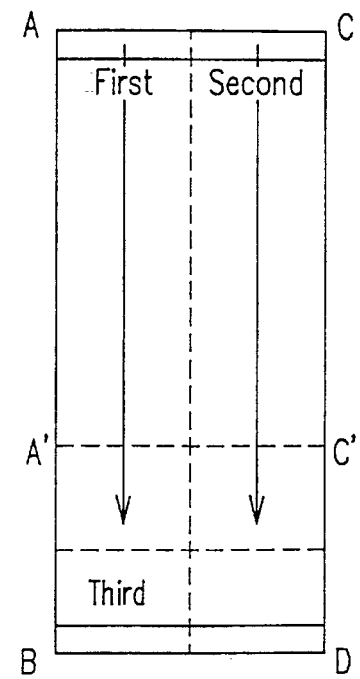

When the third area and fourth area in the data storage area become full with the third level data, the writing of the third level data is stopped and the first and second level data are overwritten in the area in which the third level data has been already written, as is shown in FIG. 37B.

Figure 37C:
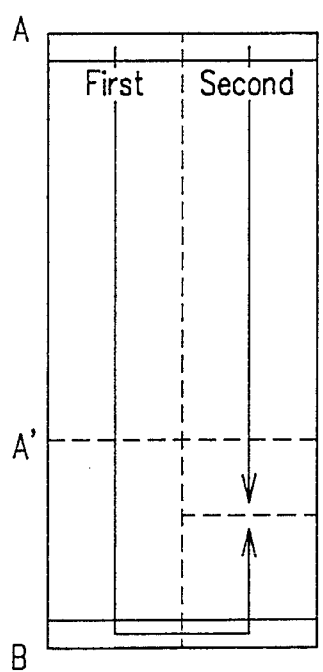

When the data storage area becomes full with the first and second level data, the writing of the second level data is stopped and the first level data is overwritten in the area in which the second level data has been already written, as is shown in FIG. 37C.

Figure 37D:
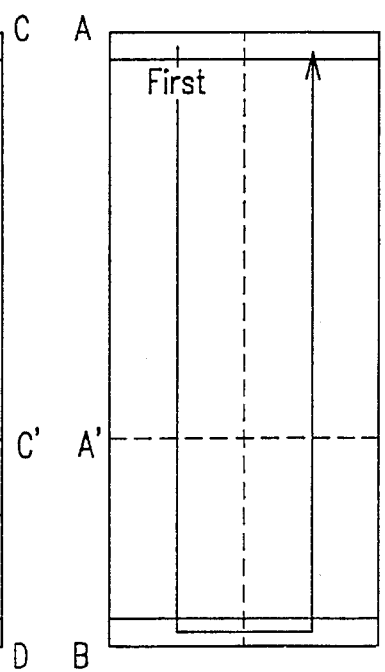

When the data storage area becomes full with the first level data, the writing of the first level data is stopped and the writing is completed, as is shown in FIG. 37D.

Figure 37E:
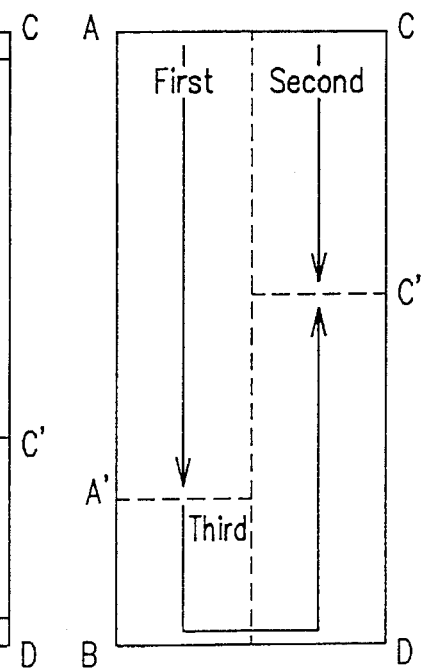

In this example, all of the first to third level data have the same bit length. However, each of the first to third level data may have a different bit length. For example, the first level data may consist of four bits, the second level data consist of two bits, and the third level data consist of four bits. In such a case, an area for the first level data has a different size from an area for the second level data, as is shown in FIG. 37E. In this case, if the third level data were alternately stored in an area having address A' to address B in a direction from address B to address A' and in an area having address C' to address D in a direction from address D to address C', an empty space would be left. In order to avoid such an empty space, the third level data is stored starting at address A' toward address B, and after reaching address B, the third level data is stored starting at address D toward address C', as shown in FIG. 37E. However, with respect to the direction in which the third level data is stored, there is, of course, no specific limitation.

Thus, when the required recording time is long, the recording time can be extended by utilizing only a higher level data with discarding of a lower level data. Also, when the required recording time is short, high quality recording can be obtained. In this manner, the data storage area having a limited capacity can be utilized effectively.

EXAMPLE 12

Hereinafter, a digital signal recording apparatus of a twelfth example according to the present invention will be described.

Figure 38A:
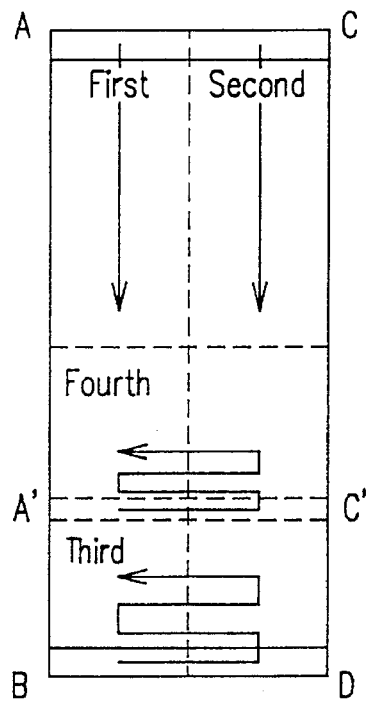
FIGS. 38A to 38E each shows a data storage area in a 12th example of the invention.

FIG. 38A shows a data storage area of a solid-state memory in which level data are stored. In this example, the level divider divides encoded data into four levels. The data storage area includes a first area having address A to address B and a second area having address C to address D. The write controller writes a first to a fourth level data into the data storage area in the following manner.

The first level data is stored in a direction from address A to address B. After the address for writing the first level data reaches address B, the first level data is stored in a direction from address D to address C. The second level data is stored in a direction from address C to address D. The third level data is alternately stored in an area in a direction from address B to address A and in an area in a direction from address D to address C. The fourth level data is alternately stored in an area in a direction from address A' to address A and in an area in a direction from address C' to address C. Address A' is previously set between address A and address B. Address C' is previously set between address C and address D.

A rule is previously defined that the writing of the second level data (or the third level data or the fourth level data) is stopped when a higher level data has been already written in the area in which the second level data (or the third level data or the fourth level data) is to be written.

Figure 38B:
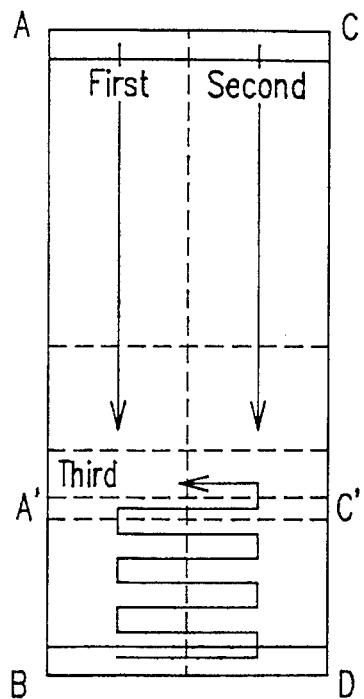

When the data storage area becomes full with the first to fourth level data, the writing of the fourth level data is stopped and the first to third level data are overwritten in the area in which the fourth level data has been already written, as is shown in FIG. 38B.

Figure 38C:
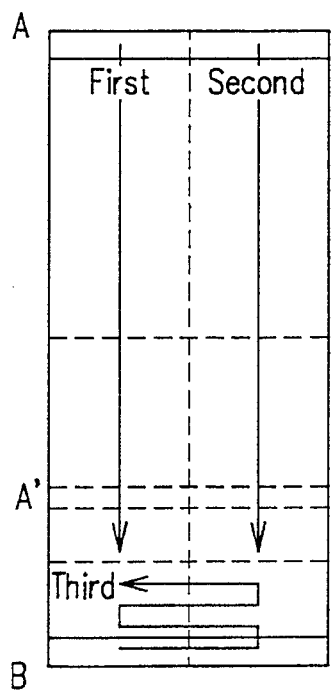

When the data storage area becomes full with the first and third level data, the writing of the third level data is stopped and the first and second level data are overwritten in the area in which the third level data has been already written, as is shown in FIG. 38C.

Figure 38D:
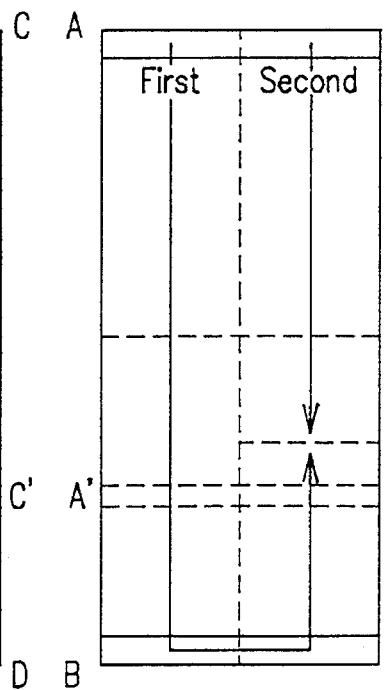

When the data storage area becomes full with the first and second level data, the writing of the second level data is stopped and the first level data is overwritten in the area in which the second level data has been already written along a direction from address D to address C, as is shown in FIG. 38D.

Figure 38E:
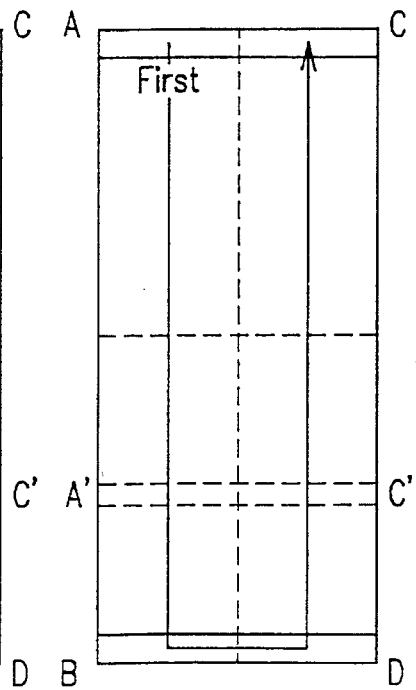

When the data storage area becomes full with the first level data, the writing of the first level data is stopped and the writing is completed, as is shown in FIG. 38E.

Thus, when the required recording time is long, the recording time can be extended by utilizing only a higher level data with discarding a lower level data. Also, when the required recording time is short, high quality recording can be obtained. In this manner, the data storage area having a limited capacity can be utilized effectively.

With respect to the direction in which the fourth level data is stored in the data storage area, there is no specific limitation. Furthermore, in a case where the number of bits allocated to each level is fixed, it is sufficient for storing each level data to predetermine the area in which each level data is written. In this case, there is no need to provide such a rule as provided in this example to stop the writing of the lower level data.

EXAMPLE 13

Hereinafter, a digital signal recording apparatus of a thirteenth example according to the present invention will be described.

Figure 39A:
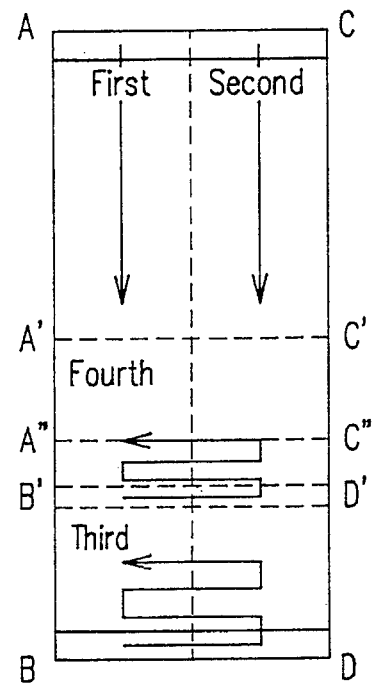
FIGS. 39A to 39E each shows a data storage area in a 13th example of the invention.

FIG. 39A shows a data storage area of a solid-state memory in which level data are stored. In this example, the level divider divides encoded data into four levels. The data storage area includes a first area having address A to address B and a second area having address C to address D. The write controller writes a first to a fourth level data into the data storage area in the following manner.

The first level data is stored in a direction from address A to address B. After the address for writing the first level data reaches address B, the first level data is stored in a direction from address D to address C. The second level data is stored in a direction from address C to address D. The third level data is alternately stored in an area in a direction from address B to address A" and in an area in a direction from address D to address C". The fourth level data is alternately stored in an area having address A' to address B' and in an area having address C' to address D'. Address A" is previously set between address A and address B. Address C" is previously set between address C and address D. Address A' is previously set between address A and address A". Address C' is previously set between address C and address C". Address B' is previously set between address A" and address B. Address D' is previously set between address C" and address D.

Figure 39B:
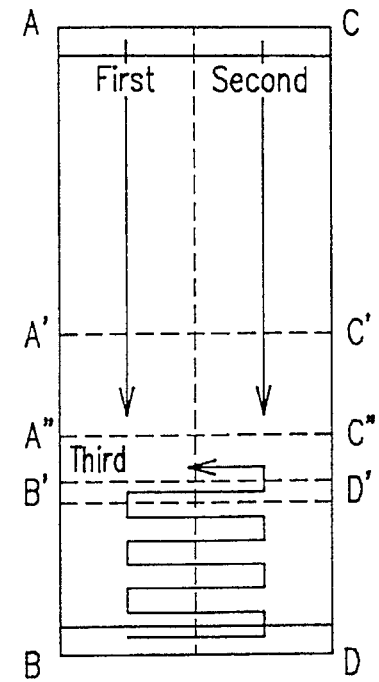

When an area for the fourth level data becomes full, the writing of the fourth level data is stopped and the first to third level data are overwritten in the area in which the fourth level data has been already written, as is shown in FIG. 39B.

Figure 39C:
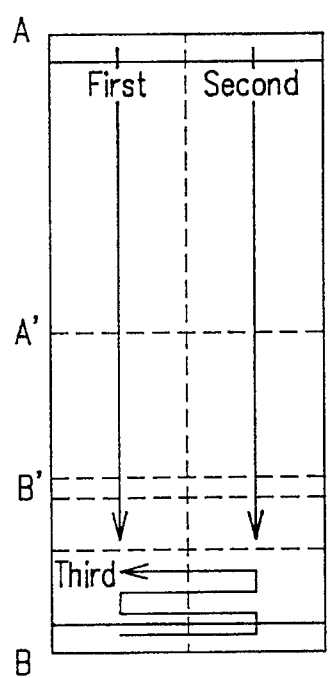

When an area for the third level data becomes full, the writing of the third level data is stopped and the first and second level data are overwritten in the area in which the third level data has been already written, as is shown in FIG. 39C.

Figure 39D:
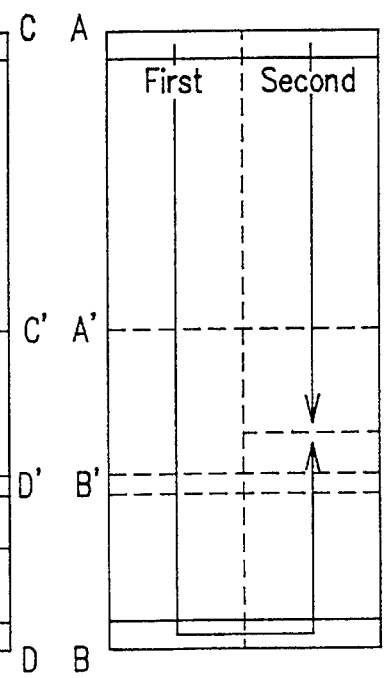

When the data storage area becomes full with the first and second level data, the writing of the second level data is stopped and the first level data is overwritten in the area in which the second level data has been already written, as is shown in FIG. 39D.

Figure 39E:
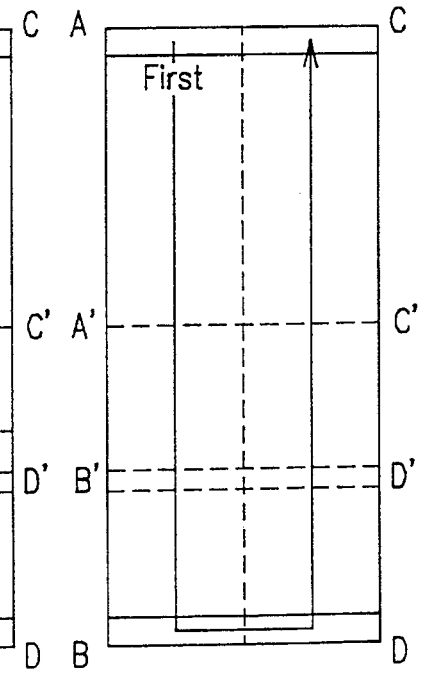
Figure 40A:
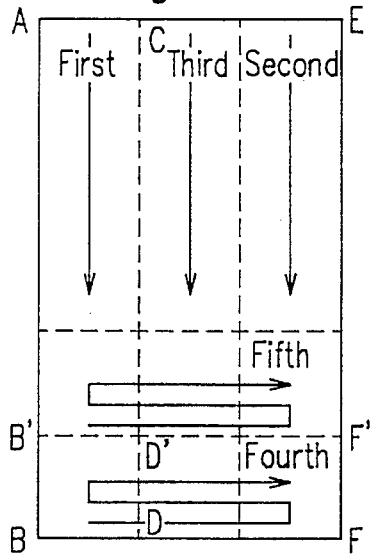
FIGS. 40A to 40E each shows a data storage area in the 13th example of the invention when the number of levels is five.
Figure 40B:
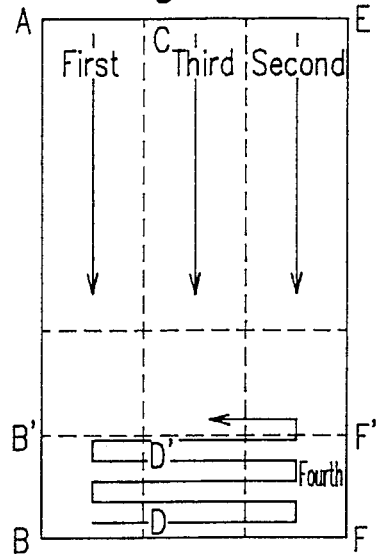
Figure 40C:
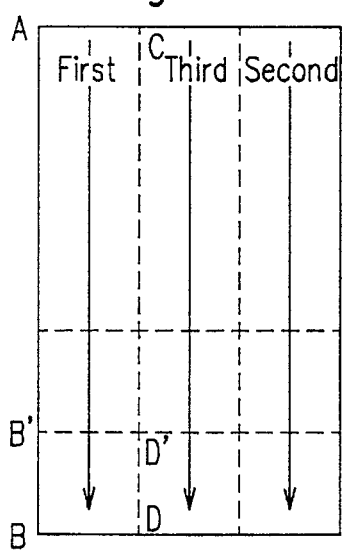
Figure 40D:
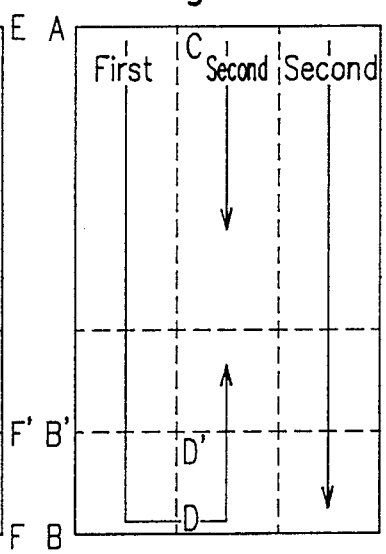
Figure 40E:
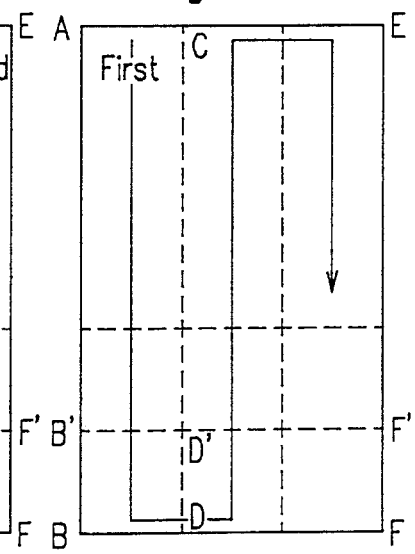

When the data storage area becomes full with the first level data, the writing of the first level data is stopped and the writing is completed, as is shown in FIG. 39E.

Thus, when the required recording time is long, the recording time can be extended by utilizing only a higher level data with discarding a lower level data. Also, when the required recording time is short, high quality recording can be obtained. In this manner, the data storage area having a limited capacity can be utilized effectively.

With respect to the direction in which the fourth level data is stored in the data storage area, there is no specific limitation.

In a case where the level divider divides encoded data into five levels, the writing of each level data is similar to that of this example. In this case, the write controller writes a first to a fourth level data into the data storage area in such a manner shown in FIGS. 40A to 40E.

EXAMPLE 14

Hereinafter, a digital signal recording apparatus of a fourteenth example according to the present invention will be described.

Figure 41:
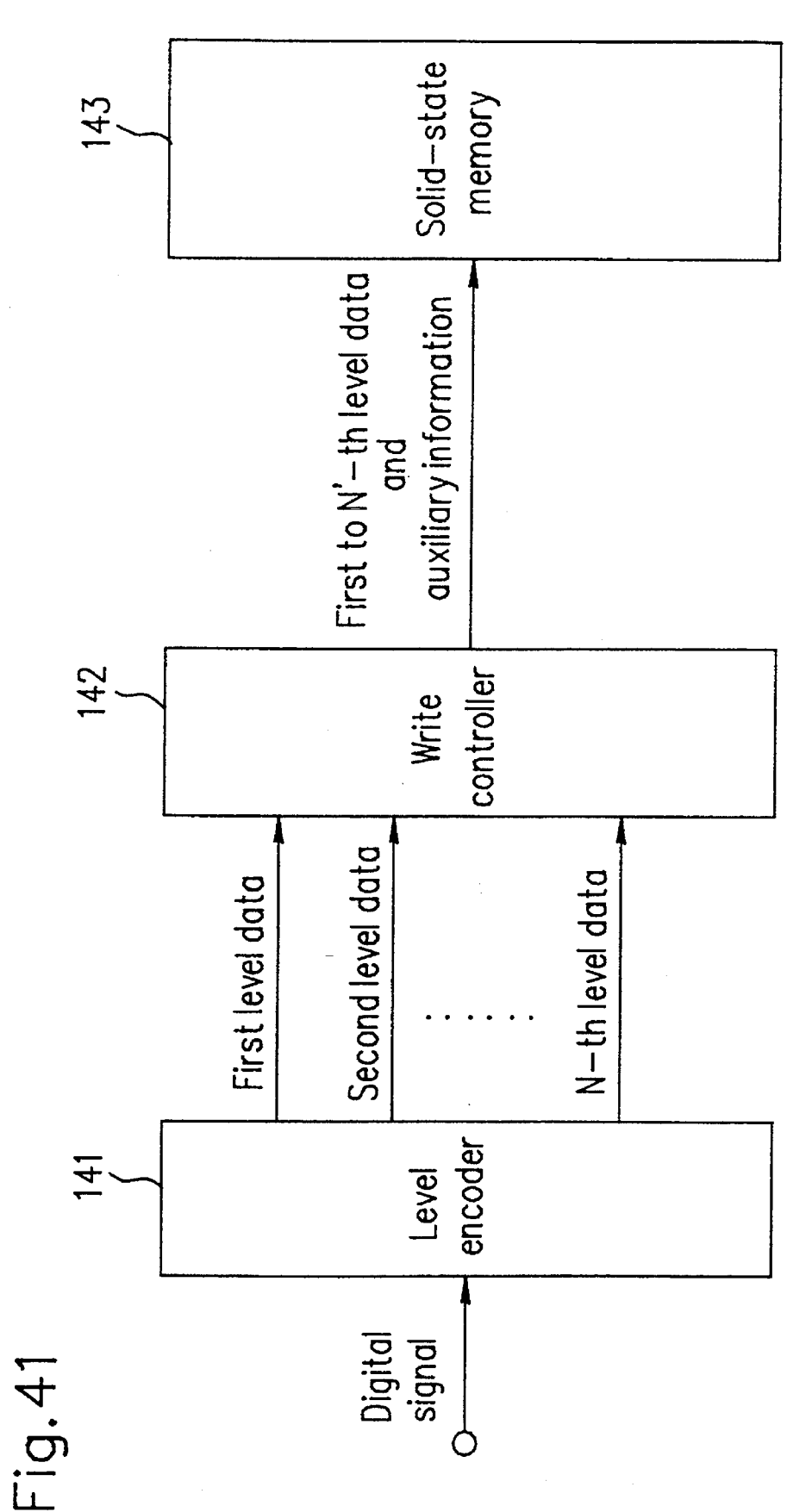
FIG. 41 is a block diagram showing the configuration of a digital signal recording apparatus of a 14th example according to the invention.

FIG. 41 shows a configuration for the digital signal recording apparatus of a fourteenth example according to the invention. The digital signal recording apparatus shown in FIG. 41 includes a level encoder 141 for encoding a digital signal into the first to N-th level data; a write controller 142 for controlling write operations to a solid-state memory according to the first to N-th level data; and a solid-state memory 143 for storing the level data and auxiliary information data output from the write controller 142.

The operation of the digital signal recording apparatus having the above configuration will now be described with reference to FIG. 41.

Referring to FIG. 41, the input digital signal is encoded into first to N-th level data by the level encoder 141. The first to N-th level data are supplied to the write controller 142. The write controller 142 controls write operations to the solid-state memory 143 according to the first to N-th level data, as described in the first to fourteenth examples. However, the write controller 142 does not store the data of all N levels output from the level encoder 141 into the solid-state memory 143. More specifically, the write controller 142 selects data of N' levels (N'≦N) of the N levels, and when the original digital signal is reconstructed with good accuracy based on the selected data of N' levels, the write controller 142 stores only data of N' levels into the solid-state memory 143.

A more detailed description will be given with reference to the flowchart of FIG. 42.

Figure 42:
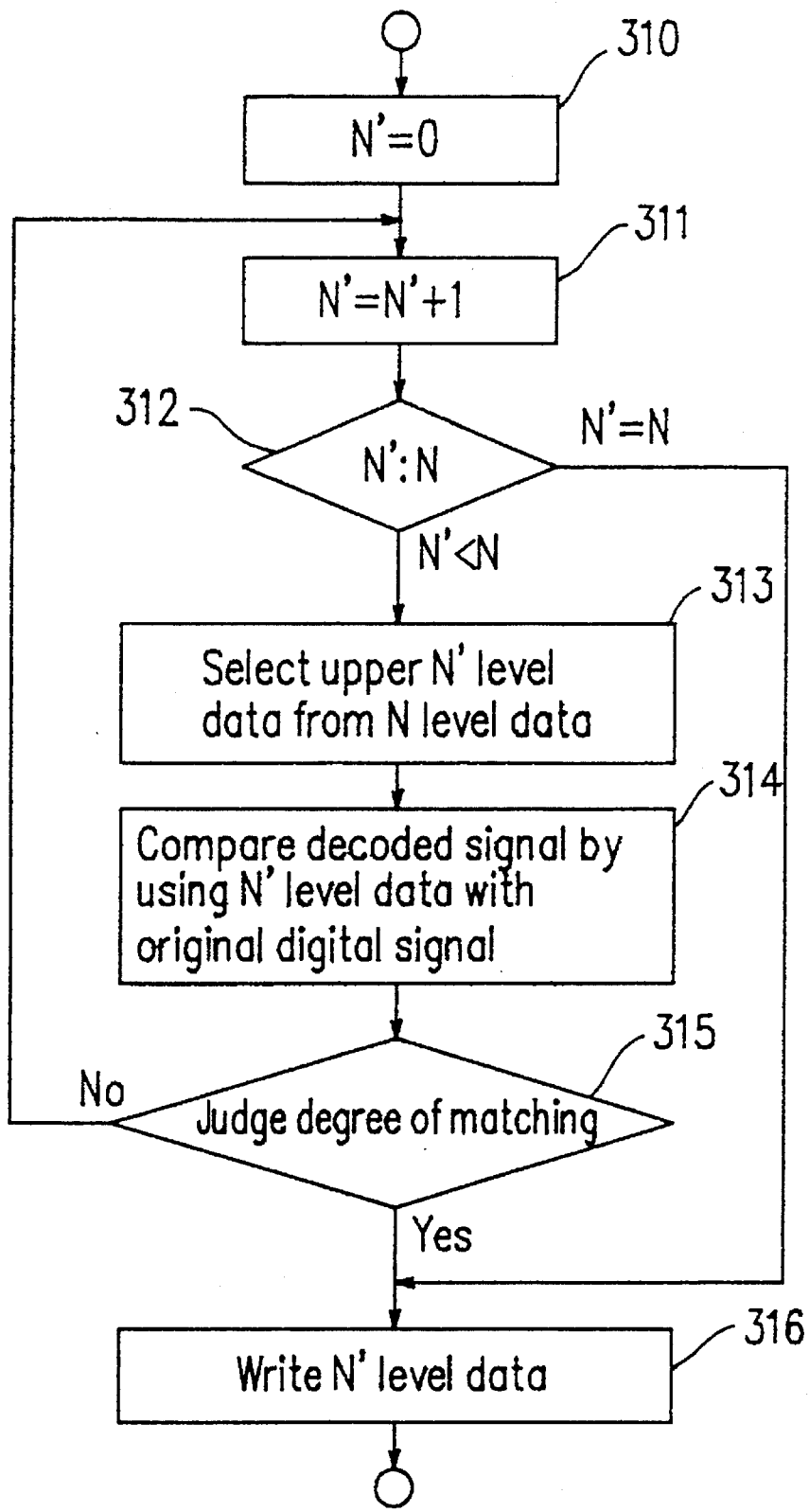
FIG. 42 is a flowchart illustrating the operational flow of a write controller.

FIG. 42 a flowchart illustrating an operational flow for the write controller 142. In step 310, N' is initialized to 0. In step 311, N' is incremented by 1. In step 312, it is determined whether the value of N' is smaller than N. If the value of N' is smaller than N, in step 313, the data of upper N' levels are selected from the data of N levels, and in step 314, the signal reconstructed base on the data of upper N' levels is compared with the original digital signal. Then, in step 315, the degree of matching between the two signals is evaluated; if the degree of matching is larger than a predetermined value, the process proceeds to step 316 where the data of upper N' levels are stored into the solid-state memory 143. On the other hand, if the degree of matching is smaller than the predetermined value, the process returns to step 311 so as to repeat the above steps. In step 312, if the value of N' becomes equal to N, the process jumps to step 316 where the data of all N levels are stored into the solid-state memory 143.

Figure 43:
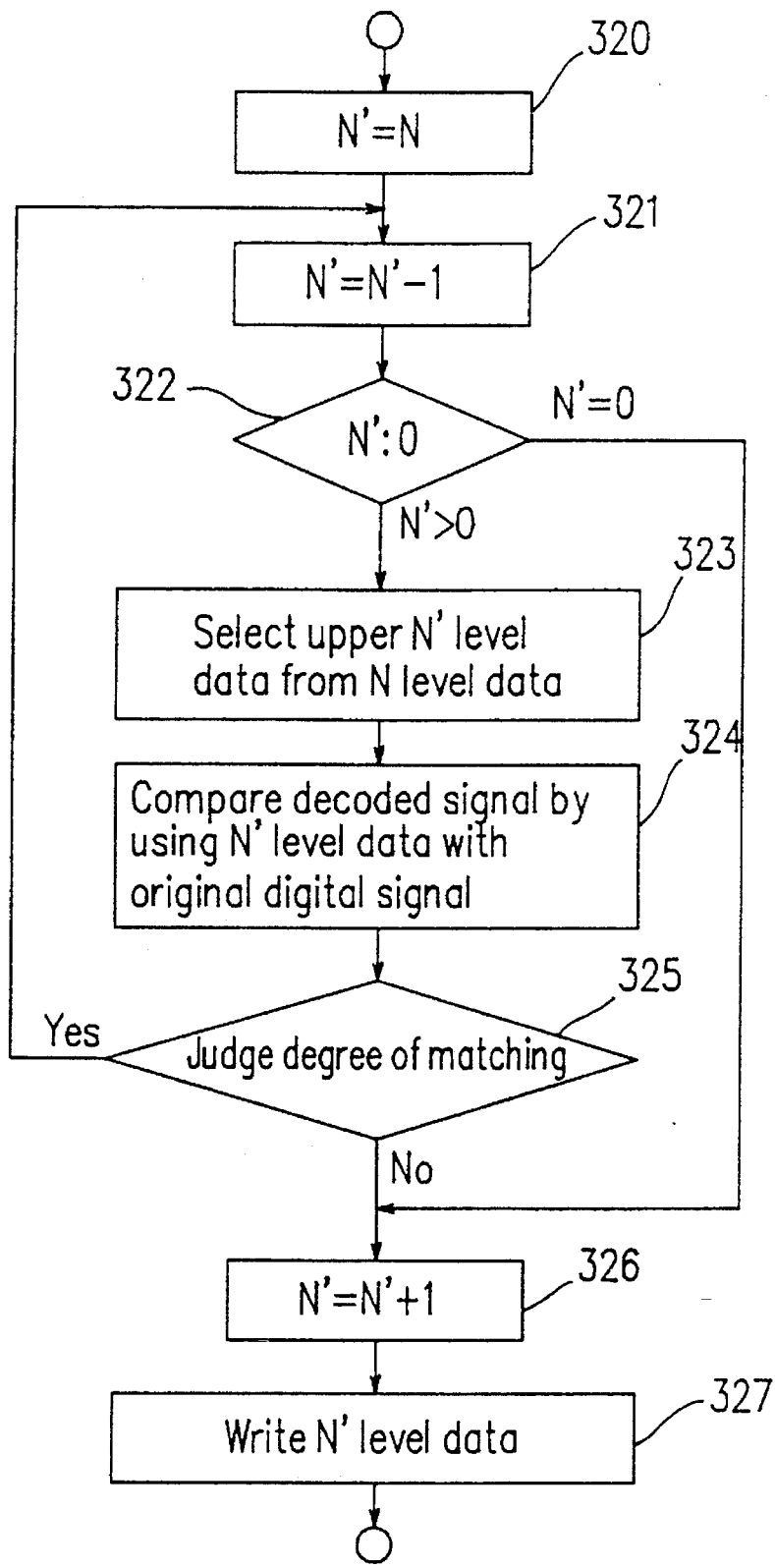
FIG. 43 is a flowchart illustrating an alternative operational flow of the write controller.

FIG. 43 is another flowchart illustrating an alternative operational flow for the write controller 142. In step 320, N' is initialized to N. In step 321, N' is decremented by 1. In step 322, it is determined whether the value of N' is larger than 0. If the value of N' is larger than 0, in step 323, the data of upper N' levels are selected from the data of all N levels, and in step 324, the signal reconstructed based on the data of upper N' levels is compared with the original digital signal. Then, in step 325, the degree of matching between the two signals is evaluated; if the degree of agreement is smaller than a predetermined value, then in step 326 the value N' is incremented by 1 so as to return the value of N' to the previous value, and in step 327, the data of upper N' levels are stored into the solid-state memory 143. On the other hand, if the degree of matching is larger than the predetermined value, the process returns to step 321 so as to repeat the above steps. In step 322, if the value of N' becomes equal to 0, the process jumps to step 326, and in step 327, the data of all N levels are stored into the solid-state memory 143.

As described above, according to the digital signal recording apparatus of this example, when the original digital signal can be reconstructed based on the data of N' levels ($N' \leq SN$) selected from the data of N levels output from the level encoder, the level data other than the data of N' levels are not written into the solid-memory, thereby reducing the frequency with which a lower level data is stored into the solid-memory, and thus prolonging the time taken before the lower level data is overwritten with a higher level data. This provides an effect of minimizing reproduction quality degradation due to overwriting with the higher level data.

EXAMPLE 15

Hereinafter, a digital signal recording apparatus of a fifteenth example according to the present invention will be described.

Figure 44:
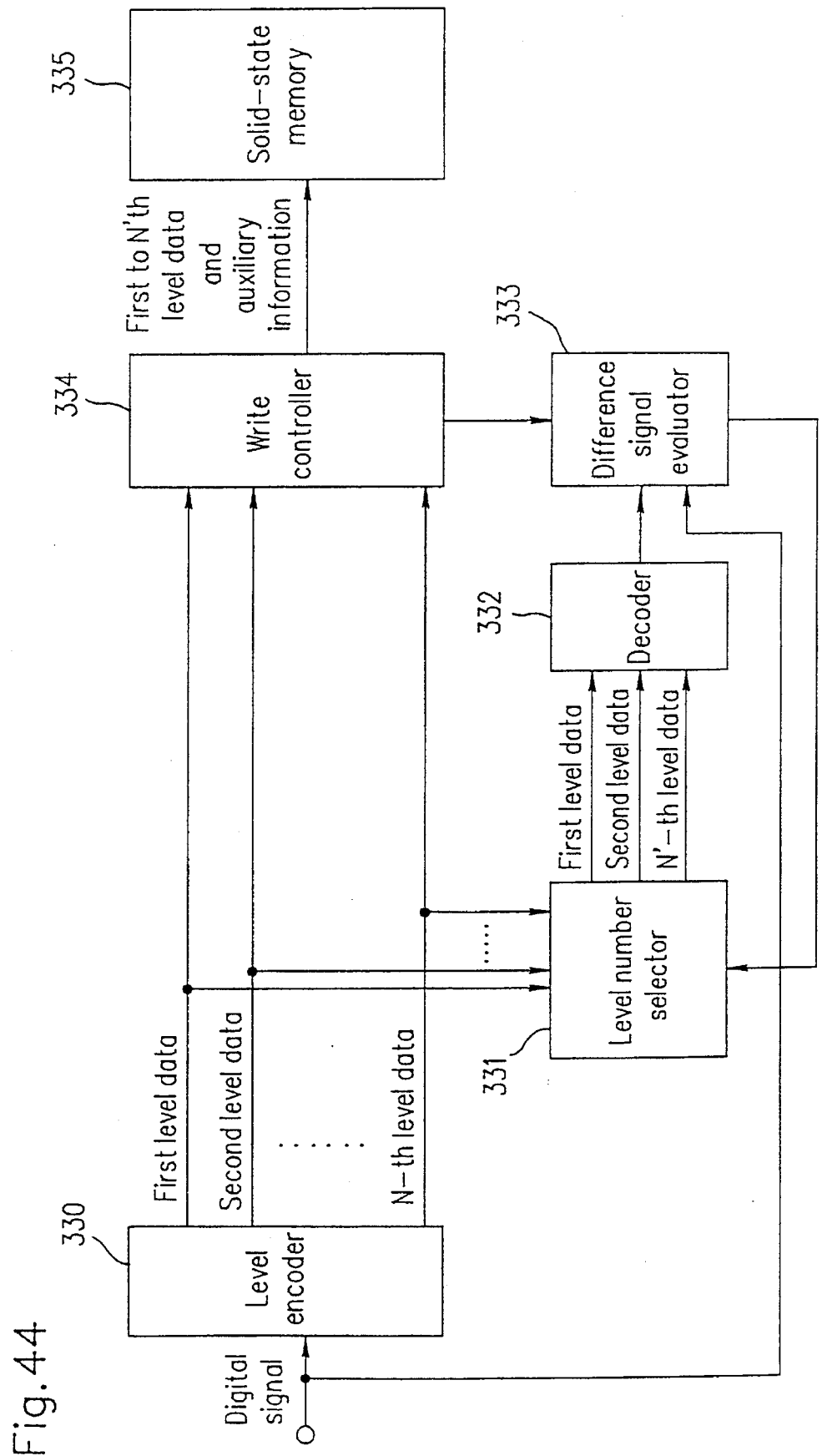
FIG. 44 is a block diagram showing the configuration of a digital signal recording apparatus of a 15th example according to the invention.

FIG. 44 shows a configuration for the digital signal recording apparatus of a fifteenth example according to the invention. The digital signal recording apparatus shown in FIG. 44 includes a level encoder 330 for encoding a digital signal into first to N-th level data; a level number selector 331 for selecting data of upper N' levels ($N' \leq N$) from the first to N-th level data; a decoder 332 for decoding the first to N'-th level; a difference signal evaluator 333 for evaluating a difference signal indicating the difference between the output of the decoder 332 and the input original digital signal, and for supplying a control signal indicating the number of levels to be selected to the level number selector 331 and a write controller 334 according to the evaluated difference signal; a write controller 334 for controlling the writing of the first to N-th level data into a solid-state memory 335 according to the output of the difference signal evaluator 333; and a solid-state memory 335 for storing a selected first to N'-th level data and associated auxiliary information.

The operation of the digital signal recording apparatus having the above configuration will be described below.

Referring to FIG. 44, the input digital signal is encoded into first to N-th level data by the level encoder 330. The first to N-th level data are supplied to the level number selector 331 as well as to the write controller 334. The level number selector 331 selects the number of levels as directed by the difference signal evaluator 333 and outputs a selected first to N'-th level data. The decoder 332 decodes the selected first to N'-th level data. The output of the decoder of 332 is supplied to the difference signal evaluator 333. The difference signal evaluator 333 evaluates the difference signal indicating the difference between the output of the decoder 332 and the input digital signal, and generates a control signal indicating the number of levels to be selected according to the evaluated difference signal. The control signal is supplied to the level number selector 331 and the write controller 334. The write controller 334 controls the writing of the first to N-th level data into a solid-state memory 335 according to the output of the difference signal evaluator 333 so as to output a selected first to N'-th level data and their associated auxiliary information. The solid-state memory 335 stores the selected first to N'-th level data ($N' \leq N$), i.e. data of upper N' levels and their associated auxiliary information. The selection of the number of levels is made in accordance with the same procedure as described in the fourteenth example.

As described above, according to the digital signal recording apparatus of this example, the decoder decodes N' level data ($N' \leq N$) into a digital signal, and the difference signal evaluator calculates the difference between the decoded digital signal and the original digital signal. When the value output from the difference signal evaluator is smaller than a predetermined value, the level data other than the N' level data are not written into the solid-state memory, thereby reducing the frequency with which a lower level data is stored into the solid-state memory, and thus prolonging the time taken before the lower level data is overwritten with a higher level data. This provides an effect of minimizing reproduction quality degradation due to overwriting with the higher level data. With the configuration of this example, the same effect can be obtained regardless of the construction of the level encoder.

EXAMPLE 16

Hereinafter, a digital signal recording apparatus of a sixteenth example according to the present invention will be described.

Figure 45:
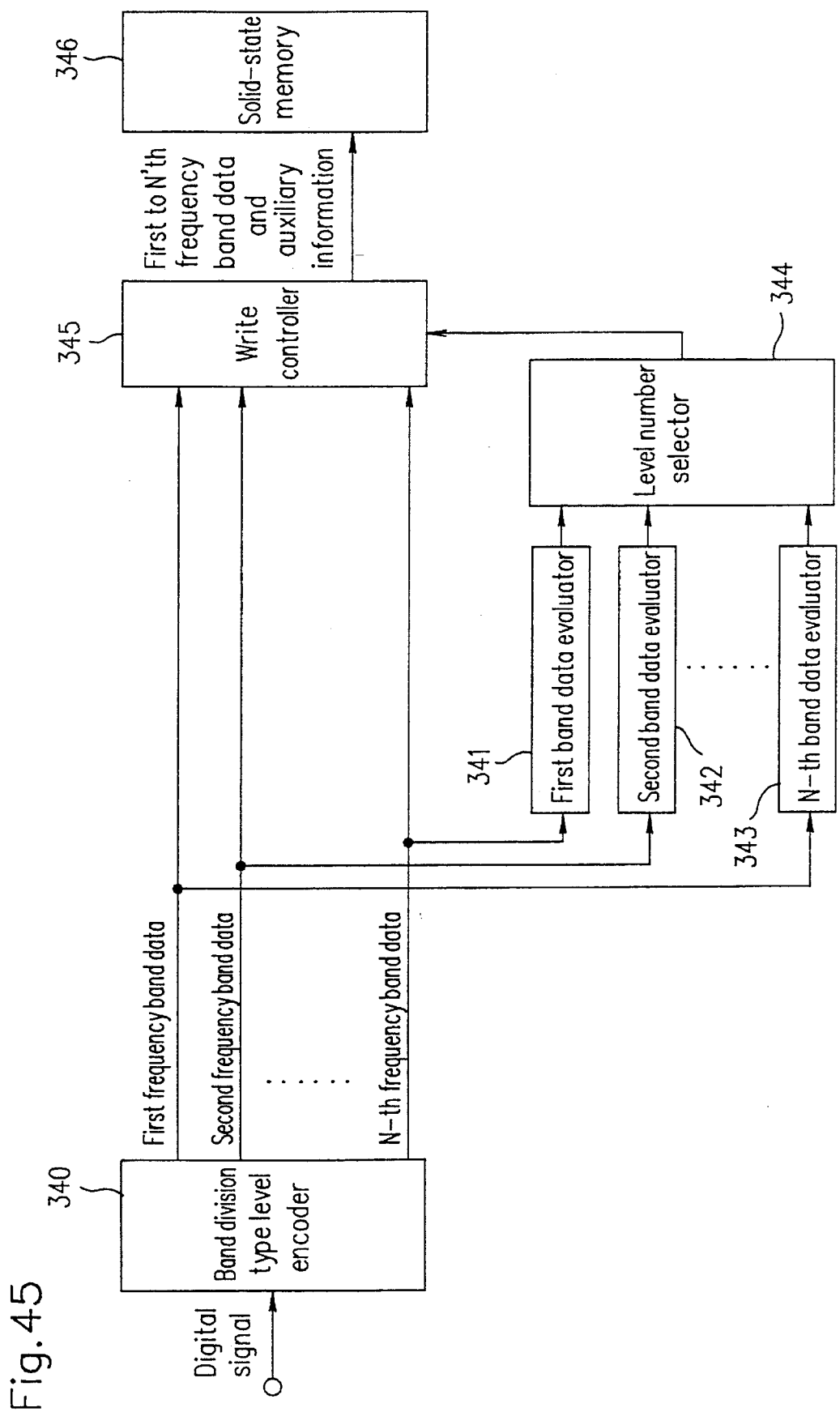
FIG. 45 is a block diagram showing the configuration of a digital signal recording apparatus of a 16th example according to the invention.

FIG. 45 shows a configuration for the digital signal recording apparatus of a sixteenth example according to the invention. The digital signal recording apparatus shown in FIG. 45, a band division type level encoder 340 for encoding a digital signal into first to N-th frequency band data; first to N-th band data evaluators 341 to 343 for evaluating the degree of quality degradation that would be caused when the respective frequency band data were omitted in the decoding process; a level number selector 344 for selecting the number of levels according to the output of the first to N-th band data evaluators 341 to 343; a write controller 345 for controlling the writing of the first to N-th frequency band data into a solid-state memory 346 according to the output of the level number selector 344; a solid-state memory 346 for storing the selected first to N'-th frequency band data and associated auxiliary information.

The digital signal recording apparatus having the above configuration will be described below.

Referring to FIG. 45, the input digital signal is encoded into first to N-th frequency band data by the band division type level encoder 340. The first to N-th frequency band data are supplied to the write controller 345 as well as to the first to N-th band data evaluators 341 to 343. Upon receiving the first to N-th frequency band data, the first to N-th band data evaluators 341 to 343 evaluate the degree of quality degradation that would be caused when the respective frequency band data were omitted in the decoding process, and output the respective evaluation results to the level number selector 344. The level number selector 344 selects the number of levels according to the output of the first to N-th band data evaluators 341 to 343, and generates a control signal indicating the number of levels to be selected. The selection of levels is made in accordance with the same procedure as described in the fourteenth example. The control signal is supplied to the write controller 345. The write controller 345 controls the writing of the first to N-th frequency band data into the solid-state memory 346 according to the control signal from the level number selector 344, and outputs a selected number of the first to N'-th frequency band data and their associated auxiliary information. The solid-state memory 346 stores the selected number of N' frequency band data (N'≦N), i.e. the first to N'-th frequency band data, and their associated auxiliary information.

As described above, according to the digital signal recording apparatus of this example, the N' level data (N'≦N) are level data obtained by encoding signals only in selected frequency bands. When the magnitude of frequency band signals other than those encoded in the selected N' level data is smaller than a predetermined value, the level data other than those in the N' levels are not written into the solid-state memory, thereby reducing the frequency with which a lower level data is stored into the solid-state memory, and thus prolonging the time taken before the lower level data is overwritten with a higher level data. This provides an effect of minimizing reproduction quality degradation due to the overwriting with the higher level data.

EXAMPLE 17

Hereinafter, a digital signal recording apparatus of a seventeenth example according to the present invention will be described.

Figure 46:
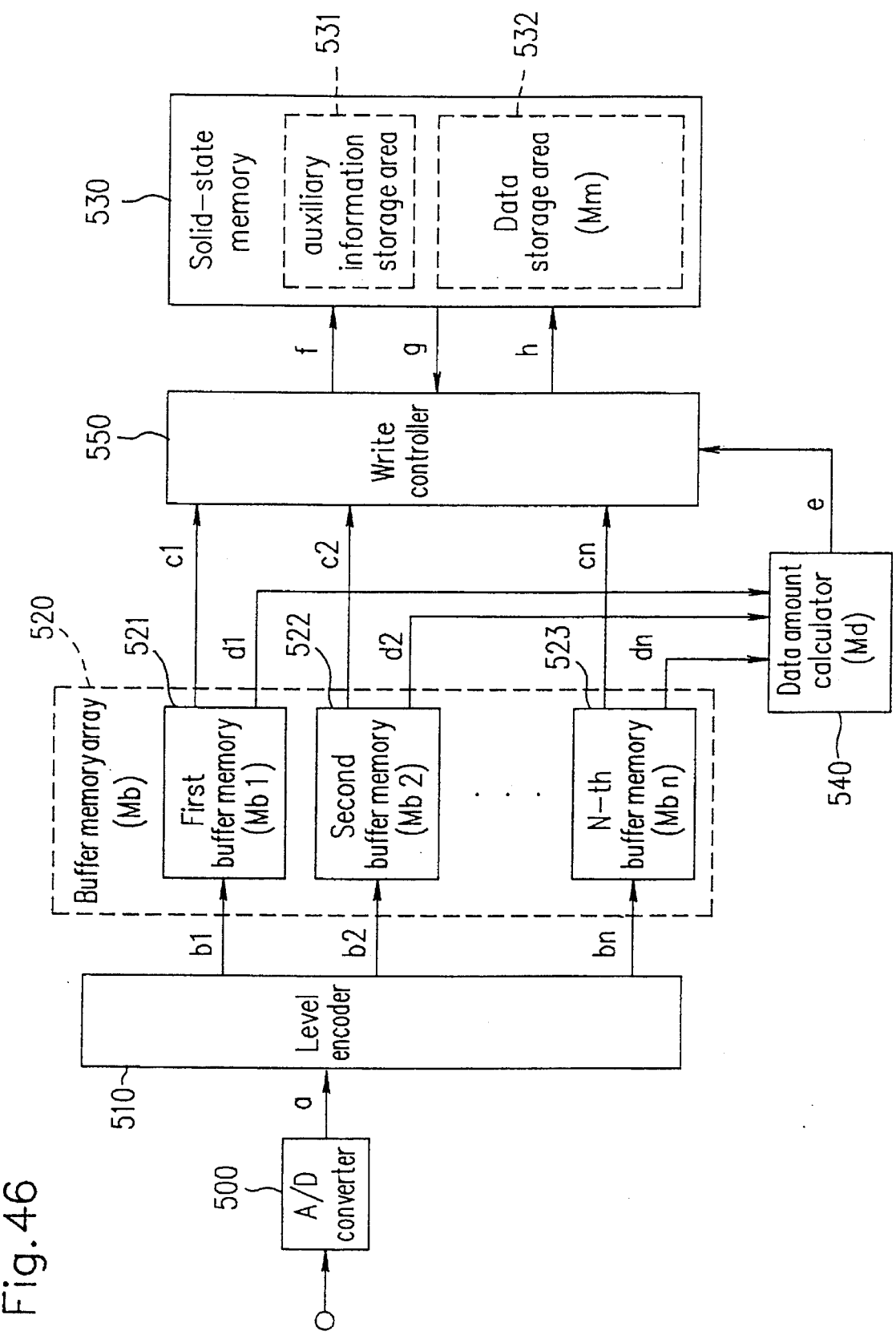
FIG. 46 is a block diagram showing the configuration of a digital signal recording apparatus of 17th to 19th example according to the invention.

FIG. 46 shows a configuration for the digital signal recording apparatus of a seventeenth example according to the invention. The digital signal recording apparatus shown in FIG. 46 includes an A/D converter 500 for converting an analog signal into a digital signal; a level encoder 510 for encoding the digital signal into first to N-th level data; a buffer memory array 520 having first to N-th buffer memories 521 to 523 for storing the first to N-th level data; a solid-state memory 530 having a data storage area 532 for storing the output of the buffer memory array 520 and an auxiliary information storage area 531 for storing auxiliary information regarding the encoding and storage area of the level data; a data amount calculator 540 for calculating the total amount of level data stored in the buffer memory array 520; and a write controller 550 for selecting level data from the first to N-th level data based on a comparison of the total amount of level data calculated by the data amount calculator 540 with the capacity of the data storage area 532 in the solid-state memory 530, and controls the writing of the selected level data and auxiliary information into the solid-state memory 530.

In FIG. 46, "a" denotes the digital signal output from the A/D converter 500; "b1", "b2", ..., and "bn" denote the first, second, ..., and N-th level data output from the level encoder 510, respectively; "c1", "c2" ..., and "cn" denote data stored in the first, second, ..., N-th buffer memories 521 to 523, respectively; "d1", "d2", ..., "dn" denote signals indicating the amounts of data stored in the first, second, ..., N-th buffer memories 521 to 523, respectively; "e" denotes a signal output from the data amount calculator 540 and indicates the total amount of data stored in the buffer memory array 520; "f" denotes the level data and their associated auxiliary information sent from the write controller 550 to the solid-state memory 530; "g" denotes solid-state memory internal information sent from the solid-state memory 530 to the write controller 550; and "h" denotes a control signal sent from the write controller 550 to the solid-state memory 530. Further, Mb1, Mb2, ..., Mbn denote memory capacities of the first, second, ..., N-th buffer memories 521 to 523, respectively. These memory capacities may be different from each other. Mb denotes the total memory capacity of the buffer memory array 520. Md denotes the total amount of data stored in the buffer memory array 520. Mm denotes the memory capacity of the data storage area 532 in the solid-state memory 530.

Figure 47:
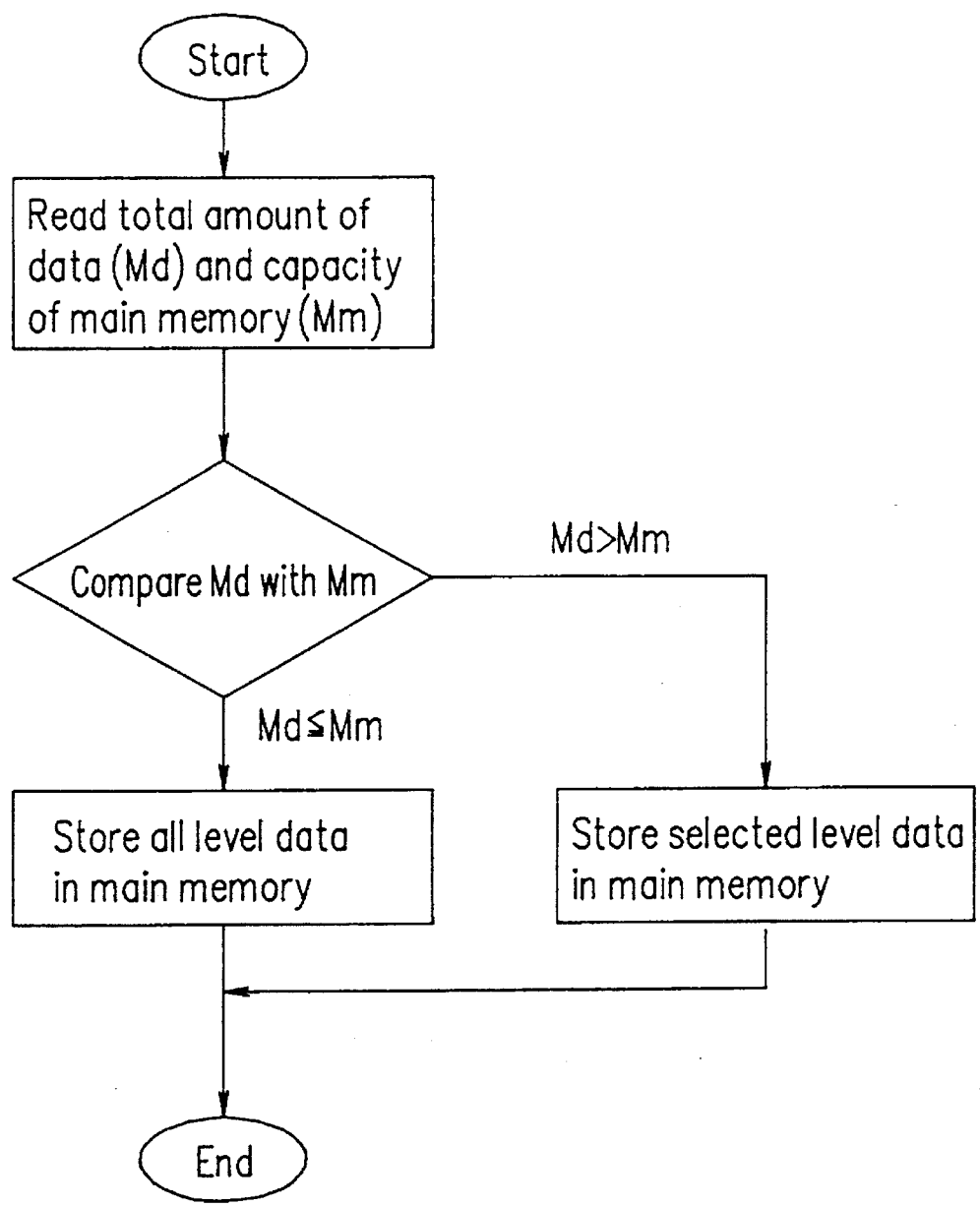
FIG. 47 is a flowchart illustrating the operational flow of a write controller.

FIG. 47 is a flowchart illustrating the operational flow of the write controller 550 shown in FIG. 46.

The operation of the digital signal recording apparatus having the above configuration will be described below with reference to FIGS. 46 and 47.

The A/D converter 500 converts an analog signal into a digital signal "a" having a specific sample length. The digital signal "a" is supplied to the level encoder 510. The level encoder 510 encodes the digital signal "a" into first to N-th level data b1 to bn. During the interval between the completion of one encoding cycle and the start of the next encoding cycle, the first to N-th level b1 to bn are supplied to the buffer memory array 520 at a time. More specifically, the first level data b1 is supplied to the first buffer memory 521 and stored in the first buffer memory 521. Likewise, the second to N-th level b2 to bn are stored in the second to N-th buffer memories 522 to 523, respectively. The above sequence of processing operations including analog-to-digital conversion, level encoding and buffer memory data storage, is repeated until the recording operation is completed.

When the recording operation is completed, the data amount calculator 540 calculates a total amount of data Md of the respective amount of data d1, d2, ..., and dn stored in the respective buffer memories in the buffer memory array 520, and supplies the resulting signal "e" indicating the total amount of data Md to the write controller 550. Upon receiving the signal "e", the write controller 550 supplies the control signal "h" to the solid-state memory 530, and receives the signal "g" indicating the capacity Mm of the data storage area 532. Then, the write controller 550 compares the total amount of data Md with the capacity Mm of the data storage area 532.

When the total amount of data Md is equal to or smaller than the capacity Mm of the data storage area 532, the write controller 550 stores all of data in the data storage area 532 and stores their associated auxiliary information in the auxiliary information storage area 531 in the form of the signal "f" by using the control signal "h" When the total amount of data Md is larger than the capacity Mm of the data storage area 532, the write controller 550 selects data to be stored from the data stored in first buffer memory 521 to the N-th buffer memory 532 in the buffer memory array 520, and stores the selected data in the data storage area 532 and stores their associated auxiliary information in the auxiliary information storage area 531 in the form of the signal "f" by using the control signal "h".

More specifically, the write controller 550 compares the total amount of data Md with the capacity Mm of the data storage area 532, selects data to be stored from the data stored in the buffer memory array 520 based on the comparison result, and stores the selected data and their associated auxiliary information into the solid-state memory 530.

As described above, according to the digital signal recording apparatus of this example, the recording can be done with greater importance to recording quality as the required recording time is shorter, and with greater importance to recording time as the required recording time is longer. In other words, the recording can be done on a limited capacity memory with the highest possible quality that the recording time can allow. The solid-state memory can thus be utilized effectively.

When the total memory capacity Mb of the buffer memory array is made at least larger than the memory capacity Mm of the data storage area in the solid-state memory, no unused space will be left within the data storage area in the solid-state memory, which will further enhance the utilization of the solid-state memory.

Furthermore, when each of the memory capacities Mb1, Mb2, . . . , Mbn of the respective buffer memories in the buffer memory array is proportional to the number of bits allocated to the respective levels by the level encoder, the redundancy of the buffer memories can be eliminated, so that the buffer memories can be utilized effectively.

EXAMPLE 18

Hereinafter, a digital signal recording apparatus of an eighteenth example according to the present invention will be described.

The digital signal recording apparatus of this example has the same configuration as that of the seventeenth example, as is shown in FIG. 46. Hereinafter, the reference numerals indicate elements shown in FIG. 46.

In this example, when the total amount of data Md stored in the buffer memory array 520 is larger than the capacity Mm of the data storage area 532 in the solid-state memory 530, the write controller 550 selects data having a total amount which is equal to the capacity of the data storage area 532 from first to N-th level data stored in the buffer memory array 520 in accordance with a predetermined method, and writes the selected data into the data storage area 532 in the solid-state memory 530. The write controller also writes auxiliary information indicating which data has been written into the data storage area 532 into the auxiliary information storage area 531 in the solid-state memory 530.

Hereinafter, the operation of the write controller 550 is described.

FIGS. 48, 49 and 50 show which data is selected by the write controller 550 in a case where the total amount of data Md is larger than the capacity Mm of the data storage area 532 in the solid-state memory 530.

For simplicity of explanation, the following assumption is introduced: The number of quantization bits is the same for all levels. The number of buffer memories is 4 (N=4). That is, the digital signal recording apparatus includes first to fourth buffer memories 521, 522, 522a and 523. Each of the first to fourth buffer memories has the same capacity and has 80 blocks each having a memory capacity m. Each of first to fourth buffer memories stores level data up to the seventh block in the time axis direction. Blocks 590 surrounded by thick lines indicate blocks in which level data is stored. The capacity of the data storage area 532 in the solid-state memory 530 is equivalent to 16 blocks (16×m). Shaded blocks indicate blocks in which level data selected by the write controller 550 is stored.

In FIG. 48, the selected level data are stored in the blocks numbered 10–16, 20–24, 30–32 and 40. In FIG. 49, selected level data are stored in blocks 10–16, 22–26, 34–36 and 46. In FIG. 50, selected level data are stored in blocks 20–26, 30–36, 40 and 41.

When the write controller 550 detects that the total amount of data (28×m in this example) is larger than the capacity (16×m in this example) of the data storage area 532 in the solid-state memory 530, the write controller 550 selects data which occupies the capacity (16×m) of the data storage area 532 in the solid-state memory 530 from the buffer memory array 520 in accordance with a predetermined method.

For example, the write controller 550 preferentially selects data stored at an earlier recording time, (in blocks 10–16, 20–24, 30–32 and 40) as is shown in FIG. 48. Alternatively, the write controller 550 may preferentially select data stored at a later recording time, (in blocks 10–16, 22–26, 34–36 and 46) as is shown in FIG. 49. The write controller 550 may select data other than the data stored in the first buffer memory (e.g., blocks 20–26, 30–36, 40 and 41) in a case where the data stored in the first buffer memory is unnecessary for the recording, as is shown in FIG. 50.

The data thus selected from the buffer memory array 520 in accordance with a predetermined method are written into the data storage area 532 in the solid-state memory 530, and at the same time, auxiliary information indicating what data have been stored is written into the auxiliary information storage area 531 in the solid-state memory 530.

As described above, according to the digital signal recording apparatus of this example, the total amount of data is compared with the capacity of the data storage area, and when the total amount of data is smaller than the capacity of the data storage area, all of data stored in the buffer memory array are written into the data storage area in the solid-state memory; conversely, when the total amount of data is larger than the capacity of the data storage area, the write controller is controlled so that data required for occupying the capacity of the data storage area in the solid-state memory is selected from the buffer memory array in accordance with a predetermined method and then written into the data storage area. In this manner, by assigning priority to data according to a predetermined method, the recording of data on the solid-state memory having a limited capacity can be made with the highest possible quality that the recording time can allow. The solid-state memory can thus be utilized effectively.

EXAMPLE 19

Hereinafter, a digital signal recording apparatus of a nineteenth example according to the present invention will be described.

The digital signal recording apparatus of this example has the same configuration as that of the seventeenth example, as is shown in FIG. 46. Hereinafter, the reference numerals indicate elements shown in FIG. 46.

In this example, when the total amount of data Md stored in the buffer memory array 520 is larger than the capacity Mm of the data storage area 532 in the solid-state memory 530, the write controller 550 selects data required for occupying the data storage area 532 in the solid-state memory 530 from the first to N-th level data stored in the buffer memory array 520 in increasing order of the number of blocks included in the first to fourth buffer memories. The write controller 550 writes the selected data into the data storage area 532, and also writes auxiliary information indicating what data have been stored into the auxiliary information storage area 531 in the solid-state memory 530.

Hereinafter, the operation of the write controller 550 is described.

FIG. 51 shows which data is selected by the write controller 550 in a case where the total amount of data Md is larger than the capacity Mm of the data storage area 532 in the solid-state memory 530. It is assumed that the capacities of the respective buffer memories 521, 522, B22a and B23 and the structures thereof are the same as those in the eighteenth example. Shaded blocks 10–16, 20–26, 30 and 31 indicate blocks in which level data selected by the write controller 550 is stored.

When the write controller 550 detects that the total amount of data (28×m in this example) is larger than the capacity (16×m in this example) of the data storage area 532 in the solid-state memory 530, the write controller 550 selects data required for occupying the capacity (16× m) of the data storage area 532 in the solid-state memory 530 from the buffer memory array 520 in increasing order of the number of blocks included in the first to fourth buffer memories. Then, the write controller 550 writes the selected data into the data storage area 532 and writes auxiliary information indicating what data have been stored into the auxiliary information storage area 531.

As described above, according to the digital signal recording apparatus of this example, when the total amount of data is larger than the capacity of the data storage area, the write controller is controlled so that data required for occupying the capacity of the data storage area in the solid-state memory is selected from the buffer memory array in increasing order of the number of blocks included in the first to fourth buffer memories and then written into the data storage area.

In this manner, by using a simple method, the recording of data on the solid-state memory having a limited capacity can be made with the highest possible quality that the recording time can allow. The solid-state memory can thus be utilized effectively.

EXAMPLE 20

Hereinafter, a digital signal reproducing apparatus of a twentieth example according to the present invention will be described.

FIG. 52 shows a configuration for a digital signal reproducing apparatus of a twentieth example according to the invention. The digital signal reproducing apparatus shown in FIG. 52 includes a solid-state memory 191 having a data storage area for storing level data and an auxiliary information storage area for storing auxiliary information indicating the attributes of the level data. The level data and the auxiliary information indicating the attributes of the level data are recorded on the solid-state memory 191 by the digital signal recording apparatus of the present invention. In this example, it is assumed that the level data and the auxiliary information indicating the attributes of the level data are recorded on the solid-state memory 191 by the digital signal recording apparatus of the first example according to the present invention.

The digital signal reproducing apparatus shown in FIG. 52 further includes a readout controller 192 for reading the level data and the auxiliary information indicating the attributes of the level data from the solid-state memory 191 in order of recorded time and a quantized code reconstructor 192 for reconstructing first to fourth coded data according to the level from the readout controller 192. For any level data which is not read out by the readout controller 92, the quantized code reconstructor 193 reconstructs coded data by assigning predetermined values to the missed level data.

The digital signal reproducing apparatus shown in FIG. 52 further includes first to fourth inverse quantizers 194 to 197 for reconstructing the first to fourth band signals according to the first to fourth coded data from the quantized code reconstructor 193, a band synthesizer 198 for synthesizing an original digital signal according to the reconstructed first to fourth band signals, and a D/A converter 199 for converting the digital signal output from the band synthesizer 198 into an analog signal.

FIG. 53 shows how the first to fourth level data are reconstructed by the quantized code reconstructor 193 into the respective coded data in a case where the numbers of bits allocated to the bands are 6, 4, 3 and 3, respectively. In FIG. 53, the number in each box indicates the number of the level for that bit, and the first to fourth coded data are shown in this order from left to right. As shown in FIG. 53, the first level data corresponds to the four high-order bits of the first coded data; the second level data corresponds to the second LSB of the first coded data and the three high-order bits of the second coded data, a total of four bits; the third level data corresponds to the two high-order bits of the third coded data and the two high-order bits of the fourth coded data, a total of four bits; and the fourth level data corresponds to the LSB of each of the first to fourth coded data, a total of four bits.

FIG. 54 shows how the first to fourth level data are reconstructed by the quantized code reconstructor 193 into the coded data in a case where the numbers of bits allocated to the bands are 6, 4, 3 and 3, respectively, and the fourth level data was not read out by the readout controller 192. Since the fourth level data was not read out, a value "L" (logic-0) is assigned to each of the positions corresponding to the fourth level data by the quantized code reconstructor 193.

FIG. 55 shows how the first to fourth level data are reconstructed by the quantized code reconstructor 193 into the coded data in a case where the numbers of bits allocated to the bands are 6, 4, 3 and 3, respectively, and the third and fourth level data were not read out by the readout controller 192. Since the third and fourth level data were not read out, a value "L" (logic-0) is assigned to each of the positions corresponding to the third and fourth level data by the quantized code reconstructor 193.

FIG. 56 shows how the first to fourth level data are reconstructed by the quantized code reconstructor 193 into the coded data in a case where the numbers of bits allocated to the bands are 6, 4, 3 and 3, respectively, and the second to fourth level data were not read out by the readout controller 192. Since the second to fourth level data were not read out, a value "L" (logic-0) is assigned to each of the positions corresponding to the second to fourth level data, except the second LSB position of the first coded data. A value "H" (logic-1) is assigned to the second LSB position of the first coded data. This assignment of the value "H" is based on a predetermined rule that when two or more low-order bits of any coded data are discarded and at least the MSB of the coded data is preserved, the value "H" (logic-1) should be assigned to the highest order position in the discarded bits of the coded data. Such a rule is provided to obtain a decoded signal based on an intermediate condition between the condition of all logic-0s for discarded bits in the band and the condition of all logic-1s for discarded bits in the band. This serves to minimize decoded quality degradation even when a lower level data was discarded.

FIG. 57 shows a configuration for the band synthesizer 198 shown in FIG. 52.

As shown in FIG. 57, this band synthesizer 198 is an iQMF filter bank. This configuration is commonly used as a band synthesizer (see, "DSP Handbook", pp. 135–137). In this example, the illustrated iQMF filter bank is used as an example of the band synthesizer 198. However, it will be appreciated that the band synthesizer 198 may be a polyphase filter bank or a hybrid polyphase/MDCT filter bank, such as practiced in MPEG audio encoding algorithms (see, "ISO/IEC" pp. 96–97).

FIG. 58 shows the contents of the data storage area in which level data is stored. FIG. 58 corresponds to FIG. 6 which shows the contents of the data storage area, recorded by the digital signal recording apparatus of the first example according to the invention.

FIG. 59 shows the contents of the auxiliary information storage area associated with the stored level data. FIG. 59 corresponds to FIG. 11 which shows the contents of the auxiliary information storage area, recorded by the digital signal recording apparatus of the first example according to the invention.

The operation of the digital signal reproducing apparatus having the above configuration will be described below with reference to FIGS. 52 to 59.

Referring to FIG. 52, the readout controller 192 reads out the auxiliary information stored in the auxiliary information storage area of the solid-state memory 191, and analyzes how the level data are stored in the data storage area of the solid-state memory 191. For example, when the auxiliary information as shown in FIG. 59 is read out from the auxiliary information storage area, the readout controller 192 analyzes as follows.

In data recording, first level data was stored in an area from address 0000 to address 0FFF, second level data was stored in an area from address 1000 to address 1FFF, third level data was stored in an area from address 2000 to address 2FFF, and fourth level data was stored in an area from address 3000 to address 3FFF. Then, when the data storage area became full, the area from address 2000 to address 2FFF and the area from address 3000 to address 3FFF were freed so as to store the first level data in the freed area from address 2000 to address 2FFF and to store the second level data in the freed area from address 3000 to address 3FFF. Then, when the data storage area become full again, the area from address 3000 to address 3FFF was freed, and first level data was stored in the freed area from address 3000 to address 3FFF. Then, the recording process is completed.

Based on the analysis mentioned above, the readout controller 192 sequentially reads out the data stored in the area from address 0000 to address 0FFF, as the first level data, and the data stored in the area from address 1000 to address 1FFF, as the second level data. The read out first and second level data are supplied to the quantized code reconstructor 193. In this case, since the third and fourth level data are missing in the received level data, the quantized code reconstructor 193 reconstructs the respective band coded data in accordance with the assignments shown in FIG. 55.

Next, the first to fourth inverse quantizers 194 to 197 inverse-quantize the respective band coded data so as to generate first to fourth band signals. The first to fourth band signals are supplied to the band synthesizer 198.

The band synthesizer 198 combines the first to fourth band signals so as to reconstruct an original digital signal. The digital signal is converted by the D/A converter 199 into an analog signal for output.

After all the data stored in the area from address 0000 to address 1FFF have been read out, the readout controller 192 sequentially reads out the data stored in the area from address 2000 to address 2FFFF as the first level data. The read out first level data is supplied to the quantized code reconstructor 193. In this case, since the second to fourth level data are missing in the received level data, the quantized code reconstructor 193 reconstructs the respective band coded data in accordance with the assignments shown in FIG. 56.

Next, in the same manner as described above, the respective band coded data are inverse-quantized, and the band synthesizer 198 combines the respective band signals so as to reconstruct an original digital signal. The digital signal is converted by the D/A converter 199 into an analog signal for output.

After all the data stored in the area from address 2000 to address 2FFF have been read out, the readout controller 192 sequentially reads out the data stored in the area from address 3000 to address 3FFF as the first level data. The read out first level data is supplied to the quantized code reconstructor 193. In this case, since the second to fourth level data are missing in the received level data, the quantized code reconstructor 193 reconstructs the respective band coded data in accordance with the assignments shown in FIG. 56.

Next, in the same manner as described above, the respective band coded data are inverse-quantized, and the band synthesizer 198 combines the respective band signals so as to reconstruct an original digital signal. The digital signal is converted by the D/A converter 199 into an analog signal for output.

As described above, the level data and the auxiliary information indicating the attributes of the stored level data are previously recorded on the data storage area and the auxiliary information storage area in the solid-state memory, respectively. The digital signal reproducing apparatus includes a readout controller for reading the auxiliary information from the auxiliary information storage area and for reading the level data from the data storage area based on the auxiliary information; and a level decoder for decoding the read out level data into an original digital signal according to respective levels of the level data.

With this configuration, data recorded by the digital signal recording apparatus of the invention can be read out and decoded effectively.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A digital signal recording apparatus comprising:

a level encoding means for encoding a digital signal into first to N-th level data, N being an integer greater than 1;

a memory means having a data storage area and an auxiliary information storage area, the data storage area being writable for the first to N-th level data; and a write control means for, when writable area in the data storage area is exhausted, freeing at least a part of an area in the data storage area in which level data other than the first level data is stored, for storing level data including at least the first level data into the freed area in the data storage area, and for storing auxiliary information indicating attributes of the stored level data into the auxiliary information storage area.

2. A digital signal recording apparatus according to claim 1, wherein the level encoding means comprises:

a band dividing means for dividing the digital signal into M bands so as to output first to M-th band signals, M being an integer equal to or greater than 1;

M quantizing means for quantizing the first to M-th band signals with respectively predetermined numbers of bits so as to output first to M-th quantized data having a total of Q bits, Q being an integer greater than 1; and a level dividing means for dividing the first to M-th quantized data into N levels so as to output the first to N-th level data in accordance with a predetermined rule.

3. A digital signal recording apparatus according to claim 2, wherein the level encoding means further comprises:

an adaptive bit allocating means for changing the numbers of bits allocated to the respective bands for quantization depending on at least one of power distribution and frequency spectral distribution of the first to M-th band signals examined at predetermined time intervals, and for changing the predetermined rule for level division depending on the numbers of bits allocated to the respective bands for quantization.

4. A digital signal recording apparatus according to claim 1, wherein the level encoding means comprises:

a first encoding means for encoding the digital signal into first encoded data;

a first decoding means for decoding the first encoded data into the digital signal;

a delay means for delaying the digital signal by a period of time required for encoding the digital signal by the first encoding means and for decoding the encoded data by the first decoding means; and a subtracting means for outputting data indicating the difference between the output of the first decoding means and the output of the delay means as second encoded data, and wherein the first encoded data is output as the first level data and the second encoded data is output as the second level data.

5. A digital signal recording apparatus according to claim 4, wherein the level encoding means further comprises:

a second encoding means for encoding the second encoded data into third encoded data;

and wherein the first encoded data is output as the first level data and the third encoded data is output as the second level data.

6. A digital signal recording apparatus according to claim 4, wherein the first encoding means is one of an analysis-synthesis type encoding means and predictive coding type encoding means including the first decoding means, the delay means and the subtracting means.

7. A digital signal recording apparatus according to claim 1, wherein the write control means writes each of the first to N-th level data into the data storage area in a predetermined order, and when a higher level data has been written into an area in the data storage area in which a lower level data is to be written, the write control means stops writing the lower level data.

8. A digital signal recording apparatus according to claim 7, wherein an address at which the write control means stops writing the lower level data is predetermined based on bit rates of the respective first to N-th level data and a capacity of the data storage area, and wherein the write control means stops writing the lower level data when a write address for writing the lower level data reaches the predetermined address.

9. A digital signal recording apparatus according to claim 7, wherein the data storage area is an area having address A to address B, and wherein the write control means writes the first level data into the area in a direction from address A to address B and writes the second level data into the area in a direction from address B to address A.

10. A digital signal recording apparatus according to claim 7, wherein the data storage area is a first area having address A to address B, the first area including a second area having address A' to address B, address A' being provided between address A and address B, and wherein the write control means writes the first level data into the first area in a direction from address A to address B and writes the second level data into the second area.

11. A digital signal recording apparatus according to claim 7, wherein the data storage area includes a first area having address A to address B and a second area having address C to address D, and wherein the write control means writes the first level data into the first area in a direction from address A to address B and then writes the first level data into the second area in a direction from address D to address C, writes the second level data into the second area in a direction from address C to address D, and writes the third level data alternately into the first area in a direction from address B to address A and into the second area in a direction from address D to address C.

12. A digital signal recording apparatus according to claim 7, wherein the data storage area includes a first area having address A to address B and a second area having address C to address D, the first area including a third area having address A' to address B, address A' being provided between address A and address B, the second area including a fourth area having address C' to address D, address C' being provided between address C to address D, and wherein the write control means writes the first level data into the first area in a direction from address A to address B and then writes the first level data into the second area in a direction from address D to address C, writes the second level data into the second area in a direction from address C to address D, and writes the third level data alternately into the third area and into the fourth area.

13. A digital signal recording apparatus according to claim 7, wherein the data storage area includes a first area having address A to address B and a second area having address C to address D, the first area including a third area having address A' to address B', address A' being provided between address A and address B, the address B' being provided between address A' and address B, the second area including a fourth area having address C' to address D', address C' being provided between address C to address D, address D' being provided between address C' and address D, and wherein the write control means writes the first level data into the first area in a direction from address A to address B and then writes the first level data into the second area in a direction from address D to address C, writes the second level data into the second area in a direction from address C to address D, writes the third level data alternately into the first area in a direction from address B to address A and into the second area in a direction from address D to address C, and writes the fourth level data alternately into the third area and the fourth area.

14. A digital signal recording apparatus according to claim 7, wherein the data storage area includes a first area having address A to address B and a second area having address C to address D, the first area including a third area having address A' to address B' and a fourth area having address A" to address B, address A' being provided between address A and address B, the address B' being provided between address A' and address B, address A" being provided between address A' and address B', the second area including a fifth area having address C' to address D' and a sixth area having address C" to address D, address C' being provided between address C to address D, address D' being provided between address C' and address D, address C" being provided between address C' to address D', and wherein the write control means writes the first level data into the first area in a direction from address A to address B and then writes the first level data into the second area in a direction from address D to address C, writes the second level data into the second area in a direction from address C to address D, writes the third level data alternately into the fifth area and into the sixth area, and writes the fourth level data alternately into the third area and the fourth area.

15. A digital signal recording apparatus according to claim 1, further comprising:

evaluating means for evaluating whether the original digital signal is reconstructed with a predetermined accuracy from selected first to N'-th level data so as to output an evaluation signal indicating the evaluation result, N' being an integer smaller than N, wherein the write control means selectively writes at least one of the first to N-th level data into the data storage area in accordance with the evaluation signal.

16. A digital signal recording apparatus according to claim 15, wherein the evaluating means comprises:

a decoding means for decoding the selected first to N'-th level data into a digital signal; and a difference signal evaluating means for calculating the difference between the digital signal obtained by the decoding means and the original digital signal, and wherein, when the calculated difference is smaller than a predetermined value, the write control means writes only the selected first to N'-th level data into the data storage area.

17. A digital signal recording apparatus according to claim 15, wherein the level encoding means encodes the digital signal into first to N-th frequency band signals as the first to N-th level data, and wherein, when the magnitude of frequency band signals other than the selected first to N'-th level data is smaller than a predetermined value, the write control means writes only the selected first to N'-th level data into the data storage area.

18. A digital signal recording apparatus comprising:

a level encoding means for encoding a digital signal into first to N-th level data;

a buffer memory means for storing the first to N-th level data;

a memory means having a data storage area which is writable for the first to N-th level data and an auxiliary information storage area;

a data amount calculating means for calculating the total amount of the first to N-th level data stored in the buffer memory means; and a write control means for comparing the total amount of the first to N-th level data with a capacity of the data storage area, for selecting data from the first to N-th level data stored in the buffer memory means according to the comparison result, and for storing the selected data into the data storage area and auxiliary information associated with the selected data into the auxiliary information storage area.

19. A digital signal recording apparatus according to claim 18, wherein, when the total amount of data is greater than the capacity of the data storage area, the write control means stores the selected data from the first to N-th level data into the data storage area.

20. A digital signal recording apparatus according to claim 18, wherein, the buffer memory means has a plurality of blocks, each of the plurality of blocks having a different number, and wherein, when the total amount of data is greater than the capacity of the data storage area, the write control means selects data having a total amount which is equal to the capacity of the data storage area in an increasing order of the numbers assigned to the blocks of the buffer memory means, and stores the selected data into the data storage area.

21. A digital signal recording apparatus according to claim 1, wherein the first level data is the most significant data, and the significance of the second to N-th level data decreases as the number of the level increases.

22. A digital signal reproducing apparatus comprising:

a memory means having a data storage area for storing level data and an auxiliary information storage area for storing auxiliary information indicating the attributes of the level data stored in the data storage area;

a read control means for reading the level data stored in the data storage area and the auxiliary information stored in the auxiliary information storage area, and for specifying which level is missing in the data storage area, based on the auxiliary information; and a level decoding means for decoding the level data into a digital signal, wherein the level decoding means assigns a predetermined value to data of the specified missing level in accordance with a predetermined rule.

23. A digital signal recording and reproduction system, comprising:

(1) digital signal recording apparatus comprising:

level encoding means for encoding a digital signal into first to N-th level data, N being an integer greater than 1, memory means having a data storage area and an auxiliary information storage area, the data storage area being writable for the first to N-th level data, and write control means for, when writable area in the data storage area is exhausted, freeing at least a part of an area in the data storage area in which level data other than the first level data are stored, for storing level data including at least the first level data into the freed area in the data storage area, and for storing auxiliary information indicating attributes of the stored level data into the auxiliary information storage area; and (2) digital signal reproducing apparatus comprising:

read control means for reading the level data stored in the data storage area and the auxiliary information stored in the auxiliary information storage area, and for specifying which level is missing in the data storage area, based on the auxiliary information, and level decoding means for decoding the level data into a digital signal, wherein the level decoding means assigns a predetermined value to data of the specified missing level in accordance with a predetermined rule.

24. A digital signal reproducing apparatus according to claim 22, wherein the predetermined rule includes a rule that, when, two or more low-order bits of band coded data are discarded but the MSB of the band coded data is preserved, the level decoding means assigns a logic-1 to the highest-order bit of the discarded bits and assigns a logic-0 to the other bit of the discarded bits.

* * * * *

UNITED STATES PATENT AND TRADEMARK OFFICE
CERTIFICATE OF CORRECTION

PATENT NO. : 5,493,647
DATED : February 20, 1996
INVENTOR(S) : S. Miyasaka, et al It is certified that error appears in the above-indentified patent and that said Letters Patent is hereby corrected as shown below:

Column 46, line 12, "logic-1to" should be --logic-1 to".

Column 46, line 13, "logic-0to" should be --logic-0 to".

The drawing sheets 46-53, consisting of Figures 52-59, should be added as shown here and on the attached pages.

Fig.52

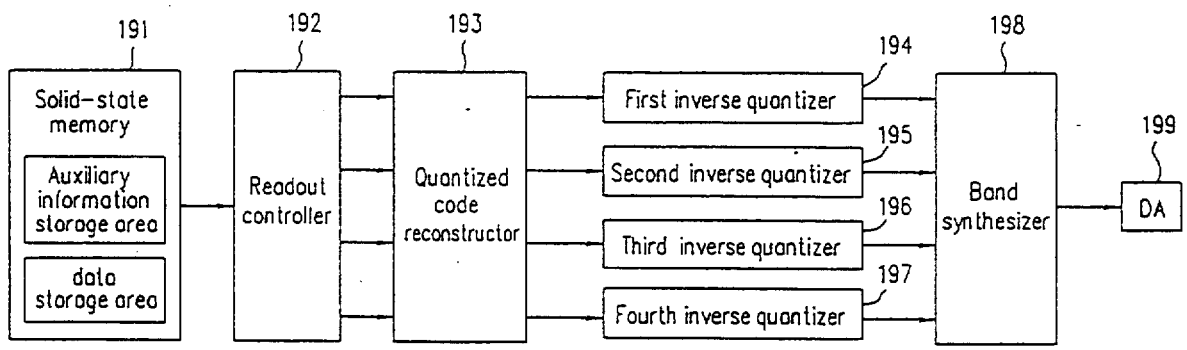

UNITED STATES PATENT AND TRADEMARK OFFICE
CERTIFICATE OF CORRECTION

PATENT NO. : 5,493,647
DATED : February 20, 1996
INVENTOR(S) : S. Miyasaka, et al It is certified that error appears in the above-indentified patent and that said Letters Patent is hereby corrected as shown below:

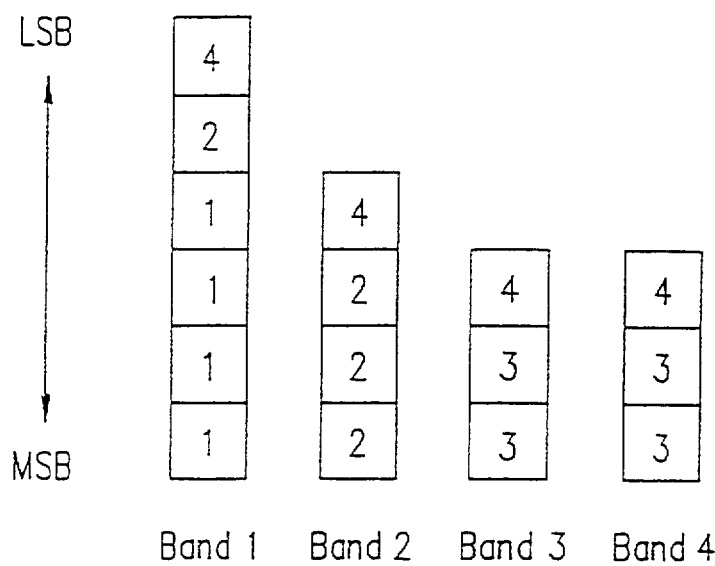

Fig.53

UNITED STATES PATENT AND TRADEMARK OFFICE
CERTIFICATE OF CORRECTION

PATENT NO. : 5,493,647
DATED : February 20, 1996
INVENTOR(S) : S. Miyasaka, et al It is certified that error appears in the above-indentified patent and that said Letters Patent is hereby corrected as shown below:

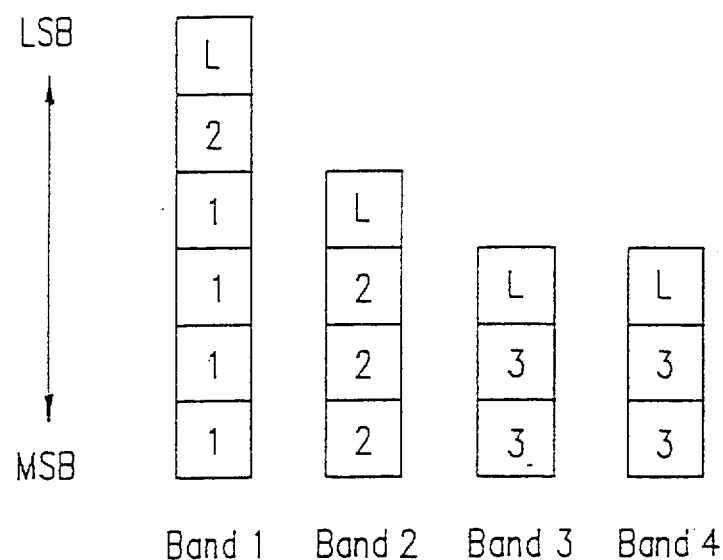

Fig.54

UNITED STATES PATENT AND TRADEMARK OFFICE
CERTIFICATE OF CORRECTION

PATENT NO. : 5,493,647
DATED : February 20, 1996
INVENTOR(S) : S. Miyasaka, et al It is certified that error appears in the above-indentified patent and that said Letters Patent is hereby corrected as shown below:

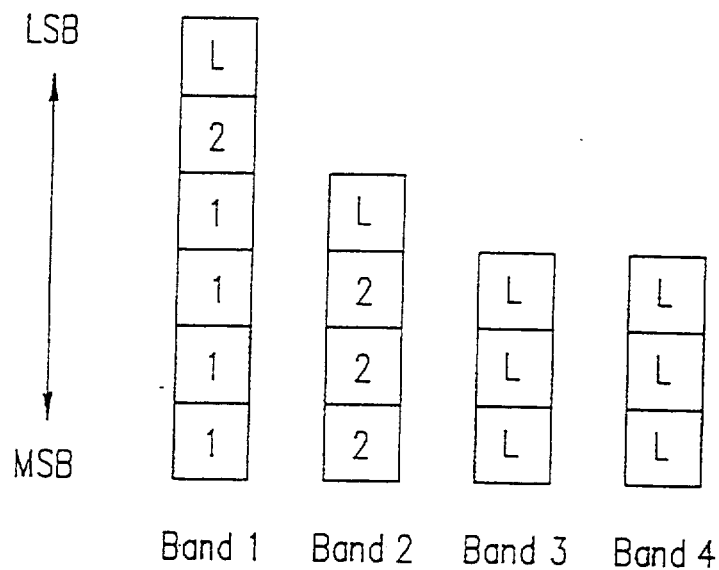

Fig.55

UNITED STATES PATENT AND TRADEMARK OFFICE
CERTIFICATE OF CORRECTION

PATENT NO. : 5,493,647
DATED : February 20, 1996
INVENTOR(S) : S. Miyasaka, et al It is certified that error appears in the above-indentified patent and that said Letters Patent is hereby corrected as shown below:

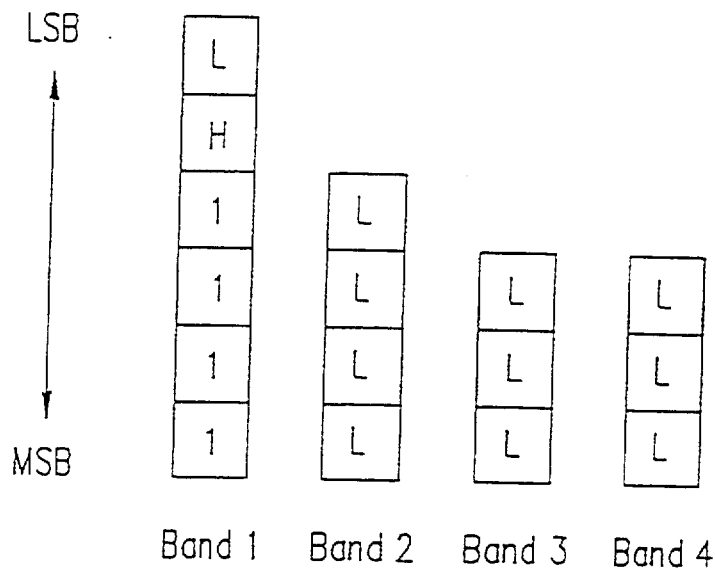

UNITED STATES PATENT AND TRADEMARK OFFICE
CERTIFICATE OF CORRECTION

PATENT NO. : 5,493,647
DATED : February 20, 1996
INVENTOR(S) : S. Miyasaka, et al Page 6 of 8

It is certified that error appears in the above-indentified patent and that said Letters Patent is hereby corrected as shown below:

Fig.57

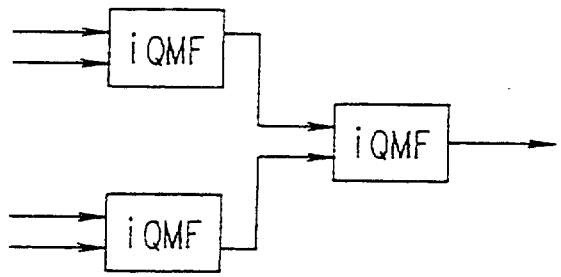

UNITED STATES PATENT AND TRADEMARK OFFICE
CERTIFICATE OF CORRECTION

PATENT NO. : 5,493,647
DATED : February 20, 1996
INVENTOR(S) : S. Miyasaka, et al It is certified that error appears in the above-indentified patent and that said Letters Patent is hereby corrected as shown below:

Fig.58

| Address 0000<br>Address 0FFF | Area in which the first level data is stored |
|---|---|
| Address 1000<br>Address 1FFF | Area in which the second level data is stored |
| Address 2000<br>Address 2FFF | Area in which the first level data is stored |
| Address 3000<br>Address 3FFF | Area in which the first level data is stored |

UNITED STATES PATENT AND TRADEMARK OFFICE
CERTIFICATE OF CORRECTION

PATENT NO. : 5,493,647
DATED : February 20, 1996
INVENTOR(S) : S. Miyasaka, et al It is certified that error appears in the above-indentified patent and that said Letters Patent is hereby corrected as shown below:

Fig.59

```
Address 0000 ~ Address 0FFF : First level data
Address 1000 ~ Address 1FFF : Second level data
Address 2000 ~ Address 2FFF : Third level data
Address 3000 ~ Address 3FFF : Fourth level data
-----------------------------------------------
Address 2000 ~ Address 2FFF : First level data
Address 3000 ~ Address 3FFF : Second level data
-----------------------------------------------
Address 3000 ~ Address 3FFF : First level data
```

Signed and Sealed this

Twentieth Day of August, 1996

Attest:

BRUCE LEHMAN

Attesting Officer    Commissioner of Patents and Trademarks